United States Patent [19]
Nanba et al.

[11] Patent Number: 5,995,963
[45] Date of Patent: Nov. 30, 1999

[54] APPARATUS AND METHOD OF MULTI-STRING MATCHING BASED ON SPARSE STATE TRANSITION LIST

[75] Inventors: Isao Nanba; Nobuyuki Igata, both of Kawasaki, Japan

[73] Assignee: Fujitsu Limited, Kawasaki, Japan

[21] Appl. No.: 08/811,534

[22] Filed: Mar. 4, 1997

[30] Foreign Application Priority Data

Jun. 27, 1996 [JP] Japan ..................................... 8-167117

[51] Int. Cl.[6] .................................................. G06F 17/30
[52] U.S. Cl. ........................................ 707/6; 707/3; 707/7
[58] Field of Search .............................. 707/3, 6, 7

[56] References Cited

U.S. PATENT DOCUMENTS

| | | | |
|---|---|---|---|
| 5,051,886 | 9/1991 | Kawaguchi et al. | 707/6 |
| 5,278,981 | 1/1994 | Kawaguchi et al. | 707/6 |
| 5,329,405 | 7/1994 | Hou et al. | 707/6 |
| 5,452,451 | 9/1995 | Akizawa et al. | 707/7 |
| 5,471,610 | 11/1995 | Kawaguchi et al. | 707/6 |
| 5,553,283 | 9/1996 | Kaplan et al. | 707/101 |
| 5,564,058 | 10/1996 | Kaplan et al. | 707/6 |
| 5,627,748 | 5/1997 | Baker et al. | 707/6 |
| 5,710,916 | 1/1998 | Barbaraet al. | 707/9 |

OTHER PUBLICATIONS

Aho et al., "Efficient String Matching: An Aid to Bibliographic Search", ACM, vol. 18, No. 6 (Jun. 1975), pp. 333–340.

*Primary Examiner*—Paul R. Lintz
*Assistant Examiner*—Jean Bolte Flelirantin
*Attorney, Agent, or Firm*—Staas & Halsey LLP

[57] ABSTRACT

A collating apparatus generates a sparse state transition table by reducing the amount of data indicating a specific transition operation and a shift operation in a state transition table in which a collating operation corresponding to each symbol contained in one or more retrieval keys is defined. Then, the collating apparatus stores the table after compressing it into an array format, and retrieves the keys in the file to be retrieved while referring to the compressed state transition table. This collating apparatus is applied to a word processor, database system, full-text search system, etc.

22 Claims, 66 Drawing Sheets

| output | keyword | |
|---|---|---|
| s4 | ab | ← NEXT TRANSITION STATE |
| s5 | bc | |
| s6 | bd | ←--- FAILURE STATE |

| STATE | INPUT SYMBOL | NEXT STATE | OUTPUT |
|---|---|---|---|
| 1 | c | 1 | NO OUTPUT |
| 1 | a | 2 | NO OUTPUT |
| 2 | b | 4 | NO OUTPUT |
| 4 | | | a b |
| 4 | c | 3 (fail) | NO OUTPUT |
| 3 | c | 5 | NO OUTPUT |
| 5 | | | b c |
| 5 | z | 1 (fail) | NO OUTPUT |
| 1 | TERMINATION | | |

| state | input | next |
|---|---|---|
| s1 | :a | 2 |
|  | :b | 3 |
|  | :¬a,b | 1 |
| s2 | :a | 2 |
|  | :b | 4 |
|  | :¬a,b | 1 |

| state | input | next |
|---|---|---|
| s3,s4 | :a | 2 |
|  | :b | 3 |
|  | :c | 5 |
|  | :d | 6 |
|  | :¬a,b,c,d | 1 |
| s5,s6 | :a | 2 |
|  | :b | 3 |
|  | :¬a,b | 1 |

| STATE | INPUT SYMBOL | NEXT STATE | OUTPUT |
|---|---|---|---|
| 1 | c | 1 | NO OUTPUT |
| 1 | a | 2 | NO OUTPUT |
| 2 | b | 4 | NO OUTPUT |
| 4 | | | a b |
| 4 | c | 5 | NO OUTPUT |
| 5 | | | b c |
| 5 | z | 1 | NO OUTPUT |
| 1 | TERMINATION | | |

| Character/state | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| a | -2 | -4 | -3 | -6 | -7 | -8 | -2 | 8 | -6 | -7 | 11 | -7 | -8 | -9 |
| e | -1 | -4 | -5 | -6 | -7 | -8 | -5 | -5 | 9 | -7 | -6 | -7 | -8 | -9 |
| m | -3 | -4 | -5 | -6 | -7 | -8 | -5 | -5 | -6 | -7 | -6 | 12 | -8 | -9 |
| r | -1 | -4 | -5 | -6 | -7 | -8 | -5 | -5 | -6 | -7 | -6 | -7 | -8 | -9 |
| s | -1 | -4 | -5 | -6 | 5 | -8 | 7 | -5 | -6 | -7 | -6 | -7 | 13 | -9 |
| t | 6 | 2 | -5 | 4 | -7 | -8 | -5 | -5 | -6 | -7 | -6 | -7 | -8 | -9 |
| (Other) | -4 | -4 | -5 | -6 | -7 | -8 | -5 | -5 | -6 | -7 | -6 | -7 | -8 | -9 |
| Depth | 0 | 1 | 2 | 3 | 4 | 5 | 1 | 2 | 3 | 4 | 2 | 3 | 4 | 5 |

FIG. 2C

| | | | | | | | | | |
|---|---|---|---|---|---|---|---|---|---|
| Initial Shift -4*-1 | | | | | | 0----|----e | | |
| | | | | | | 1 | | | |
| | | | | | | 2 | | | |
| Output east Shift -7*-1 | | | 0----|----3----|----t | | | | | |
| | | | 6 | 4 | | | | | |
| | | | 7 | 5 | | | | | |
| Output state Shift -7*-1 End | 0----|----8----|----|----|----|----|----e | | | | | | | | |
| | 1 | 9 | | | | | | | |
| Input string | a | s | a | a | s | t | a | t | e |

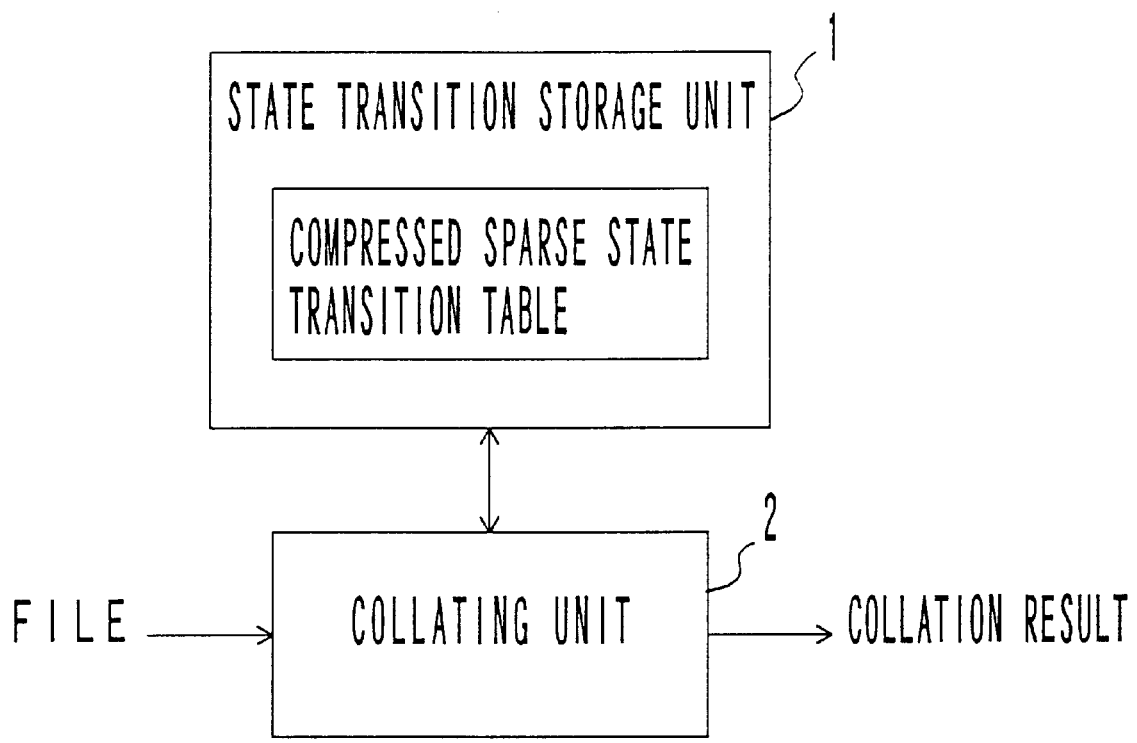
F I G. 3

FIG. 8

| index  | 1  | 2  | 3  | 4 | 5 | 6 | ... | 25 | 26 | 27 | 28 | 29 | 30 | 31 | 32 | 33 | 34 |
|--------|----|----|----|---|---|---|-----|----|----|----|----|----|----|----|----|----|----|
| GOTO   | 1  | 27 | 28 | 1 | 1 | 1 | ... | 1  | 1  | 1  | 29 |    | 5  | 6  | 5  | 6  | 0  |
| CHECK  | 1  | a  | b  | c | d | e | ... | x  | y  | z  | b  |    | c  | d  | c  | d  | #  |
| OUTPUT | 0  | 0  | 0  | 0 | 0 | 0 | ... | 0  | 0  | 0  | o1 | 0  | o2 | o3 | o2 | o3 | 0  |
|        | s1 | a  | b  |   | s5| s6|     |    | s2 | s3 | b  | s4 | c  | d  | c  | d  | #  |

| OUTPUT | SYMBOL |
|--------|--------|
| o1     | ab     |
| o2     | bc     |
| o3     | bd     |

| CHARACTER CODE | a | b | c | d | .. | z |
|---|---|---|---|---|---|---|
| INTERNAL CODE | 1 | 2 | 3 | 4 | .. | 26 |

FIG. 9

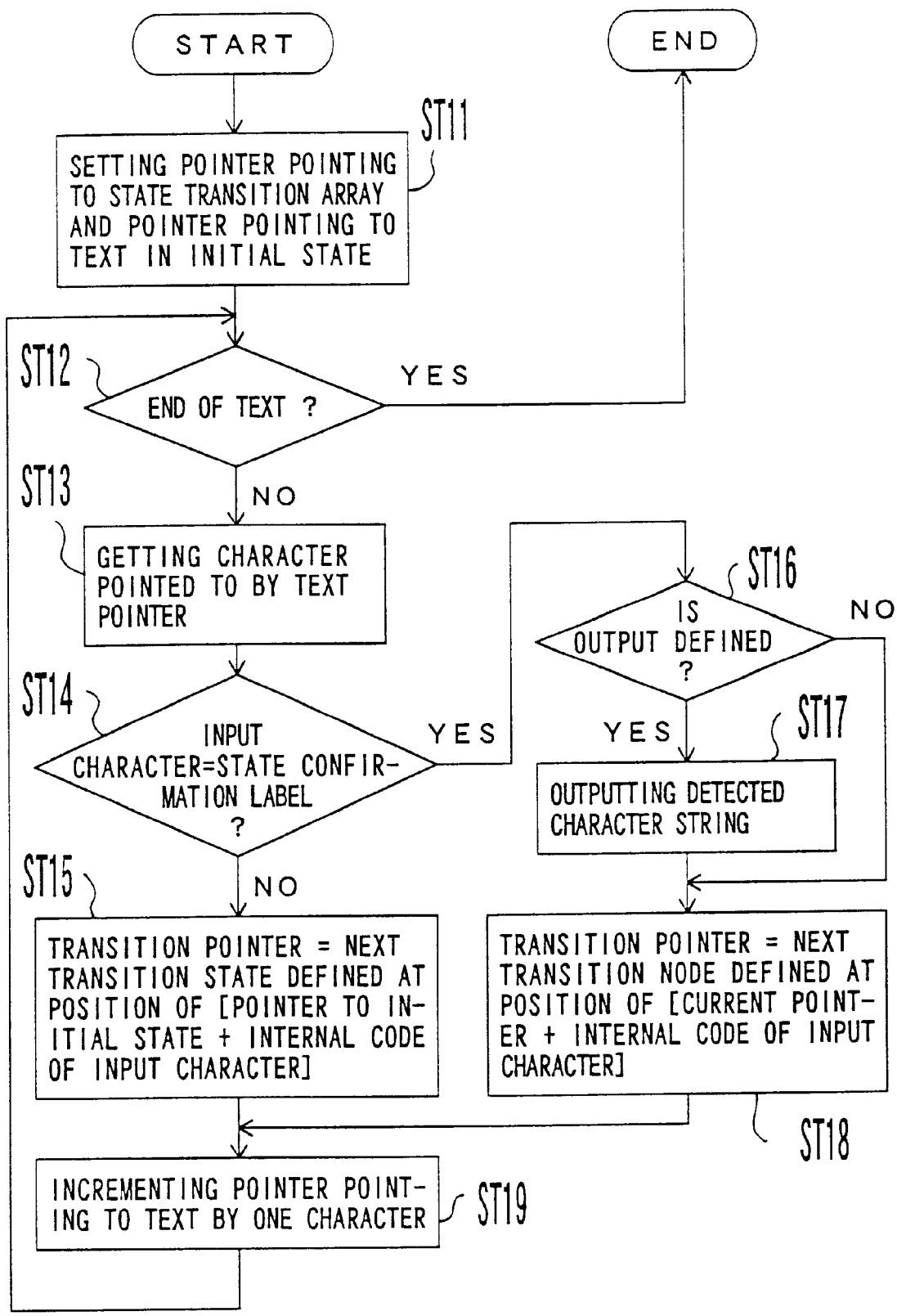
F I G. 1 0

| STATE(index) | SYMBOL | TRANSITION OPERATION | OUTPUT |
|---|---|---|---|
| INITIAL STATE(1) | | | |
| 1 | c | 1=GOTO [1+'c] (*1) | NO OUTPUT |
| 1 | a | 26=GOTO [1+'a] (*1) | NO OUTPUT |
| 26 | b | 29=GOTO [26+'b] (CHECK[26+'b]=b) | a b |
| 29 | c | 5=GOTO [29+'c] (CHECK[29+'c]=c) | b c |
| 5 | z | CHECK [5+'z] !=z (fail) | NO OUTPUT |
| 1 | | 1=GOTO [1+'z] (*1) (from1) | NO OUTPUT |

TERMINATION

| OPERATION | CURRENTLY PROCESSED NODE | QUEUE J | QUEUE Q | SETTING FAIL |
|---|---|---|---|---|
| | | | 2,3 | set fail of 2,3 1 |
| pop 2 from Q | 2 | | 3 | |
| set 4 to J | | 4 | 3 | |
| pop 4 from J | 4 | | 3,4 | |
| push 4 to Q | 4 | | 3,4 | |
| set fail to 4 | 4 | | 4 | 3( as goto(1,b) defined) |
| pop 3 from Q | 3 | | 4 | |
| set 5,6 to J | 3 | 5,6 | 4 | |
| pop 5 from J | 5 | 6 | 4 | |
| push 5 to Q | 5 | 6 | 4,5 | |
| set fail to 5 | 5 | | 4,5 | 1( as goto(1,c) is not defined) |
| pop 6 from J | 6 | | 4,5 | |
| push 6 to Q | 6 | | 4,5,6 | |
| set fail to 6 | 5 | | 4,5,6 | 1( as goto(1,d) is not defined) |
| pop 4 from Q | 4 | | 5,6 | |
| set 7 to J | 4 | 7 | 5,6 | |
| pop 7 from J | 7 | | 5,6 | |
| push 7 to Q | 7 | | 5,6,7 | |
| set fail to 7 | 7 | | 5,6,7 | 1( as goto(3,#) is not defined) |

OPERATIONS FOR NODE 8 AND 9 ARE SIMILAR TO THOSE FOR NODE 7

FIG. 22

| index  | 1 | 2 | 3 | 4 | ... | 25 | 26 | 27 |
|--------|---|---|---|---|-----|----|----|----|
| GOTO   | 1 | 0 | 0 | 1 | ... | 1  | 1  | 1  |
| CHECK  | 1 | 0 | 0 | c | ... | x  | y  | z  |
| OUTPUT | 0 | 0 | 0 | 0 | ... |    |    |    |

PATTERN ON ARRAY "CHECK"

```
   0   0   *   *   ..
   a   b   *   *   ..
```

INSERTED PATTERN

| index | 1 | 2 | 3 | 4 | ... | 25 | 26 | 27 |
|---|---|---|---|---|---|---|---|---|
| GOTO | 1 | 0 | 0 | 1 | ... | 1 | 1 | 1 |
| CHECK | 1 | 0 | 0 | c | ... | x | y | z |
| OUTPUT | 0 | a | b | 0 | ... | | | |

FIG. 25

| index | 1 | 2 | 3 | 4 | ... | 25 | 26 | 27 |
|---|---|---|---|---|---|---|---|---|
| GOTO | 1 | 0 | 0 | 1 | ... | 1 | 1 | 1 |
| CHECK | 1 | <u>a</u> | <u>b</u> | c | ... | x | y | z |
| OUTPUT | 0 | 0 | 0 | 0 | ... | | | |

FIG. 26

| index | 1 | 2 | 3 | 4 | ... | 25 | 26 | 27 | 28 |
|---|---|---|---|---|---|---|---|---|---|
| GOTO | 1 | <u>26</u> | b | c | ... | 1 | 1 | 1 | <u>b</u> |
| CHECK | 1 | a | b | c | ... | x | y | z | <u>b</u> |
| OUTPUT | 0 | 0 | 0 | 0 | ... | | | | |

| index  | 1 | 2  | 3      | 4 | ... | 25 | 26 | 27 | 28 | 29 | 30 | 31 |
|--------|---|----|--------|---|-----|----|----|----|----|----|----|----|
| GOTO   | 1 | 26 | _27_   | 1 | ... | 1  | 1  | 1  |    |    |    |    |
| CHECK  | 1 | a  | b      | c | ... | x  | y  | z  | b  |    | c  | d  |
| OUTPUT | 0 | 0  | 0      | 0 | ... | 0  | 0  | 0  | _01_ |   | _02_ | _03_ |

FIG. 29

|   |   |
|---|---|
| * | * |
| * |   |
| 0 | c |
| 0 | d |
| : | : |
| 0 | # |

FIG. 30

| index  | 1 | 2  | 3  | 4 | ... | 25 | 26 | 27 | 28 | 29 | 30 | 31 | 32 | 33 | ... |
|--------|---|----|----|---|-----|----|----|----|----|----|----|----|----|----|-----|
| GOTO   | 1 | 26 | 27 | 1 | ... | 1  | 1  | 1  | 29 |    |    |    |    |    |     |
| CHECK  | 1 | a  | b  | c | ... | x  | y  | z  | b  |    | c  | d  | c  | d  | #   |
| OUTPUT | 0 | 0  | 0  | 0 | ... |    |    |    | o1 |    | o2 | o3 |    |    |     |

| index | GOTO | CHECK | OUTPUT |
|---|---|---|---|
| 1 | 1 | 1 | 0 |
| 2 | 26 | a | 0 |
| 3 | 27 | b | 0 |
| 4 | 1 | c | 0 |
| ... | ... | ... | |
| 25 | 1 | x | |
| 26 | 1 | y | |
| 27 | 1 | z | |
| 28 | 29 | b | 01 |
| 29 | | | |
| 30 | 5 | c | 02 |
| 31 | d | | 03 |
| 32 | 5 | c | 02 |
| 33 | d | | |
| 34 | : # | | # |
| : | | | |

FIG. 33

| index | 1 | 2 | 3 | 4 | 5 | 6 | ... | 25 | 26 | 27 | 28 | 29 | 30 | 31 | 32 | 33 | 34 | ... |
|---|---|---|---|---|---|---|---|---|---|---|---|---|---|---|---|---|---|---|
| GOTO | 1 | 26 | 27 | 1 | 1 | 1 | : | 1 | 1 | 1 | 29 |  | 5 | 6 | 5 | 6 | 0 | 0 |
| CHECK | 1 | a | b | c | d | e | : | x | y | z | b |  | c | d | c | d | # | # |
| SUBST |  |  |  |  |  |  | : |  |  |  | 01 |  | 02 | 03 | 02 | 03 |  |  |
| LENGTH |  |  |  |  |  |  |  |  |  |  | 2 |  | 2 | 2 | 2 | 2 |  |  |

| SUBST | SYMBOL |
|---|---|
| 01 | aaa |
| 02 | bbb |
| 03 | ccc |

| TEXT OFFSET | POINTER TO SUBST | LENGTH OF CHARACTER STRING TO BE REPLACED |
|---|---|---|
| : : | : : | : : |

F I G. 3 4

| TEXT OFFSET | 0 | 1 | 2 | 3 | 4 |
|---|---|---|---|---|---|
| TEXT | c | a | b | c | z |

FIG. 35

| TEXT OFFSET | POINTER TO SUBST | LENGTH OF CHARACTER STRING TO BE REPLACED |
|---|---|---|
| 1 | POINTER o1 POINTING TO aaa | 2 |
| 2 | POINTER o2 POINTING TO bbb | 2 |

F I G. 3 6

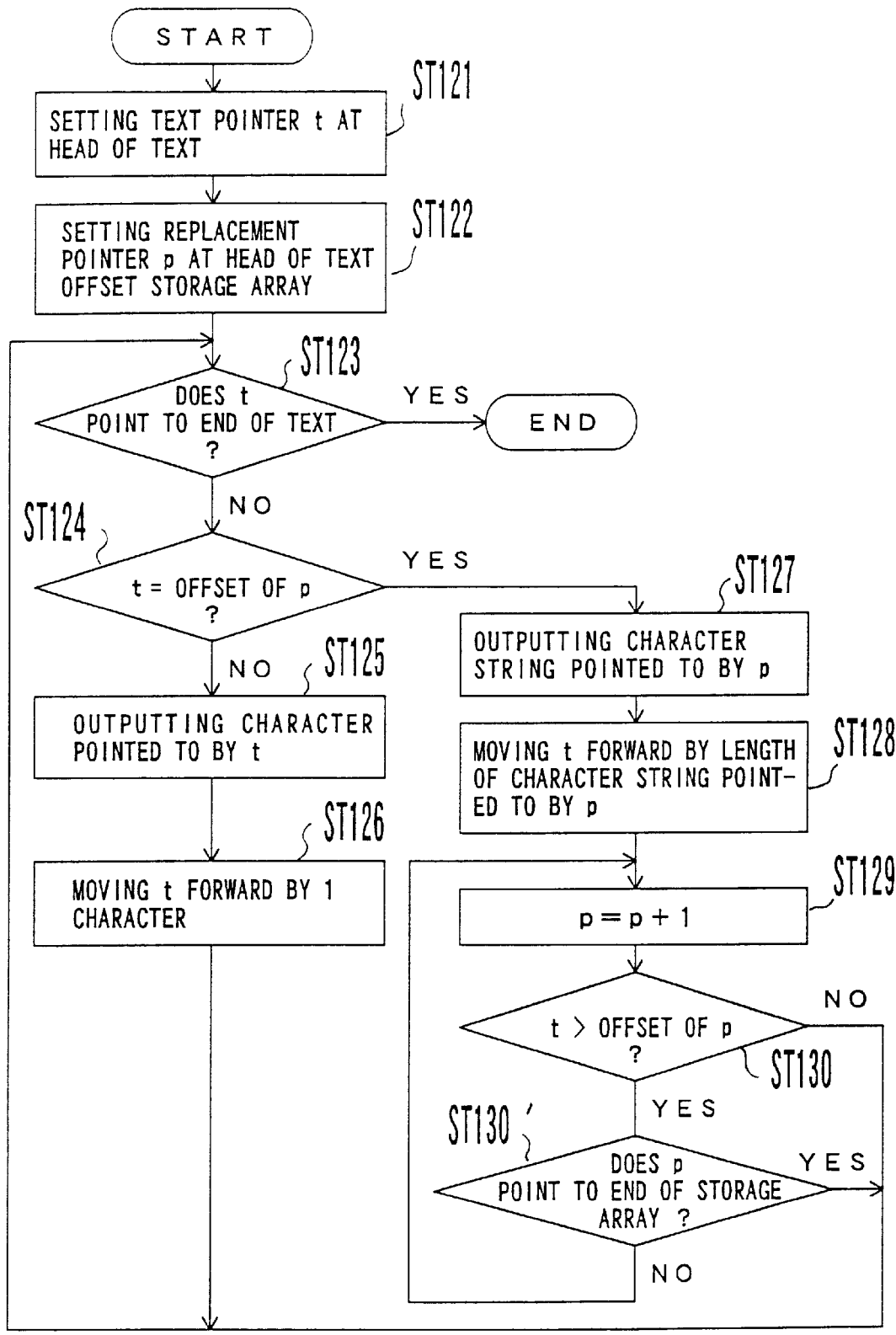
F I G. 3 7

FIG. 38

| STATE NUMBER | default shift | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|---|
| 0 | -4 | -2 | | | | 1 | | | | | | | | -3 | | | | | -1 | -1 | 6 | 2 | | | | | |
| 1 | -4 | 3 | | | | | | | | | | | | | | | | | | | 4 | | | | | | |
| 2 | -5 | | | | | | | | | | | | | | | | | | | | | | | | | | |
| 3 | -6 | | | | | | | | | | | | | | | | | | | | | | | | | | |
| 4 | -7 | | | | | | | | | | | | | | | | | | | | | | | | | | |
| 5 | -8 | -2 | 8 | 9 | | | | | | | | | | | | | | | | | | | | | | | |
| 6 | -5 | 11 | | | | | | | | | | | | | | | | | | | | | | | | | |
| 7 | -5 | | | | | | | | | | | | | | | | | | | 10 | 5 | | | | | | | |
| 8 | -6 | | | | | | | | | | | | | | | | | | | | 7 | | | | | | | |
| 9 | -6 | | | | | | | | | | | | | | | | | | | | | | | | | | |
| 10 | -6 | | | | | | | | | | | | | | | | | | | | | | | | | | |
| 11 | -7 | | | | | | | | | | | | | | | | | | | | | | | | | | |
| 12 | -8 | | | | | | | | | | | | | | 12 | | | | | | | | | | | | |
| 13 | -9 | | | | | | | | | | | | | | | | | | | | 13 | | | | | | |

*FIG. 41*

| CHARACTER CODE | default shift | a | b | c | d | ... | z | # |
|---|---|---|---|---|---|---|---|---|
| INTERNAL CODE | 1 | 2 | 3 | 4 | 5 | ... | 27 | 28 |

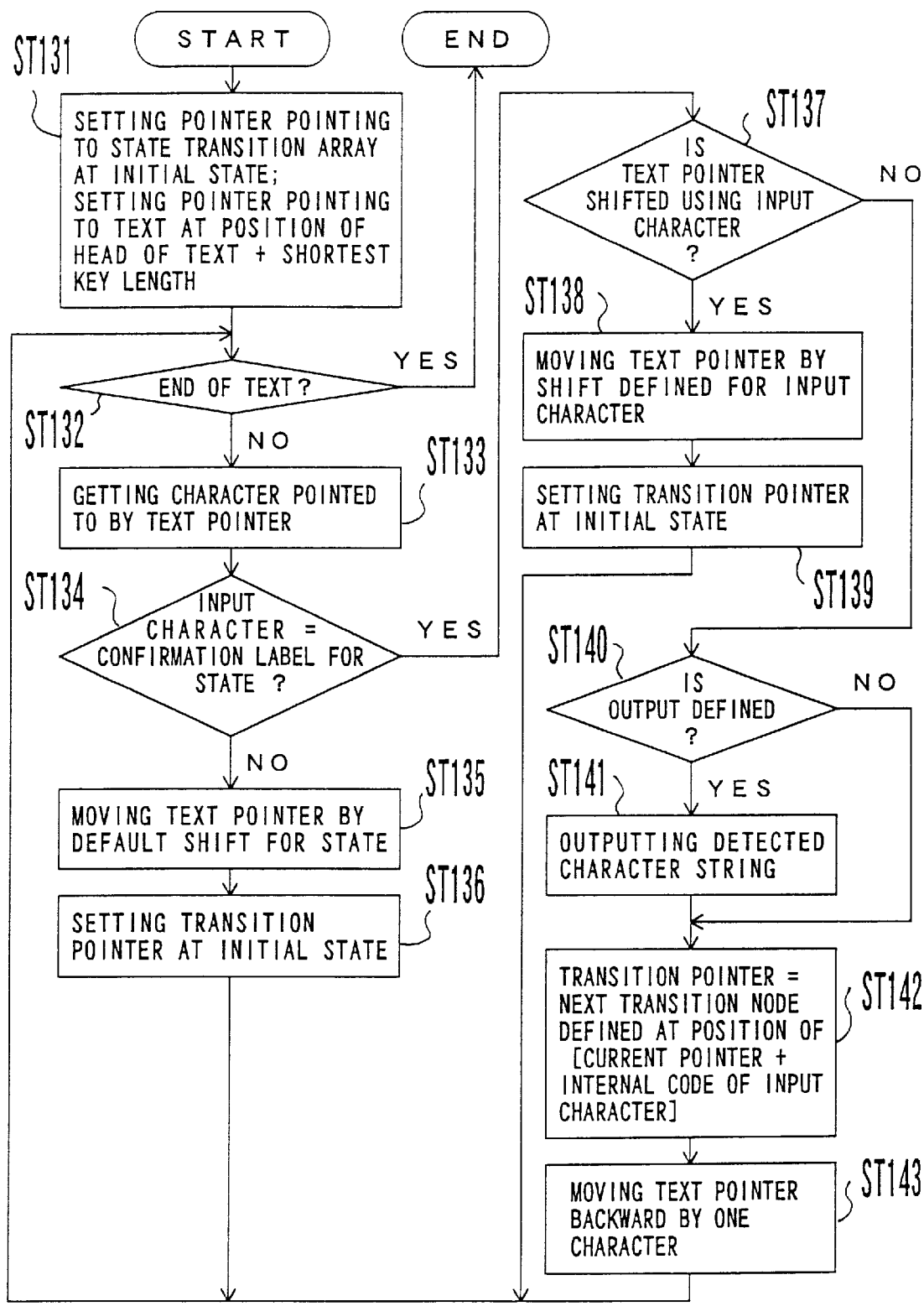
F I G. 4 2

FIG. 43

| STATE (index number) | OPERATION | POSITION OF TEXT POINTER |
|---|---|---|
| initial state 1 | | 1 |
| | CHECK [1+' e] =e<br>GOTO [1+' e] > 0<br>goto next state (3) | |
| 3 | | 3 |
| | CHECK [3+' s] !=s<br>-4 =GOTO [3+1] (default shift)<br>Shift -4✶-1 | |
| 1 | | 1 |
| | CHECK [1+' t] =t<br>GOTO [1+' t] > 0<br>goto next state(7) | |
| 7 | | 7 |
| | CHECK [7+' s] =s<br>GOTO [7+' s] > 0<br>goto next state(8) | |
| 8 | | 8 |
| | CHECK [8+' a] =a<br>GOTO [8+' a] > 0<br>goto next state(13) | |
| 13 | | 13 |
| | CHECK [13+' e] =e<br>GOTO [13+' e] > 0<br>OUTPUT [13+' e] =o1 (east)<br>goto next state(17) | |
| 17 | | 17 |
| | CHECK [17+' s] !=s<br>-6 =GOTO [17+1] (default shift)<br>Shift -7✶-1 | |
| 1 | | 1 |
| | CHECK [1+' e] =e<br>GOTO [1+' e] > 0<br>goto next state(3) | |
| 3 | | 3 |
| | CHECK [3+' t] =t<br>GOTO [3+' t] > 0<br>goto next state(4) | |
| 4 | | 4 |
| | CHECK [4+' a] =a<br>GOTO [4+' a] > 0<br>goto next state(12) | |
| 12 | | 12 |
| | CHECK [12+' t] =t<br>GOTO [12+' t] > 0<br>goto next state(16) | |
| 16 | | 16 |
| | CHECK [16+' s] =s<br>GOTO [16+' s] > 0<br>OUTPUT [13+' e] =o2 (state)<br>goto next state(24) | |
| 24 | | 24 |
| | CHECK [24 +' a] !=a<br>-8 =GOTO [24+1] (default shift)<br>Shift -8✶-1 | |
| 1 | | 1 |
| | CHECK [1+' r] =r<br>GOTO [1+' r] < 0<br>-1 =GOTO [1+' r] (specific shift)<br>Shift -1✶-1<br>End | |
| INPUT TEXT | | a a s e a s t a t e r r r |

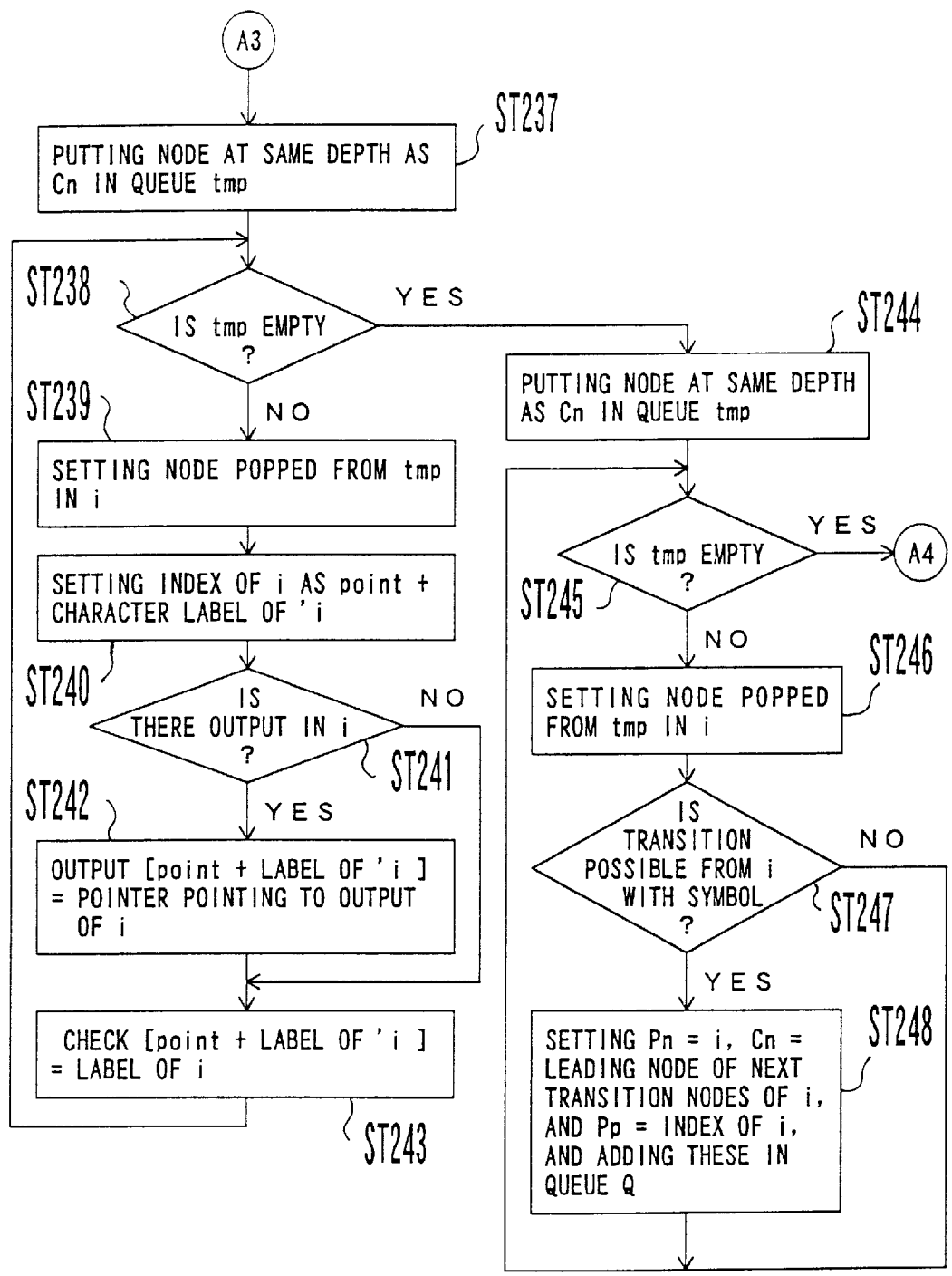
F I G. 5 4

| NODE NUMBER | INPUT SYMBOL AND NODE NUMBER OF NEXT TRANSITION NODE | DEFAULT SHIFT | specific SHIFT |
|---|---|---|---|
| 0 | e:1, t:6 | 4 | a:2,m:3,s:1,r:1 |
| 1 | t:2 | 5 | |
| : | : | : | |

F I G. 5 5

DEFAULT SHIFT   a  ..  e  ..  m  ..  r  s  t  ..

FIG. 56

| index  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | ... | 42 |
|--------|----|----|----|----|----|----|----|----|----|----|----|----|----|----|----|----|----|----|----|----|----|----|----|----|----|----|----|----|----|----|----|----|----|----|----|----|-----|----|
| GOTO   | -4 | -2 | -4 | -5 | 12 | 3  | -5 | -5 | 13 | -6 | 15 | -6 | -3 | -7 | -7 | 17 | -1 | -1 | 17 | -8 | 4  | -8 | 10 | 8  | -9 | 22 | 0  | 0  | 0  | 16 |    |    |    |    | 24 | ... | 27 |
| CHECK  | 1  | a  | l  | l  | a  | e  | l  | l  | a  | l  | a  | l  | m  | i  | l  | l  | e  | r  | s  | t  | t  | t  | r  | s  | l  | m  |    |    |    | t  |    |    |    |    | s  |     | s  |
| SUBST  | o1 |    |    |    |    |    |    |    |    |    |    |    |    |    |    | o1 |    |    |    |    |    |    |    |    |    |    |    |    |    |    |    |    |    |    | o2 |     | o3 |
| LENGTH | 1  |    |    |    |    |    |    |    |    |    |    |    |    |    |    | 4  |    |    |    |    |    |    |    |    |    |    |    |    |    |    |    |    |    |    | 5  |     | 5  |

| SUBST | symbol |
|-------|--------|
| o1    | EAST   |
| o2    | STATE  |
| o3    | SMART  |

F I G. 58

| TEXT OFFSET | 0 | 1 | 2 | 3 | 4 | 5 | 6 |
|---|---|---|---|---|---|---|---|
| TEXT | a | a | s | e | a | s | t |

FIG. 59

| TEXT OFFSET | POINTER TO SUBST | LENGTH OF CHARACTER STRING TO BE REPLACED |
|---|---|---|
| 3 | POINTER o1 TO EAST | 4 |

F I G. 6 0

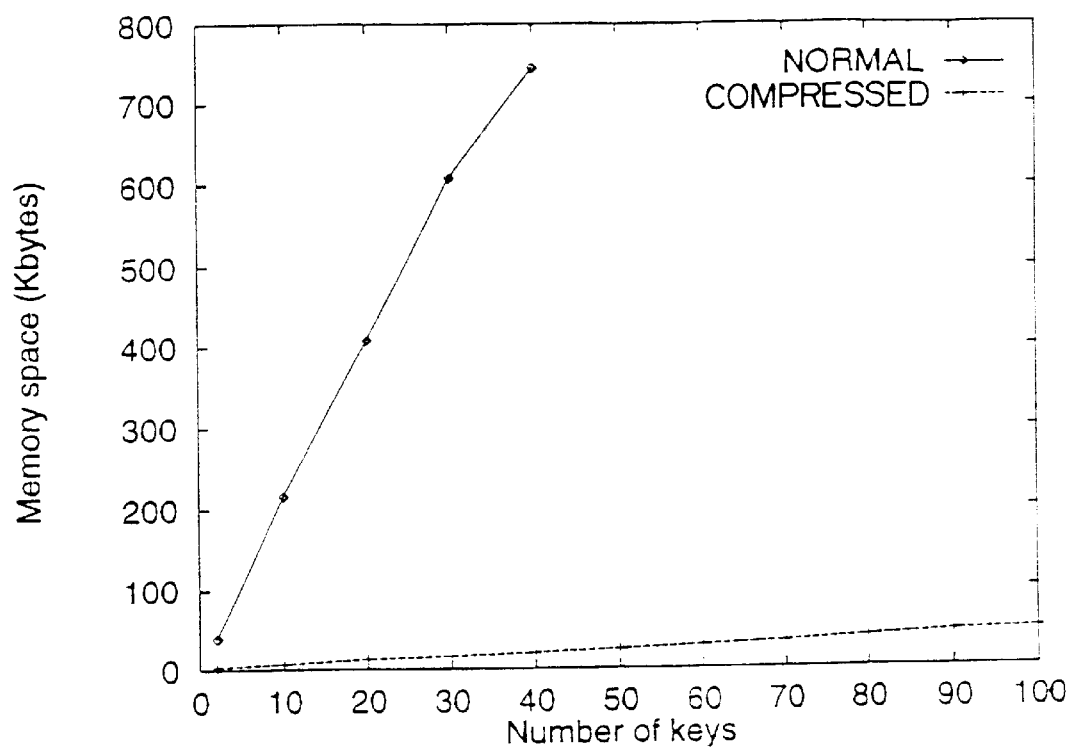
F I G. 63

APPARATUS AND METHOD OF MULTI-STRING MATCHING BASED ON SPARSE STATE TRANSITION LIST

BACKGROUND OF THE INVENTION

1. Field of the Invention

The present invention relates to an apparatus and method, for use in a character string retrieving device, etc., of collectively determining whether or not at least one symbol string exists in data in a given text, etc.

2. Description of the Related Art

Recently, users require a process of collectively determining whether or not symbol strings exist in data in a given text, etc. A symbol string refers to a sequence of characters and other symbols. That is, a character string is a variation of a symbol string. The determination function is often referred to as a multi-string matching or a multi-string retrieval.

Efficient methods used with a conventional multi-string matching apparatus can be the Aho Corasick (AC) method suggested by Aho et al.(A. V. Aho and M. J. Corasick: "Efficient String Matching: An Aid to Bibliographic Search" CACM Vol. 18 No. 6 1975), the method of structuring a Deterministic Finite Automaton (DFA) corresponding to the AC method, and the Flying Algorithm for Searching Terms (FAST) method suggested by Uraya ("High-speed Character String Collating Algorithm FAST" published in Information Processing Academy Publication Vol. 30 No. 9 1989, Japanese Laid-open Patent Publication S64-74619, Japanese Patent Application S62-231091).

Described first are the AC method and the multi-string matching algorithm obtained by formatting the AC method as a DFA.

The AC method collates character strings using deterministic finite automaton called Pattern Matching Machine (PMM).

The collating operation according to the AC method is described as follows.

First, a state number is set to 1 as an initial value. Then, symbols are read character by character from an input text. It is next determined to which state the current state is switched by an input symbol. When a transition is not assigned to the current state using the input symbol, it is assumed that the collation has failed and a transition is directed to a possible state in case of transition failure (a failure state) from the current state. If a transition is not assigned to the possible state using an input symbol, then a transition is directed to a further possible state in case of transition failure.

Since transitions are assigned for all symbols from the initial state 1, the transition failure stops at the initial state at worst. Thus, the transition is repeated for each input symbol from the text. When a symbol string to be accepted is defined for a state, the symbol string and its position in the text are output.

FIG. 1A shows the PMM of the AC method in which three symbol strings {ab, bc, bd} are used as retrieval keys (keys). The PMM shown in FIG. 1A contains 6 states, that is, 1, 2, 3, 4, 5, and 6. Solid line arrows show a next transition state. Broken line arrows show possible states in case of transition failure. "a,b" indicates an input symbol other than a and b. The states 4, 5, 6, (s4, s5, s6) are assigned "ab", "bc", and "bd" as output keywords respectively.

FIG. 1B shows the operations of the PMM responsive to the input symbol string "cabcz". When the symbol c is input, it corresponds to an input symbol other than a and b. Therefore, the next state remains 1 and no output is generated. Next, when the symbol a is input, the current state is switched to the next state 2. When the symbol b is input, it is switched to the next state 4. At this time, the symbol string "ab" defined for the state 4 is output.

However, since the state 4 is not assigned its next transition state, it is temporarily switched to a possible state 3 in case of transition failure when the symbol c is input, and then a next transition state is searched for. Since the state 5 is defined as the next state by the symbol c, the transition is directed to this state and the symbol string "bc" is output. When the symbol z is next input, the transition is directed to the state 1, thereby terminating the entire operation.

Thus, according to the AC method, the transition is repeated each time a transition failure occurs by an input symbol for which the next state is not defined. Therefore, n input symbols bring less than 2n transitions using a finite state machine (finite state automaton). Normally, the probability that the leading character of a key makes a hit increases with an increasing number of keys. Since the number of transition failures increases correspondingly, the collating speed in the AC method gradually becomes slower with the increasing number of keys.

As described above, the process speed of the AC method is slowed by a transition failure for which the next state is not specified. According to the DFA method, a next state is uniquely determined in response to an input symbol. Therefore, n input symbols constantly bring n transitions using a finite state machine and a collation is performed at a high speed. Aho, et. al disclose the method of converting the state transition machine of the AC method into the DFA method.

FIG. 1C shows the finite state machine corresponding to the state transition machine in the AC method in response to the symbol string {ab, bc, bd}. In FIG. 1C, the "state" indicates the current state, and the "next" indicates the next state reached when the symbol in the "input" is entered. States s1, s2, s3, s4, s5, and s6 respectively correspond to states 1, 2, 3, 4, 5, and 6. For example, the representation "]a,b" indicates symbols other than a or b.

FIG. 1D shows the operations for the input symbol string 'cabcz' of the finite state machine. The initial state is 1. No transition failures as shown in FIG. 1B are detected in the state transitions shown in FIG. 1D. The number of state transitions matches the number 5 of the symbols contained in the input symbols "cabcz".

Also in the FAST method known as a high-speed collating method, character strings are collated as in the AC method by preparing a PMM for an input key set. The collating operation according to FAST method is described as follows.

First, the state number is set to 0 as an initial state. The collation start position in the input text is set at a position apart from the beginning of the text by a shortest key length, with the length of the shortest key in an input key set defined as the shortest key length.

Next, data is read character by character from the collation start position to the left on the text. It is determined according to the input symbol to which state the current state is switched. If the transition is not defined, the collation start position is shifted to the right by a predetermined amount corresponding to an input symbol, and then the collation is restarted.

Thus, the text is scanned from right to left as long as the state transition is defined for an input symbol. Then, the pattern of a character string is extracted. When the transition is not defined, the collation start position is shifted to right in the text by the amount of shift defined for the input symbol.

FIG. 2A shows the PMM of the FAST method in which three symbol strings {state, east, smart} are used as retrieval keys. The PMM shown in FIG. 2A comprises 14 states, that is, 0, 1, 2, 3, 4, 5, 6, 7, 8, 9, 10, 11, 12, and 13. Solid line arrows indicate a transition direction, and broken line arrows indicate a shifted direction.

A state transition is defined in reverse order of the sequence of symbols contained in each retrieval key. The "Depth" indicates the depth of each state of the PMM. For the states 5, 9, and 13 (S5, S9 and S13), the symbol strings "state", "east", and "smart" are respectively defined as output keywords.

FIG. 2B is a table showing next transition states and the amount of shift when a symbol is input to each state of the PMM. In FIG. 2B, the number in the first row indicates the state number, and the symbol in the first column indicates an input symbol. The "(Other)" indicates an input symbol other than a, e, m, r, s, and t. On this table, a positive number element indicates the state number of a next transition state corresponding to the input symbol. A negative number element indicates the amount of a shift obtained through a corresponding input symbol.

FIG. 2C shows the operation of the PMM corresponding to the input symbol string 'aaseastate'. The initial state is 0. In this case, "east" is the shortest symbol string of the symbol strings "state", "east", and "smart". Since its length is 4 characters, the shortest key length is 4. Thus, a collation process is performed from right to left with the position t the shortest key length of 4 characters away from the rightmost point of the input symbol string defined as a collation start position.

If the collation process fails, then an absolute value of the amount of the shift is calculated by multiplying the amount of the shift defined for the input symbol by −1, and the collation start position is shifted to the right by the resultant amount. Then, the state number is set to 0 and the collation is resumed.

When the symbol t is entered at the initial state 0 written at the position of the symbol t of the input symbol string shown in FIG. 2C, a transition is directed to the state 6 according to the table of FIG. 2B. When the symbol s is input, a transition is directed to the state 7. Next, when the symbol a is input, a transition is directed to the state 8. When the symbol e is input, a transition is directed to the state 9 and the symbol string "east" defined for the state 9 is output.

When the symbol s is input next, the collation start position is shifted to the right by 7 because—7 is set in the state 9 as the amount of a shift instead of a next transition state. Then, control is returned to the initial state 0 and the collation is resumed with the position of the symbol e after a shift operation as a new collation start position. The collation process continues as described above, and the symbol string "state" is output when a transition is directed to the state 5.

The above described process of retrieving multiple character strings is performed for a database, a word processor, and a device such as a full-text search device, etc.

A full-text search device refers to an apparatus for retrieving a character string to check whether or not a retrieval result is correct when data is retrieved using a full-text search index. A full-text search index refers to an index for use in a retrieval process through which returned data is not always a correct answer to a key word containing an input index such as a signature file, an inverted file having no word appearance positions in text, etc.

For example, assume that a keyword 'John Smith' is retrieved from an English index. Since an index is a collection of words delimited by a space, 'John Smith' is equal to 'John AND Smith'. However, if a document is searched with a search condition of 'John AND Smith', the retrieval result also contains 'John' and 'Smith' which appear separately, thereby obtaining excess results. In this case, whether or not the result is correct can be checked by retrieving a character string.

A problem with the above described conventional character string collating method arises in a speed-capacity relation in a portion corresponding to the state transition of the PMM.

In the AC method, the storage capacity can be reduced using a list structure to represent a state transition portion. However, pointers should be sequentially traced in the list structure, and therefore data are slowly accessed and the collating operation is performed at a lower speed.

Although the collation speed of the DFA-processed AC method is high, the table structure as shown in FIG. 1C should be used to indicate all state transitions defined for all input symbols. However, this requires a considerable storage capacity.

Assume that there are 256 (8-bit code) types of input symbols with the number N of states and 4-byte pointers. In a table form, a state requires 256 pointers to the next state, one pointer to a possible state in case of transition failure, and one pointer to an output symbol string. Therefore, a storage capacity of N×(256+1+1)×4 bytes is required.

Normally, since the number of states N increases with the number of retrieval keys, a required storage capacity becomes large when the number of keys is large. Therefore, it is not practical to design a character string collating device based on the DFA processed AC method.

Since the state transition or shift is similarly defined for all input symbols in the FAST method, the table structure as shown in FIG. 2B is required. Therefore, with the configuration of the character string collating apparatus based on the FAST method, a considerably large storage capacity is also required.

SUMMARY OF THE INVENTION

The present invention aims at providing an apparatus and method of matching multiple symbol strings, capable of collating data at a high speed using a storage capacity of a practical size.

The collating apparatus according to the present invention is used in an information processing device for determining, using a finite state machine, whether or not a key of a given symbol string exists in a file. The apparatus comprises a state transition storage unit and a collating unit.

The state transition storage unit stores a sparse state transition table indicating the collating operation relating to at least one key in a compressed array format, in which data indicating a predetermined operation are reduced.

For example, when a state transition table is produced based on the DFA-processed AC method, the amount of information in the state transition table is reduced by removing from the conventional state transition table at least one of data indicating the transition from the current state to the initial state and next state to the initial state and by adding a failure check.

When a state transition table is generated based on the FAST method, the amount of information in the state transition table is reduced by merging shift processes for different input symbols whose shift values are same.

Thus, the portion in the state transition table from which the data is removed becomes sparse, thereby producing a state transition table having elements in a sparse format. A compact finite state machine can be obtained by storing a sparse state transition table after compressing and arranging it in an array format, thereby considerably reducing the storage capacity.

Since the state transition table in a compressed array format can be fundamentally generated based on the DFA state transition table, a check is required as to whether or not the transition, etc. is defined. However, only one transition process should be performed each time a symbol is input from a file, thereby maintaining the high speed of the DFA.

The collating unit performs a process corresponding to each symbol contained in the file by referring to the above described sparse state transition table, and collates a symbol string in the file with the above described at least one key.

A file to be used in collation can be a file containing arbitrary symbol strings such as a document file described in a text format, a file in which voice data is converted into digital codes, etc.

BRIEF DESCRIPTION OF THE DRAWINGS

FIG. 1B shows an example of the operation performed in the AC method;

FIG. 1C shows the DFA of the AC method;

FIG. 1D shows an example of the operation of the DFA of the AC method;

FIG. 2B shows the transition and shift of the FAST method;

FIG. 2C shows an example of collation in the FAST method;

FIG. 3 shows the principle of the collating apparatus according to the present invention;

FIG. 8 shows the first state transition table after compression;

FIG. 9 shows the first character code conversion table;

FIG. 10 is a flowchart showing the first collating process;

FIG. 11 shows the first collating operation;

FIG. 17 shows an example of a failure calculation;

FIG. 22 shows the first array;

FIG. 23 shows the first pattern;

FIG. 24 shows the second array;

FIG. 25 shows the third array;

FIG. 26 shows the fourth array;

FIG. 27 shows the second pattern;

FIG. 28 shows the fifth array;

FIG. 29 shows the third pattern;

FIG. 30 shows the sixth array;

FIG. 31 shows the fourth pattern;

FIG. 32 shows the seventh array;

FIG. 33 shows the first state transition table for substitution of character strings;

FIG. 34 shows a text offset storage array;

FIG. 35 shows the text offset of the first text;

FIG. 36 shows the first text offset storage array after a pattern collation;

FIG. 37 is a flowchart showing the substitution process;

FIG. 38 shows the second state transition table before compression;

FIG. 41 shows the second character code conversion table;

FIG. 42 is a flowchart showing the second collating process;

FIG. 43 shows the second collating operation;

FIG. 54 is a flowchart (2) showing the second converting process;

FIG. 55 shows the information from the binary tree;

FIG. 56 shows the fifth pattern;

FIG. 58 shows the second state transition table for substitution of character strings;

FIG. 59 shows the text offset of the second text;

FIG. 60 shows the second text offset storage array after a pattern collation;

FIG. 63 shows a change in the memory requirement in the FAST method.

DESCRIPTION OF THE PREFERRED EMBODIMENTS

The preferred embodiments of the present invention are described below in detail by referring to the attached drawings.

FIG. 3 shows the principle of the collating apparatus according to the present invention. The collating apparatus shown in FIG. 3 is used in an information processing device for determining, using a finite state machine, whether or not a key of a given symbol string exists in a file. The apparatus comprises a state transition storage unit 1 and a collating unit 2.

The state transition storage unit 1 stores a sparse state transition table indicating the collating operation relating to at least one key in a compressed array format, in which data indicating a predetermined operation are reduced.

The collating unit 2 performs a process corresponding to each symbol contained in the file by referring to the above described compressed sparse state transition table, and collates a symbol string in the file with the above described at least one key.

For example, when a state transition table is produced based on the DFA-processed AC method, the amount of information in the state transition table is reduced by removing from the conventional state transition table at least one of data indicating the transition from the current state to the initial state and next state to the initial state.

When a state transition table is generated based on the FAST method, the amount of information in the state transition table is reduced by merging shift processes for different input symbols whose shift values are same. Here, the shift process means an operation of returning the collation position in the above described file in the opposite direction to the collation direction.

Thus, the portion in the state transition table from which the data is removed becomes sparse, thereby producing a state transition table having elements in a sparse format. A compact finite state machine can be obtained by storing a sparse state transition table after compressing and arranging it in an array format, thereby considerably reducing the storage capacity.

Since the state transition table in a compressed array format can be fundamentally generated based on the DFA state transition table, a check is required as to whether or not the transition, etc. is defined. However, only one transition process should be performed each time a symbol is input from a file, thereby maintaining the high speed of the DFA.

A file to be used in collation can be a file containing optional symbol strings such as a document file described in a text format, a file in which voice data is converted into digital codes, etc.

Figure 5:
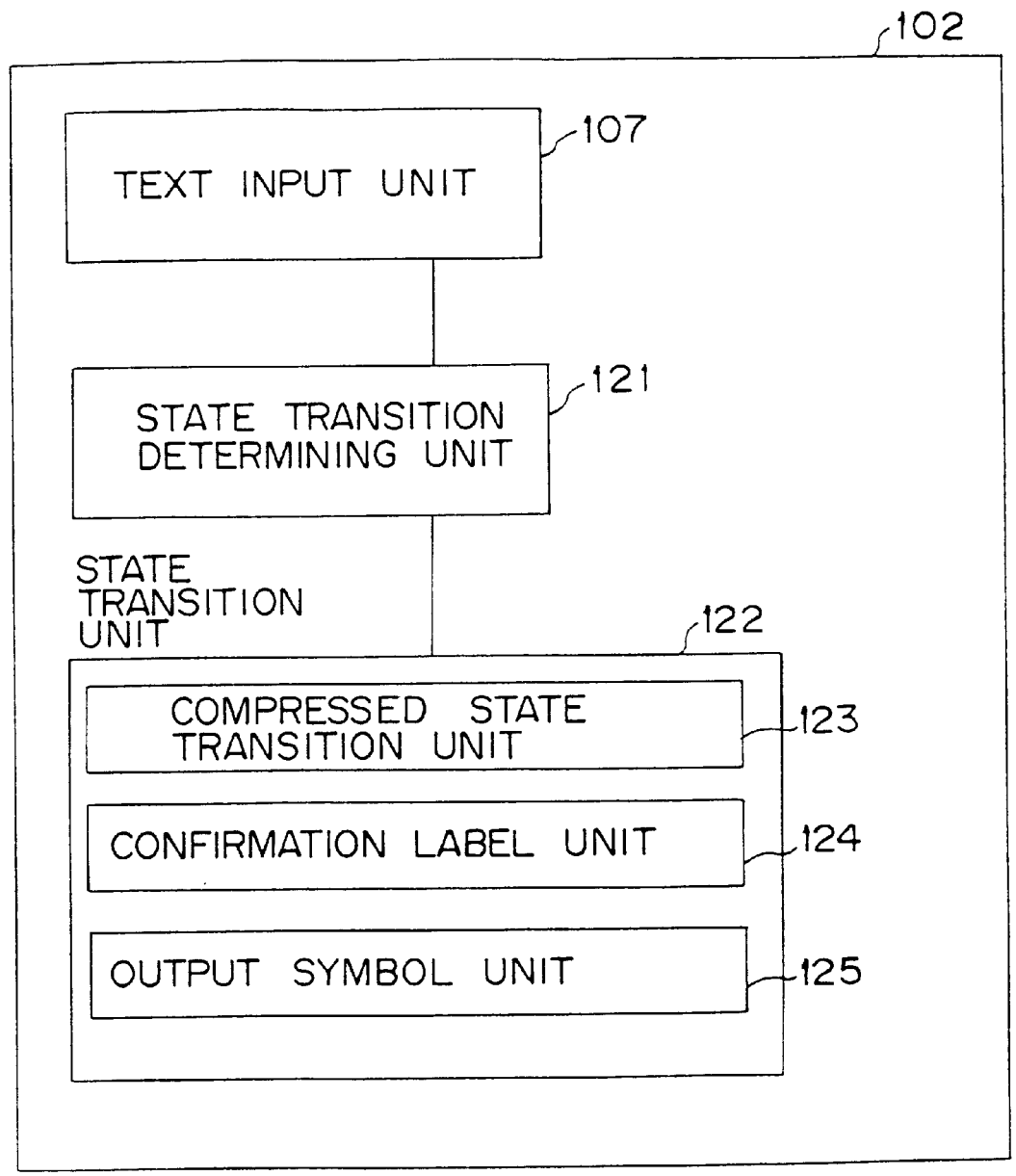
FIG. 5 shows the configuration of the collating apparatus.

For example, the state transition storage unit 1 shown in FIG. 3 corresponds to a state transition unit 122 and the collating unit 2 corresponds to a state transition determining unit 121, as shown in FIG. 5.

Figure 4A:
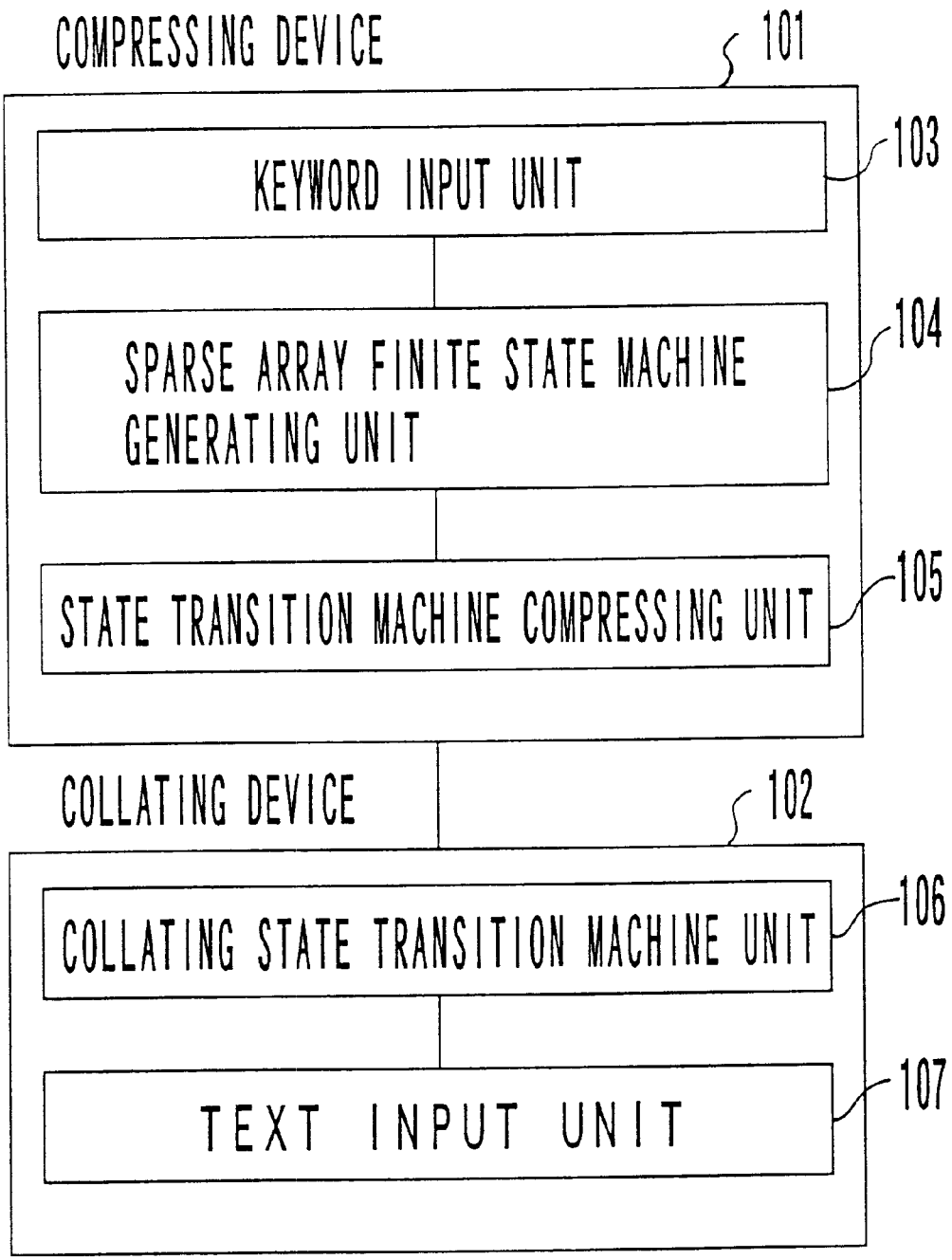
FIG. 4A shows the configuration of the collating system.

FIG. 4A shows the configuration of the collating system according to the present invention. The collating system shown in FIG. 4A comprises a compressing device 101 and a collating device 102. The compressing device 101 comprises a keyword input unit 103, a sparse array finite state machine generating unit 104, and a state transition machine compressing unit 105. The collating device 102 comprises a collating state transition machine unit 106 and a text input unit 107.

The keyword input unit 103 receives a keyword group input as retrieval objects. In response to the input keyword group, the sparse array finite state machine generating unit 104 produces on a binary tree a finite state machine for character string collation as an intermediate structure. This finite state machine becomes sparse in an array format. A sparse array refers to an array containing few elements. The state transition machine compressing unit 105 converts the intermediate structure generated by the sparse array finite state machine generating unit 104 into a compressed array format for high speed collation.

The collating state transition machine unit 106 collates the text input from the text input unit 107 with the keyword group using the finite state machine in the compressed array format.

Figure 4B:
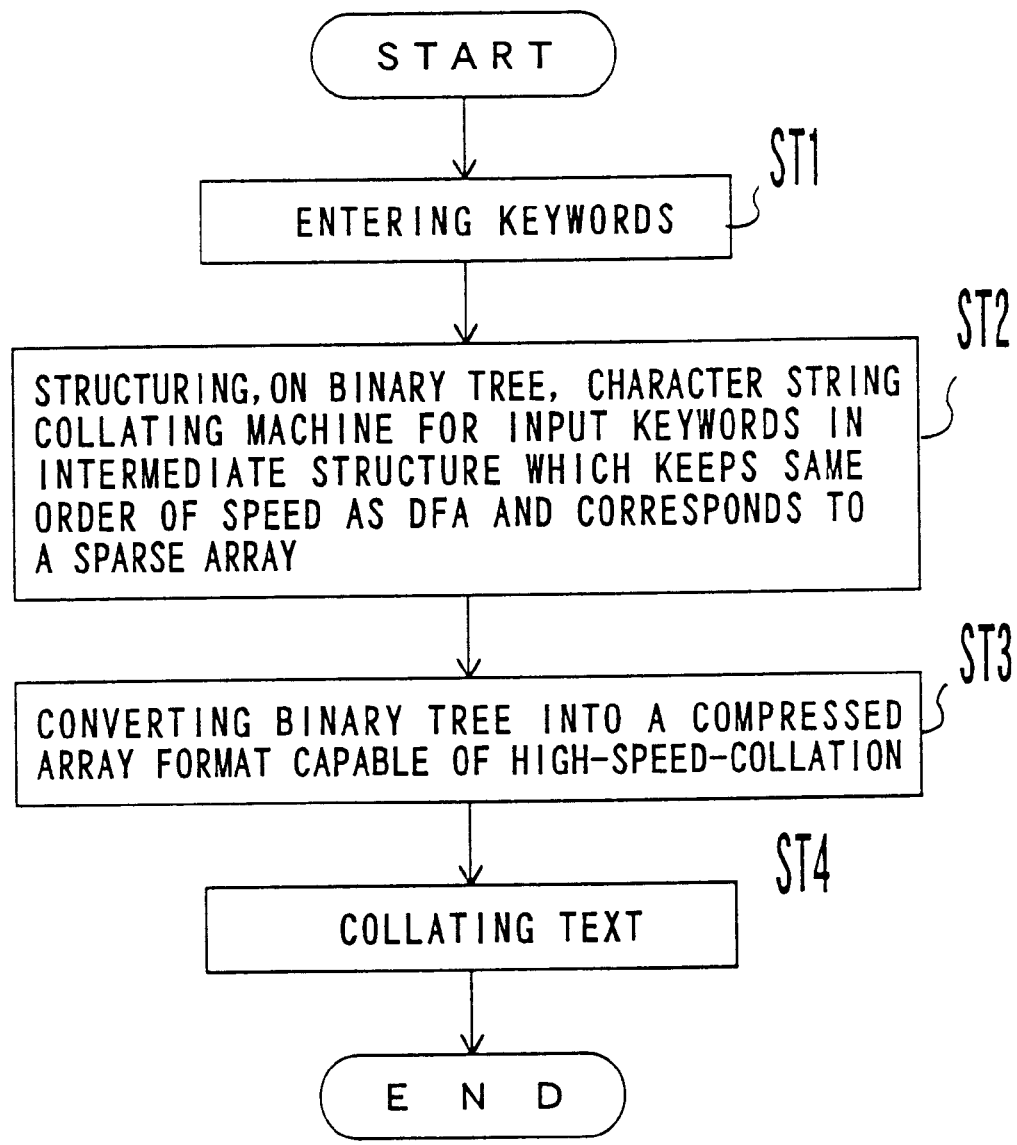
FIG. 4B is a flowchart showing the operation of the collating system.

FIG. 4B is a flowchart showing the operations of the collating system shown in FIG. 4A. When the process starts as shown in FIG. 4B, the keyword input unit 103 receives a keyword group for retrieval (step ST1).

Then, in response to the input keywords, the sparse array finite state machine generating unit 104 produces on the binary tree a character string collating machine having a same order of collation speed as the DFA and having an intermediate structure corresponding to a sparse array (step ST2). A character string collating machine working on the binary tree collates data at a low speed, but an element can be easily added and inserted using this machine.

The state transition machine compressing unit 105 converts the character string collating machine on the binary tree into a compressed array format in which a collating process can be performed at a high speed (step ST3). At this time, the portion containing elements in an array is provided with a confirmation label and a collating array can be generated by arranging arrays in such a way that the portions of existing elements of each array do not overlap each other.

In response to the input text, the collating state transition machine unit 106 collates the data using a finite state machine in an array format (step ST4).

In response to the input keyword group for retrieval, a character string collating apparatus capable of collating data at a high speed with a reduced storage capacity can be produced by generating a finite state machine having a similar relative collation speed to the DFA-processed AC method and the array-implemented FAST method and having a compressed sparse array format.

The method of producing the above described character string collating apparatus can be summarized as follows.

A character string collating machine is produced as an intermediate structure on a binary tree capable of easily inserting and adding elements without a storage capacity problem. The intermediate structure is converted into a compressed array format in which collation is compactly performed at a high speed. At this time, the array can be compressed by assigning an element confirmation label to a corresponding element and by arranging elements without overlap.

Figure 4C:
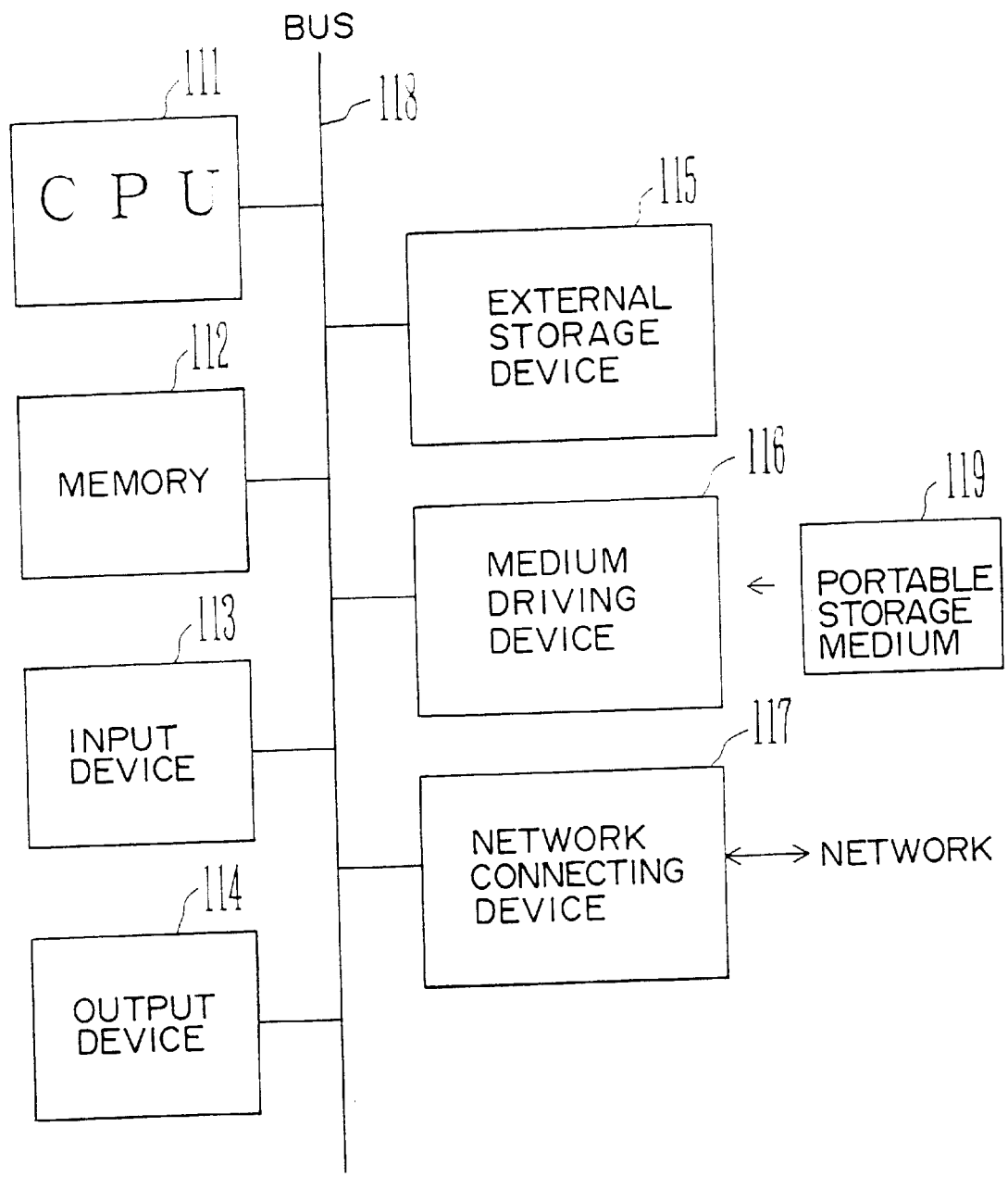
FIG. 4C shows the configuration of the information processing device.

FIG. 4C shows the configuration of the information processing device for realizing the collating system shown in FIG. 4A. The information processing device shown in FIG. 4C comprises a central processing unit (CPU) 111, a memory 112, an input device 113, an output device 114, an external storage device 115, a medium driving device 116, and a network connecting device 117. Each of the devices is interconnected by a bus 118.

The CPU 111 executes a program stored in the memory 112 and realizes the processes of the compressing device 101 and collating device 102. The memory 112 can be, for example, read only memory (ROM), random access memory (RAM), etc.

The input device 113 corresponds to, for example, a keyboard, a pointing device, etc. and is used to input a user's request and an instruction. The output device 114 corresponds to a display device, a printer, etc. and outputs a state transition machine, collation result, etc.

The external storage device 115 can be, for example, a magnetic disk device, an optical disk device, a magneto-optical disk device, etc., and stores a program and data. It also functions as database storing a keyword and text.

The medium driving device 116 drives a portable storage medium 119 and can access the data stored therein. The portable storage medium 119 can be an arbitrary computer-readable storage medium such as a memory card, a floppy disk, compact disk read only memory (CD-ROM), an optical disk, a magneto-optical disk, etc. The portable storage medium 119 stores a program for performing processes of the collating system shown in FIG. 4A in addition to the data such as a keyword, text, etc.

The network connecting device 117 is connected to an arbitrary communications network such as a local area network (LAN), etc. and converts communications data. The collating system receives necessary data and programs from an external database, etc. through the network connecting device 117.

The first embodiment based on the DFA-processed AC method is described below by referring to FIGS. 5 through 37.

If a collation fails in the table structure in the DFA-processed AC method without defining the transition to the initial state and the transition to the next state to the initial state according to the first embodiment of the present invention, then a state transition machine redefines a transition from the initial state.

Thus, there is no need to store the transition to the initial state if a transition to the initial state is automatically directed when no transition is defined. Since the transition to the next state to the initial state is necessarily attained from the initial state, there is no need to store it either. Omitting the definition of the transition considerably reduces the number of elements in the DFA state transition table, thereby obtaining a sparse state transition table.

Next, the state transition machine is converted into an array format and arrays for individual transitions are superposed such that transition defined portions do not overlap each other. Simultaneously, a character with a definition of a transition is attached the character as a label, which is used to check whether an input character is included in the array format.

A compressed state transition table in an array format is generated from an intermediate format of a binary tree. This binary tree represents a sparse transition table, and reduces a used storage capacity.

FIG. 5 shows the configuration of the collating device 102 shown in FIG. 4A. In FIG. 5A, the state transition determining unit 121 and state transition unit 122 correspond to the collating state transition machine unit 106. The text input unit 107 extracts each symbol from an object text, and the state transition determining unit 121 determines to which state a transition is directed with an input symbol.

The state transition unit 122 corresponds to, for example, the memory 112, and comprises a compressed state transition unit 123, a confirmation label unit 124, and an output symbol unit 125. The compressed state transition unit 123 stores a state transition table in a compressed array format. The confirmation label unit 124 stores a label for use in confirming whether or not a transition is defined with the compression. The output symbol unit 125 defines a symbol string to be output when a specified state is accessed.

Figure 1A:
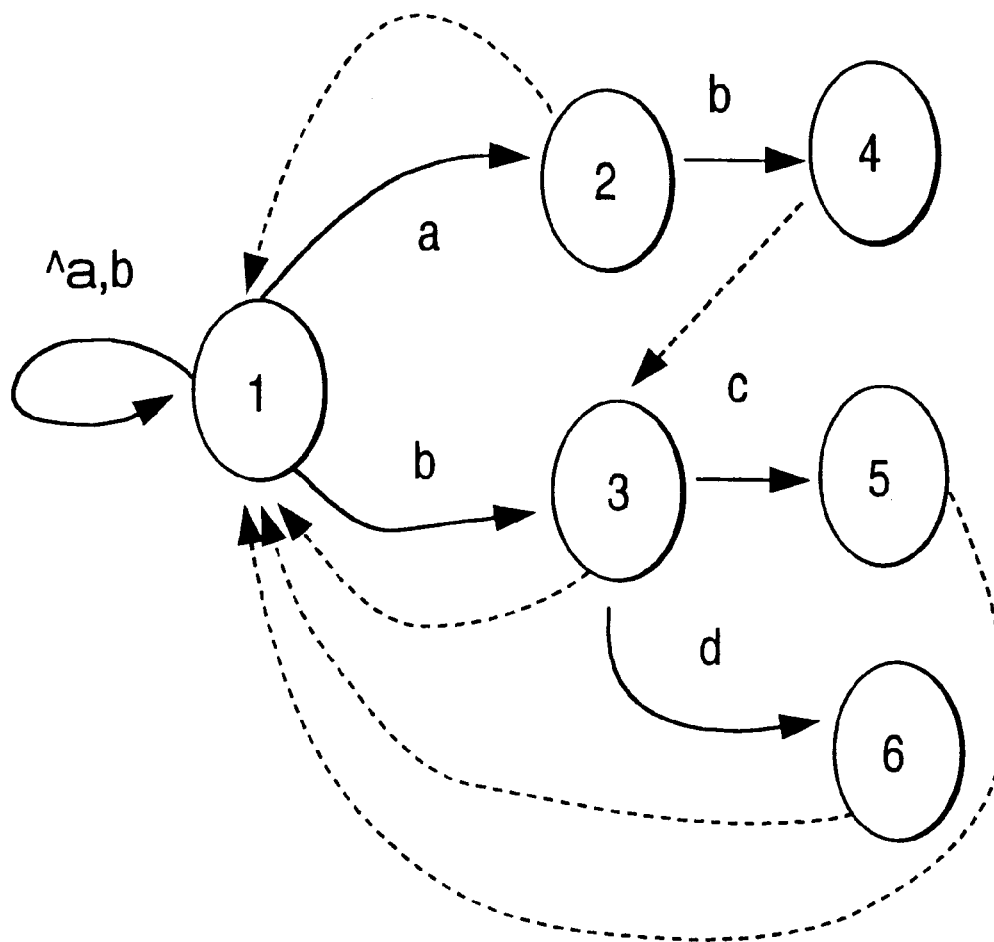
FIG. 1A shows an example of a pattern matching machine in the AC method.
Figure 6:
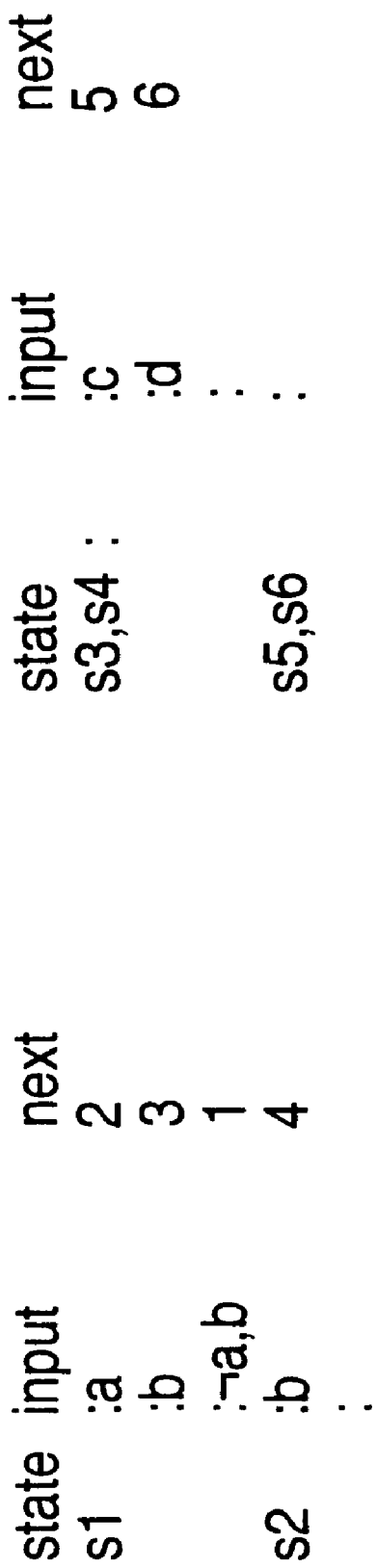
FIG. 6 shows the first state transition table before compression.

FIG. 6 shows the first state transition table before the compression when the three symbol strings {ab, bc, bd} are input keywords. In comparing this table with the table shown in FIG. 1C, the transition to the initial state s1 and the transitions to the states s2 and s3 after the initial state s1 are removed from among the transitions in the states s2, s3, s4, s5, and s6 shown in FIG. 1C.

Figure 7:
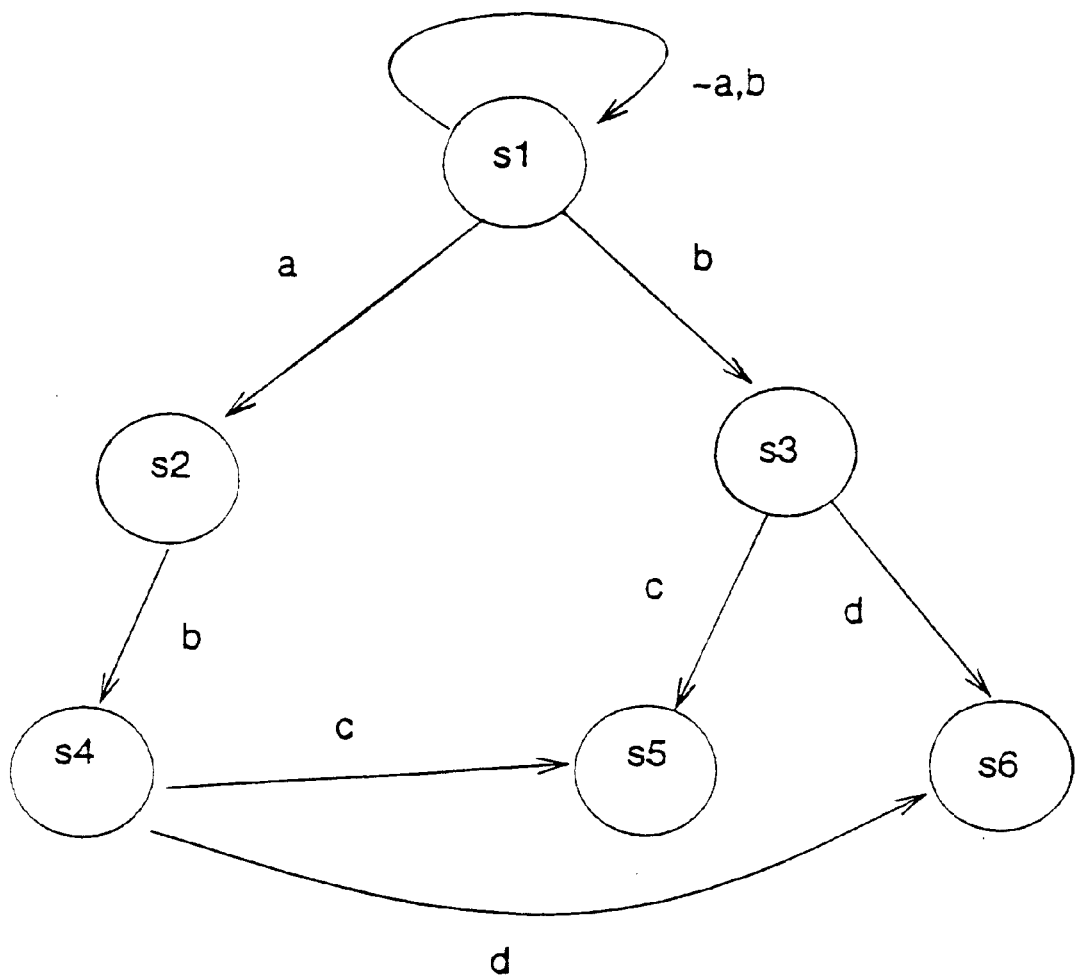
FIG. 7 shows the first state transition.

FIG. 7 shows the transition corresponding to each input symbol defined in the state transition table shown in FIG. 6. In FIG. 7, "~ a, b" indicates an input symbol other than a and b.

FIG. 8 shows a collation array obtained by compressing the state transition table shown in FIG. 6. In FIG. 8, "index" indicates a subscript in an array. "GOTO" indicates a superposed state transition table stored in the compressed state transition unit 123. "CHECK" indicates a confirmation label stored in the confirmation label unit 124. "OUTPUT" indicates the array of the pointers stored in the output symbol unit 125. These pointers o1, o2, and o3 indicate output character strings ab, bc, and bd stored in the state transition unit 122.

The element "#" of the array CHECK indicates a termination symbol. The states s1 through s6 described at the lower part of the array shown in FIG. 8 indicate each of the overlapping states shown in FIG. 6. The symbols a, b, etc. indicate the storage positions of the next state after transition corresponding to the input symbol shown in FIG. 6.

FIG. 9 shows the first character code conversion table for use in explanation of the first embodiment of the present invention. According to the character code conversion table, character codes are converted into internal codes. In this example, the character code ranges from alphabetical a to z. However, any other optional symbols such as numbers, etc. are applicable.

A collating process according to the first embodiment of the present invention is explained by referring to FIGS. 10 and 11.

FIG. 10 is a flowchart showing the character string collating process based on the AC method. When the process starts, the state transition determining unit 121 sets a text pointer indicating an input text at the start of the input text, and sets a transition pointer indicating the state transition array in the state transition unit 122 as the initial state position (step ST11). Then, it is checked whether or not the text pointer points to the end of the text (step ST12). If the text pointer points to the end of the text, then the collation terminates.

Unless the text pointer points to the end of the text, the character pointed to by the pointer is retrieved (step ST13) and the value of the internal code corresponding to the character is added to the value of the transition pointer. Then, it is checked whether or not the character matches the character label stored at the position specified by the sum as an index (step ST14).

Unless these data match each other, no transition is defined for the input character. At this time, the internal code of an input character is added to the pointer to the initial state, and a next transition state specified at the position indicated by the sum as an index is defined as a new transition pointer (step ST15).

If the label matches the input character in step ST14, then it is checked whether or not the output character string is defined for a state (step ST16).

Unless an output character string is defined, an internal code of an input character is added to the current transition pointer, and a next transition state specified at the position indicated by the sum as an index is defined as a new transition pointer (step ST18). Then, the text pointer is incremented by one character (step ST19), and the processes in and after step ST12 are repeated.

If an output character string is defined, the character string is output as a collation result (step ST17), and the processes in and after step ST18 are performed. In step ST17, the value of the current text pointer can be output as the position of the collated character string.

FIG. 11 shows the collating operation in response to the input text 'cabcz' when the state transition array shown in FIG. 8 is used. In FIG. 11, "'c'", etc., for example, indicates the value of an internal code corresponding to the character c, etc.. GOTO[x] indicates the number of the next transition state specified at the position of index x. CHECK[x] indicates the label stored at the position of index x. OUTPUT[x] indicates the output pointer stored at the position of index x. In this example, the collation is performed as follows.

In FIG. 8, the initial state corresponds to the position of index=1. The initial input symbol is c (step ST13 in FIG. 10). In the initial state, the next transition states are defined for all input symbols. Therefore, as indicated by (*1) in FIG. 11, the check in step ST14 is omitted, and control is passed to the process in step ST16. Since no output is defined, the process in step ST17 is not performed.

In response to the input symbol c, c=3 is obtained by referring to the conversion table shown in FIG. 9. Thus, the result of GOTO [1+3]=GOTO [4] is defined as the next transition state. In FIG. 8, the next transition state specified at the position of the index 4 is 1. Thus, GOTO [4]=1 is obtained. As a result, the initial state corresponding to index 1 is accessed again (step ST18).

When a collating operation is similarly performed in response to the input symbol a, GOTO [1+'a]=26 is obtained, thereby transferring control to the state starting from index 26 (step ST18).

Upon receipt of the input symbol b, the array CHECK is accessed and it is checked whether or not a transition is defined (step ST14). When 'b=2 is added to the value 26 of the current transition pointer, index 28 is obtained. Since the label stored at the position of index 28 is b, CHECK [26+'b]=b is obtained. This indicates that a transition is defined in response to the input signal.

Since the output signal string ab is defined in the OUT-PUT [26+'b], it is output (step ST17). The next transition state is GOTO [26+'b]=29.

Next, a similar process is performed in response to the input symbol c, a symbol string bc is output, and a transition is made to the position of GOTO [29+'C]=5.

When a similar process is performed in response to the last input symbol z, the transition from the state of index 5 fails because CHECK [5+'Z] is not z. The transition for symbol z is defined as the transition from the initial state. As a result, the transition pointer is GOTO [1+'Z]=1 (STEP ST15) with the text completed, thereby completing the collating operation.

Thus, the symbol strings ab and bc contained in the input text are output as collating results.

Figure 12:
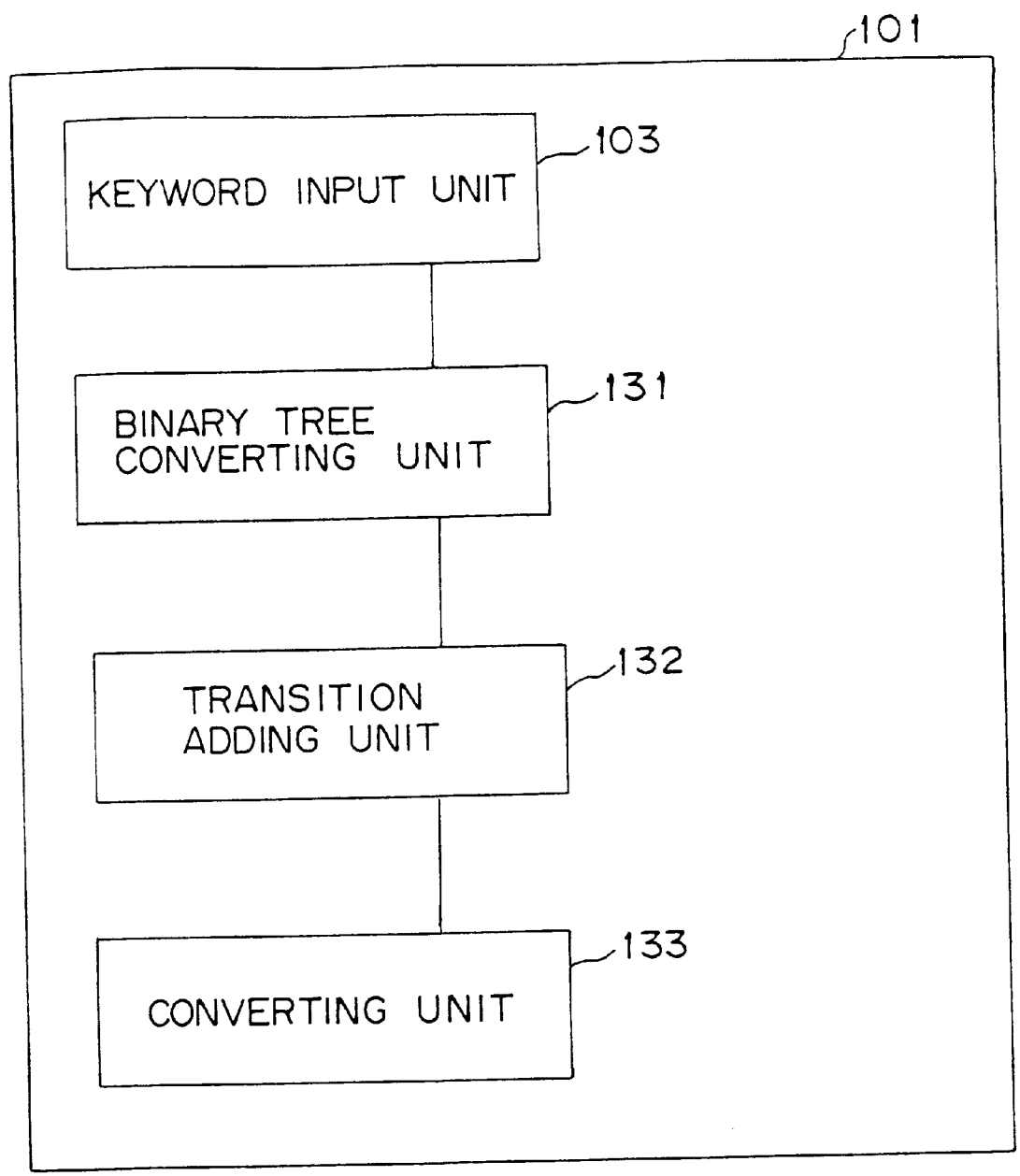
FIG. 12 shows the configuration of the first compressing device.

Described next is the method of generating a state transition array used in collation. FIG. 12 shows the first configuration of the compressing device 101 shown in 4A. In FIG. 12, a binary tree converting unit 131 and a transition adding unit 132 correspond to the sparse array finite state machine generating unit 104. A converting unit 133 corresponds to the state transition machine compressing unit 105.

The keyword input unit 103 receives a specified keyword group. The binary tree converting unit 131 converts the received keyword group in the direction from the left to the right of each key into a binary tree structure. The transition adding unit 132 adds transitions to the initial state and next states to it of a case where the collation has failed. The converting unit 133 converts the binary tree structure output by the transition adding unit 132 into a compressed array format.

The procedure of generating an array for the above described collation comprises the processes of generating a binary tree from an input keyword group, adding a possible node in case of transition failure (a failure node) to the node of the resultant binary tree, adding a gotoin/gotoout node list defining a possible direct transition among failure transitions, and converting the finally obtained binary tree into an array format.

Figure 13:
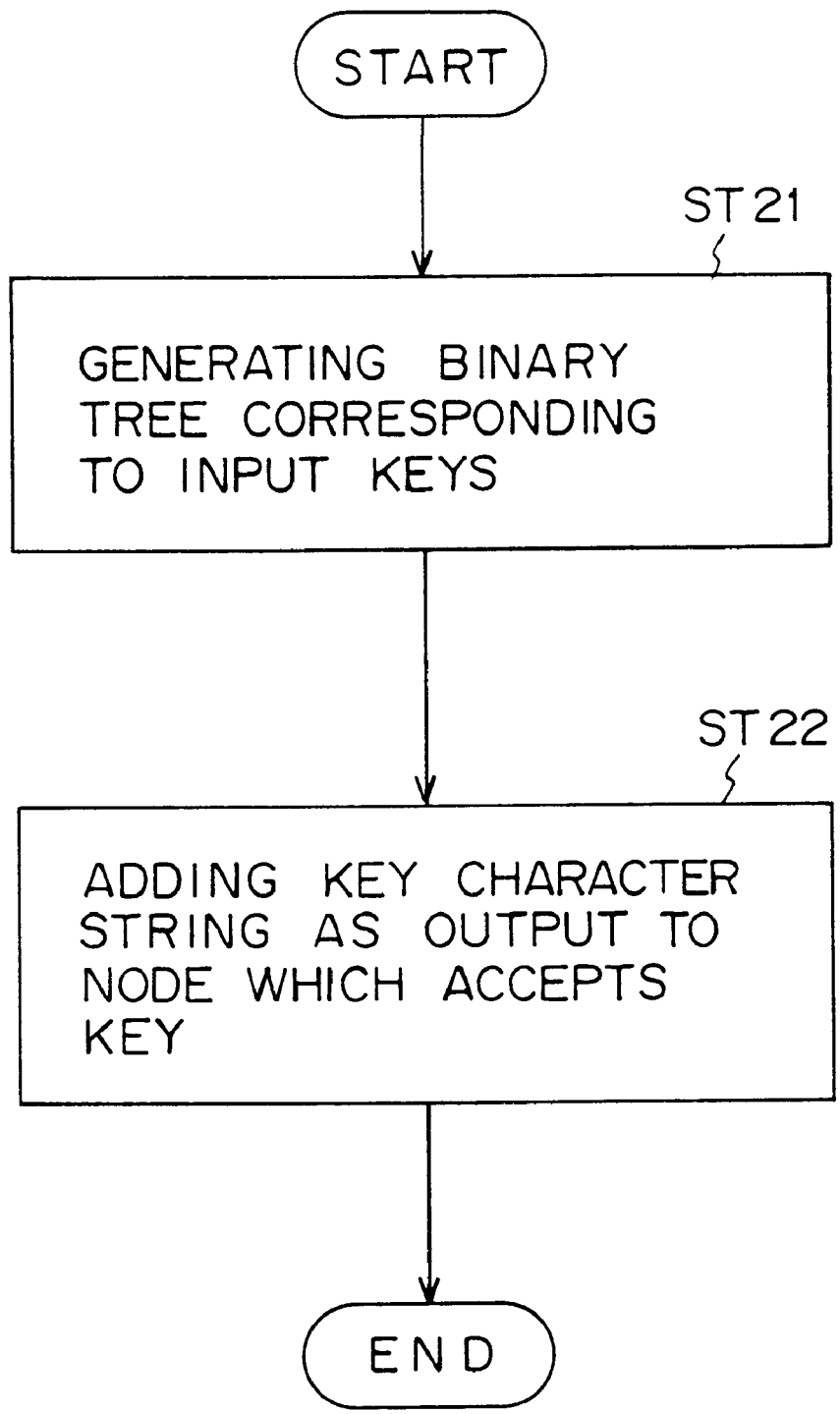
FIG. 13 is a flowchart showing the process of generating the first binary tree.

FIG. 13 is a flowchart showing the binary tree generating process. When the process starts as shown in FIG. 13, the binary tree converting unit 131 first generates a binary tree for input keys (step ST21). Then, it adds to the node which has accepted a key the corresponding input key as an output symbol string (step ST22), and the process terminates.

Figure 14:
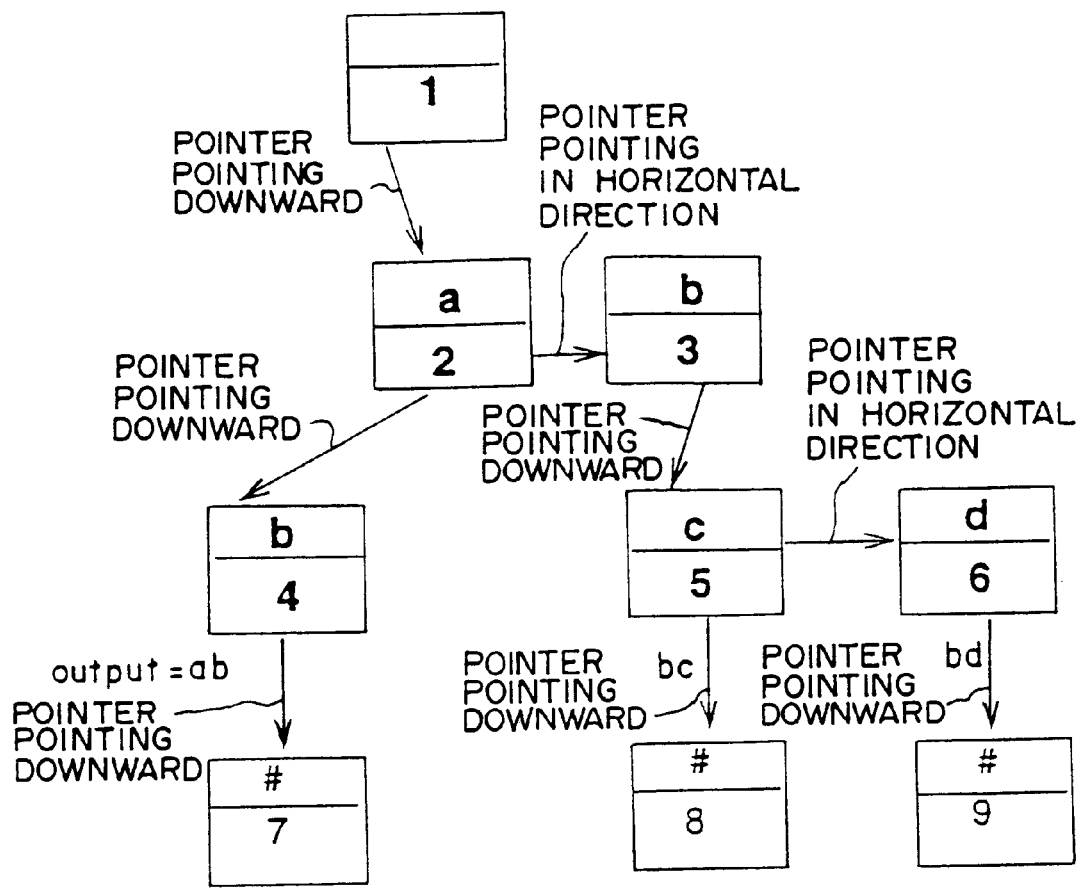
FIG. 14 shows the first binary tree.

For example, FIG. 14 shows a binary tree generated for the keyword group {ab, bc, bd} corresponding to the state transition shown in FIG. 7. In FIG. 14, a rectangular box indicates a node. A character label added to each node corresponds to the symbol appearing in the keywords. A pointer pointing in the horizontal direction points to another node having the same depth in the binary tree. A pointer pointing downward points to a deeper node. In this example, output symbol strings ab, bc, and bd are added as outputs to nodes 4, 5, and 6.

Figure 15:
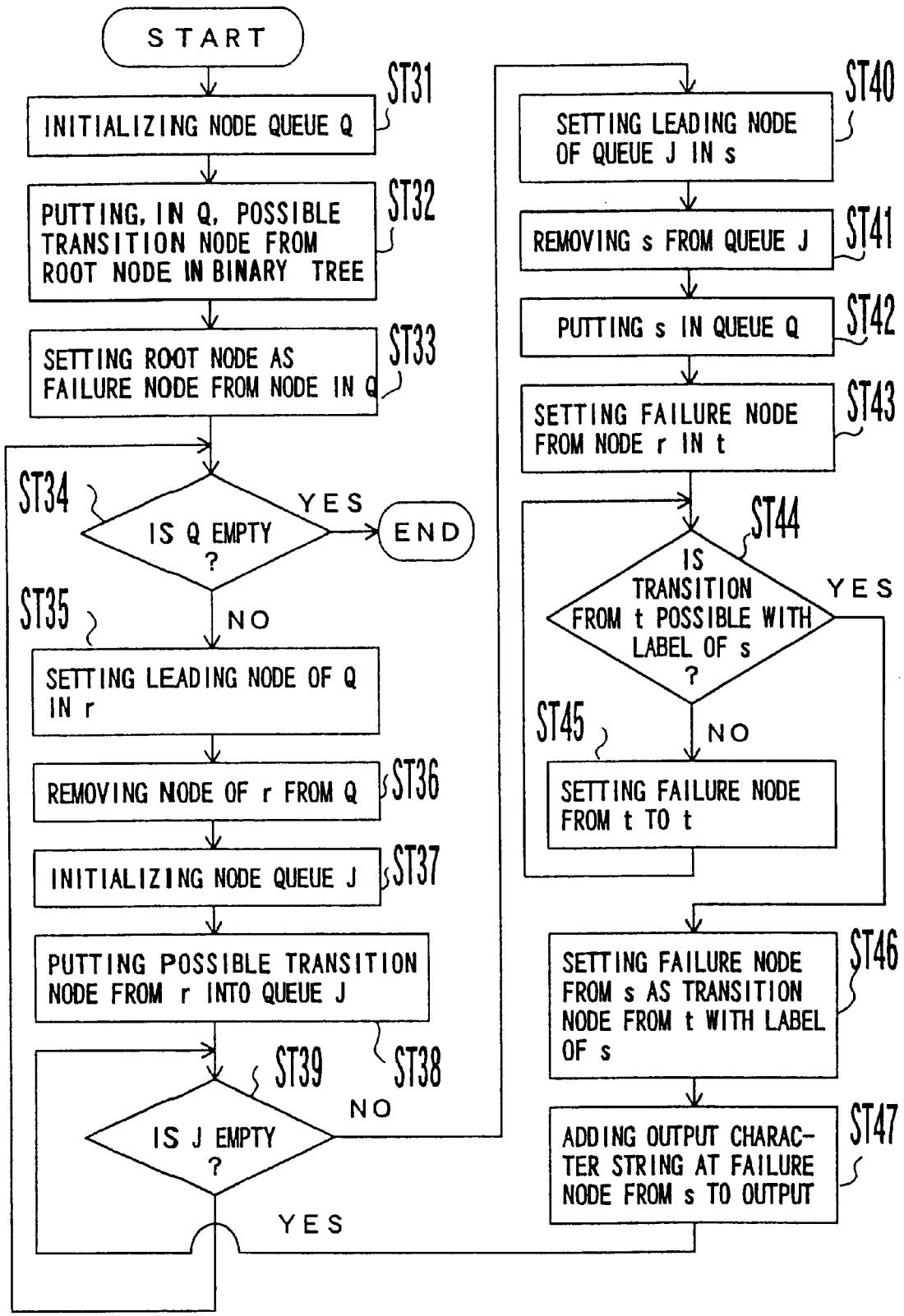
FIG. 15 is a flowchart showing the process of adding "failure" to the binary tree.

FIG. 15 is a flowchart showing the process of assigning to a generated binary tree a next transition state if the transition fails. When the process starts, the transition adding unit 132 initializes the node queue Q for storing nodes to be processed (step ST31).

Possible transition nodes (subnodes to the root node and nodes having the same depth as the subnodes) from the root node in a binary tree are placed in the queue Q (step ST32).

Then, the root node is set as a failure node from a node in the queue Q (step ST33), and it is determined whether or not the queue Q is empty (step ST34). If the queue Q is empty, the process terminates. If the queue Q is not empty, then the leading node is fetched from the queue Q and set in the variable r (step ST35). The fetched node is removed from the queue Q (step ST36).

Then, the node queue J is initialized (step ST37). Possible transition nodes (subnodes to the node r and nodes having the same depth as the subnodes) from the node r in a binary tree are placed in the queue J (step ST38). It is determined whether or not the queue J is empty (step ST39).

If the queue J is empty, then the processes in and after step ST34 are repeated. If the queue J is not empty then a node is fetched from the node queue J and set in the variable s (step ST40). The fetched node is removed from the queue J (step ST41). Next, the node s is placed in the queue Q (step ST42), and a failure node from node r is set as a variable t (step ST43). Then, it is determined whether or not the transition from the node t is defined corresponding to a character label on the node s (step ST44).

Unless the transition is defined, the failure node from node t is set to t (step ST45) and a determination is made again in step ST44. A loop is executed until the determination result indicates YES. Finally, the loop terminates with the initial state set to t.

If the transition is defined in step ST44, then the transition node from node t using the label of the node s is set to be the failure node from the node s (step ST46). Then, an output character string at the failure node from node s is added as the output (output character string) of the node s (step ST47), and the processes in and after step ST39 are repeated.

Figure 16:
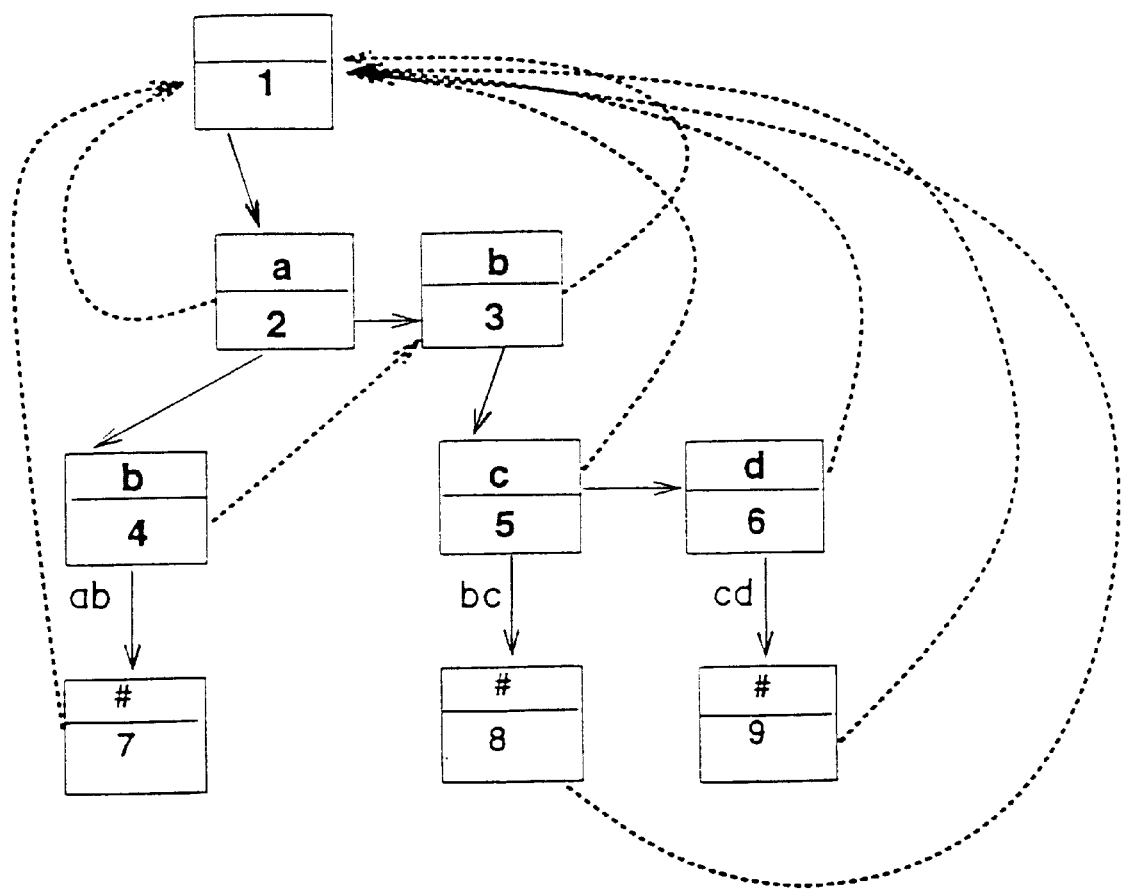
FIG. 16 shows the first binary tree with "failure"

For example, assuming that the failure transition of a binary tree shown in FIG. 14 is computed and the result is assigned to each node of the binary tree, the resultant binary tree is organized as shown in FIG. 16. The procedure of computing failure is described by referring to the process flow shown in FIG. 15.

First, possible transition nodes 2 and 3 from the root node 1 are placed in the queue Q in step ST32, and the failure node from nodes 2 and 3 is the root node. FIG. 17 shows the subsequent processes. In FIG. 17, the representation of, for example, 'goto (1, b)' indicates the transition from node 1 defined for the symbol b. This procedure is the same as that of generating a failure function in a common AC method.

Figure 18:
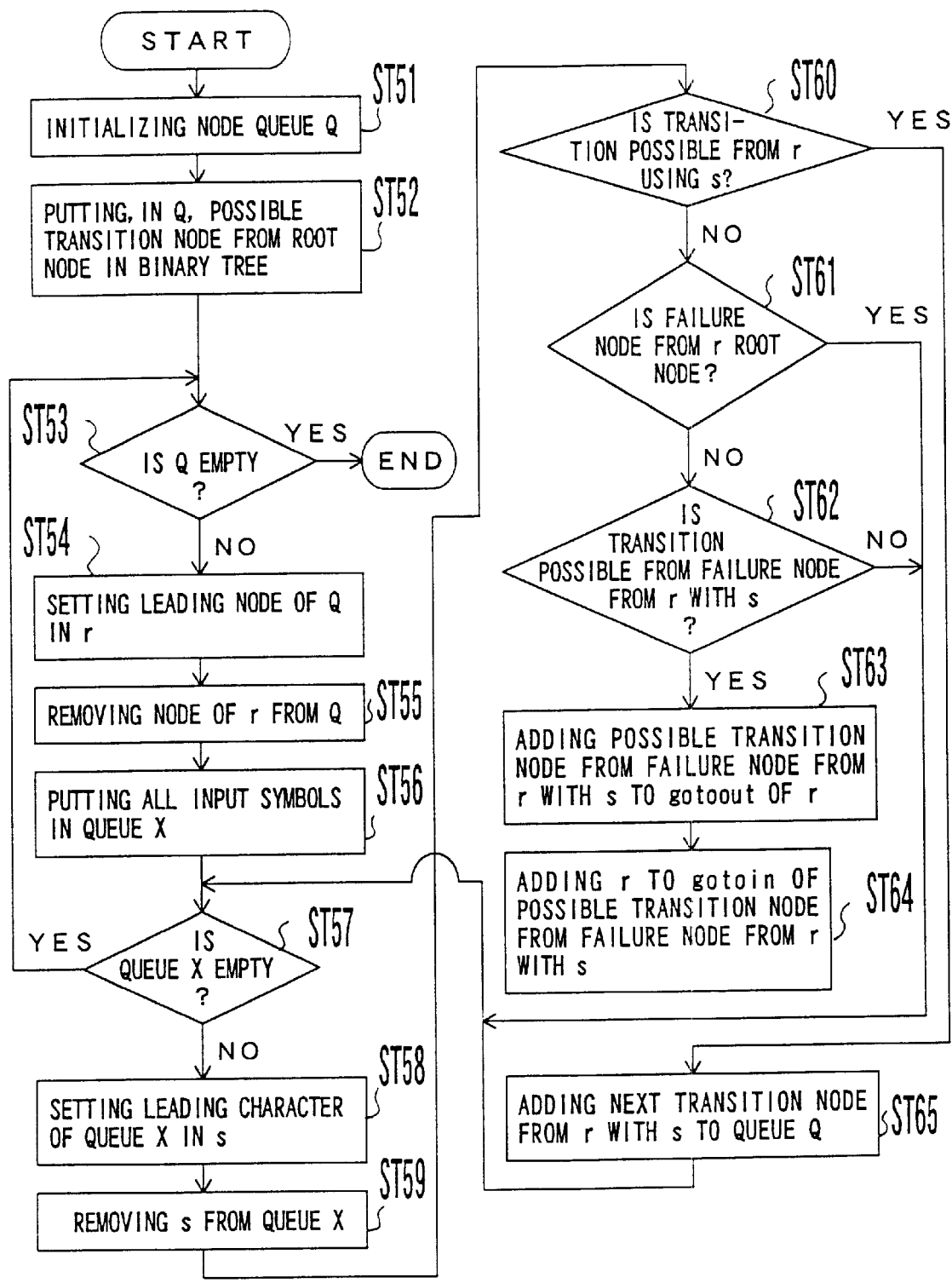
FIG. 18 is a flowchart showing the process of adding "gotoin" and "gotoout" to the binary tree.

FIG. 18 is a flowchart showing the process of adding transitions to a state other than the initial and the next state to the initial state to a binary tree node as a gotoin/gotoout node list when a failure transition is added. When the process starts, the transition adding unit 132 first initializes a node queue Q (step ST51).

Next, possible transition nodes from the root node in the binary tree is placed in the queue Q (step ST52), and it is determined in step ST53 whether or not the queue Q is occupied. If the queue Q is not occupied, then the process terminates.

If the queue Q is occupied, a node is fetched from the queue Q, set for r (step ST54), and removed from the queue Q (step ST55). Then, all possible input symbols are placed in a queue X in step ST56, and it is determined in step ST57 whether or not the queue X is occupied. If the queue X is not occupied, then the processes in and after step ST53 are repeated.

For example, when 8-bit codes are used as input symbols, the number of codes for symbols to be placed in the queue X in step ST56 is 256 from 0 to 255. If the queue X is occupied, a character is fetched from the queue X and set as a variable s (step ST58), and the character is removed from the queue X (step ST59). Then, it is determined in step ST60 whether or not a transition from node r to the next state according to the symbol s is possible (step ST60). If the transition is possible, the next transition node from the node r according to the symbol s is added to the queue Q (step ST65), and the processes in and after step ST57 are repeated.

If it is determined that the transition is not possible in step ST60, then it is determined in step ST61 whether or not the failure node from node r is the root node. If yes, the processes in and after step ST57 are repeated.

If it is determined in step ST61 that the failure node from node r is not the root node, then it is determined in step ST62 whether or not a transition is possible from the failure node from r according to the symbol s. If the transition is not possible, the processes in and after step ST57 are repeated.

If the transition is possible, then a possible transition node from the failure node from r according to the symbol s is added to the 'gotoout' of the node r (step ST63), the node r is added to the 'gotoin' of the transition node (step ST64), and the processes in and after step ST57 are repeated.

Assume that an object node r is A (r=A), the failure node from node A according to the symbol s is node B, and a set of possible transition nodes from node B is C. At this time, possible transition nodes which can be directly reached from node A according to the symbol s are removed from set C in the loop process from step ST57 to step ST65 shown in FIG. 18. Then, a list of nodes remaining in set C is added to node A as 'gotoout', and node A is added as 'gotoin' to each node in set C.

Figure 19:
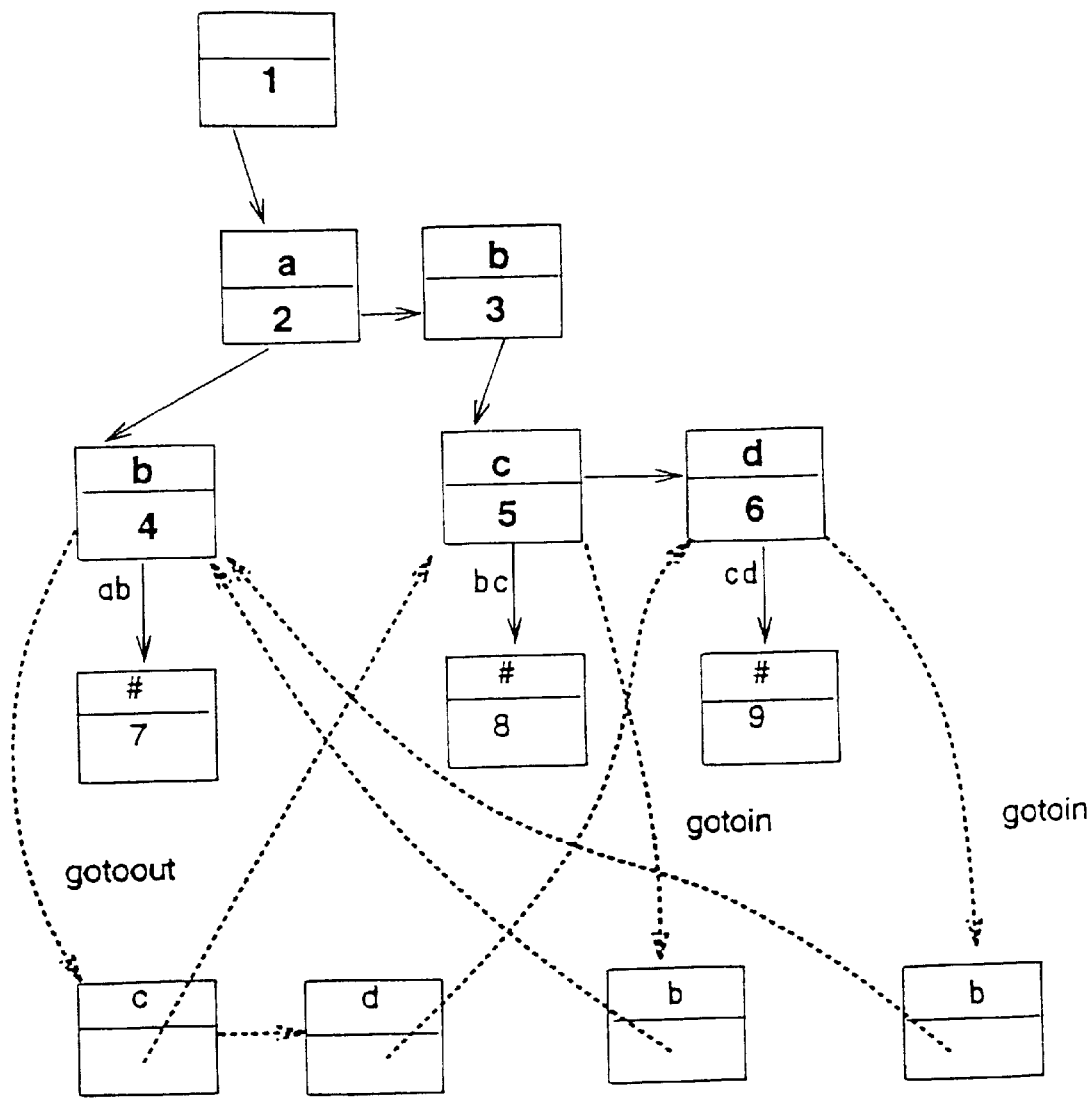
FIG. 19 shows the binary tree with "gotoin" and "gotoout"

FIG. 19 shows 'gotoout' and 'gotoin' obtained in the binary tree shown in FIG. 16. The binary tree shown in FIG. 19 corresponds to a finite state machine having an intermediate structure to be finally output by the transition adding unit 132.

In the computation using the above described 'gotoout' and 'gotoin' lists, a transition can be actually defined only when the failure node is a node other than that in the initial state. In FIG. 16, only node 4 satisfies this condition. Described below is the process of this node.

In FIG. 16, node 3 is the failure node from node 4. A transition can be directed from node 3 to node 5 according to the character 'c', and to node 6 according to the character 'd'. Therefore, the 'gotoout' of node 4 can be nodes 5 and 6. The 'gotoin' of nodes 5 and 6 can be node 4. In FIG. 19, these 'gotoout' and 'gotoin' are represented as labeled nodes.

In the conventional DFA, 'gotoout' is defined for all nodes in a binary tree. According to the present invention, 'gotoout' is defined only for the node for which a failure transition can be directed to a node other than the root node. In this case, 'gotoin' should be additionally defined, but a storage capacity is effectively reduced because failure transitions from a number of nodes that are assigned the root node as a failure node are removed.

Figure 20:
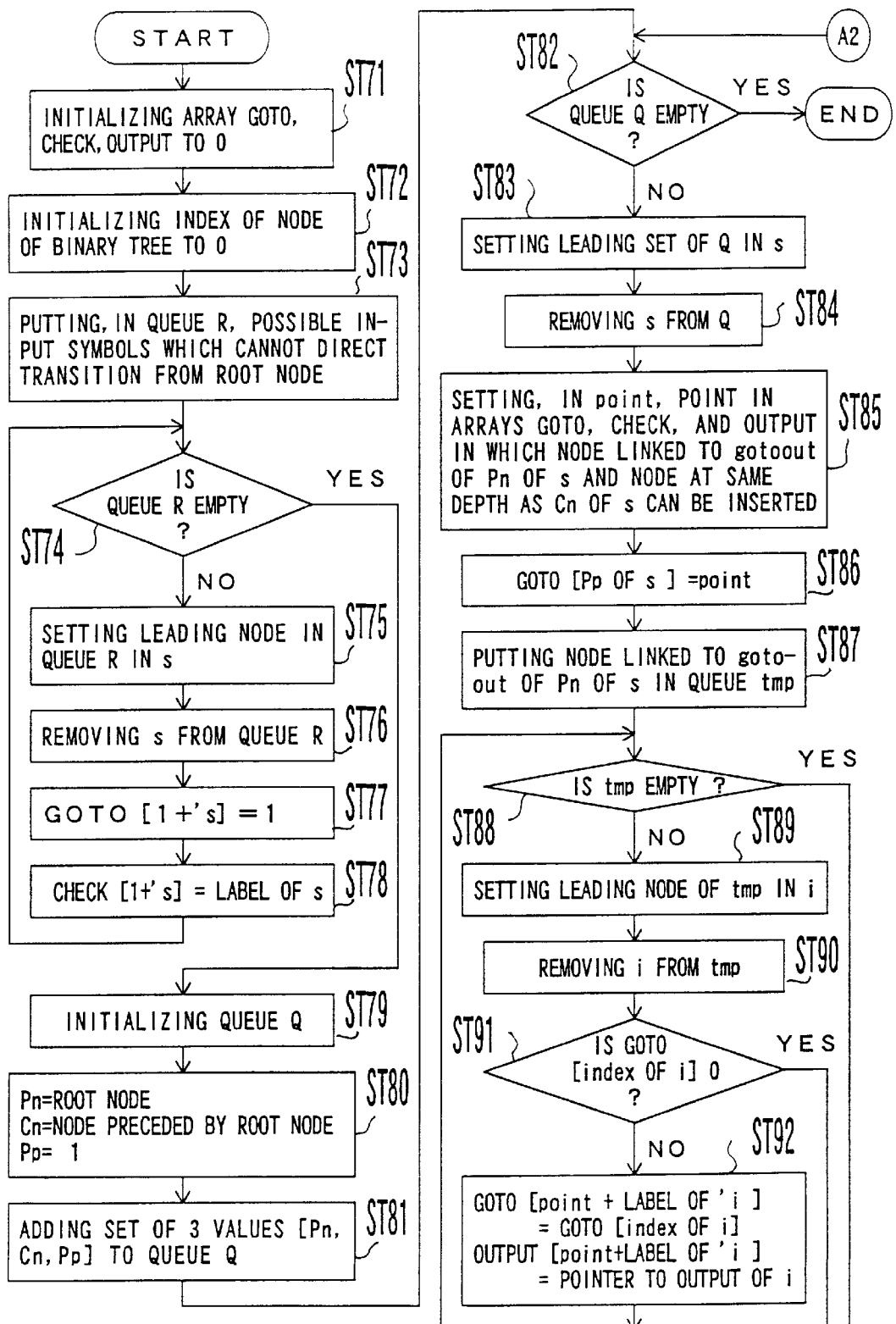
FIG. 20 is a flowchart (1) showing the first converting process.
Figure 21:
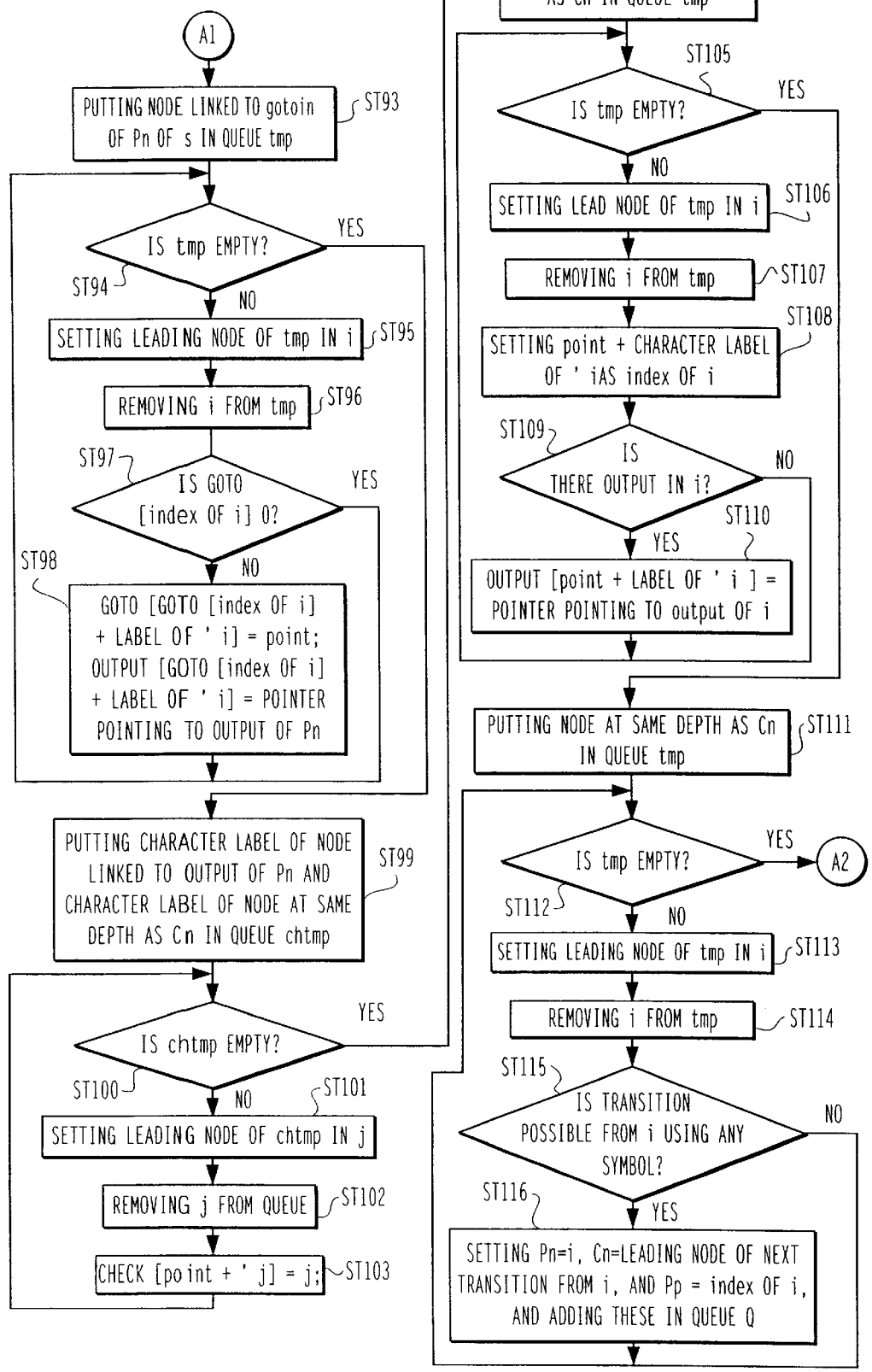
FIG. 21 is a flowchart (2) showing the first converting process.

FIGS. 20 and 21 are flowcharts showing the processes of converting a binary tree output by the transition adding unit 132 into a state transition machine in a compressed array form. When the process starts, the converting unit 133 first initializes the arrays GOTO, CHECK, and OUTPUT to zero in step ST71, and then initializes a node member 'index' in the binary tree to zero in step ST72.

This index stores the correspondence between each node of the binary tree and the index of the state transition array as shown in FIG. 8, and therefore is independent of the index of the state transition array.

Next, any of the possible input symbols is placed in a queue R in step ST73 if it does not refer to a transition from the root node to another, and it is determined in step ST74 whether or not the queue R is occupied. If the queue R is occupied, then a character is fetched from the queue R, set as a variable s in step ST75, and removed from the queue R in step ST76.

Then, the processes in and after step ST74 are repeated with GOTO [1+'s] set to 1 in step ST77, and CHECK [1+'s] used as a character label for s in step ST78. The 's indicates an internal code for s in the array. A character code can also be used as is.

When the queue R becomes vacant, the queue Q is initialized (step ST79) with Pn=route node, Cn=node preceded by the root node, and Pp=1 (step ST80).

A node preceded by the root node refers to a node assigned the smallest character label in a plurality of possible transition nodes (a sequence of nodes) from the root node. A smallest character label refers to a character label corresponding to the smallest character code. In the case of the binary tree shown in FIG. 19, the node in Cn corresponds to the node pointed down from the root node.

Then, a set of [Pn, Cn, Pp] is added to the queue Q in step ST81, and it is determined in step ST82 whether or not the queue Q is occupied. If the queue Q is vacant, the process terminates.

If the queue Q is occupied, then the leading set of three data are fetched from the queue Q, set in the variable s in step ST83, and removed from the queue Q in step ST84. Then, the position in the arrays GOTO, CHECK, and OUTPUT, to which the node connected to 'gotoout' of node Pn in s, and the node which is connected to node Cn in s and has the same depth as Cn can be inserted, is obtained and set in the variable 'point' (step ST85).

At this time, the position of the 'point' of the already inserted node should not overlap the position of the 'point' of the newly inserted node. If the newly inserted node is being inserted at the position already specified by the 'point' of another node, it should be inserted at a different 'point' by, for example, shifting 1 from the overlapping point.

Next, it is determined in step ST88 whether or not a queue tmp is occupied after setting GOTO [Pp of s]=point in step ST86, and placing the node connected to 'gotoout' of node Pn in s in the queue tmp in step ST87.

If the queue tmp is occupied, then a node is fetched from the queue tmp, set in the variable i in step ST89, and removed from the queue tmp in step ST90. Then, it is determined in step ST91 whether or not GOTO [index of i] is 0.

The index of node i in the binary tree stores 0 or the index of the position of the state transition array containing node i. If 0 is stored, it indicates that node i of the binary tree has not been transferred to the state transition array.

If GOTO [index of i] is 0, then the processes in step ST88 are repeated. Unless it is 0, the transition to 'gotoout' node has been transferred to the array. Therefore, the transition according to 'gotoout' is mapped on the array (step ST92) and the processes in and after step ST88 are repeated.

In step ST92, the transition is mapped with the settings of GOTO [point+label of 'i']=GOTO [index of i], and OUTPUT [point+label of 'i']=pointer to output of i, where the "label of 'i" indicates the internal code of the character label of node i, and the "pointer to output of i" refers to the pointer to the output symbol string defined in node i. Thus, the output of node i is copied into the array.

When the queue tmp becomes vacant in step ST88, the node connected to 'gotoin' of node Pn in s is placed in the queue tmp (step ST93 shown in FIG. 21), and it is determined in step ST94 whether or not the queue tmp is vacant.

If the queue tmp is occupied, then a node is fetched from the queue tmp, and set to i in step ST95. Then, i is removed from the queue tmp (step ST96), and it is determined in step ST97 whether or not GOTO [index of i] is 0.

If GOTO [index of i] is 0, then the process in step ST94 is repeated. If it is not 0, then the transition of 'gotoout' is mapped onto the array through 'gotoin' in step ST98, and the processes in and after step ST97 are repeated.

The mapping is performed in step ST98 with the setting of GOTO [GOTO [index of i]+label of 'i]=point. If 'output' is defined for node Pn in s, then 'output' of node Pn is copied to the array as a pointer to the 'output' of Pn=OUTPUT [GOTO [index of i]+label of 'i].

When the queue tmp is vacant in step ST94, the character label of the node connected to 'gotoout' of node Pn, and the character label of the node connected to node Cn at the same depth as node Cn, are placed in the queue chtmp (in step ST99). Then, it is determined in step ST100 whether or not the queue chtmp is vacant.

If the queue chtmp is occupied, then a character label is fetched from the queue chtmp, set in the variable j in step ST101, and removed from the queue chtmp in step ST102. Then, the label of the inserted-to position of the node is set with the setting of CHECK [point +'j] =j in step ST103. Then, the processes in and after step ST100 are repeated.

When the queue chtmp becomes vacant in step ST100, node Cn in s and the node at the same depth as node Cn are placed in the queue tmp in step ST104. Then, it is determined in step ST105 whether or not the queue tmp is vacant.

If the queue tmp is occupied, a node is fetched from the queue tmp, set in the variable i in step ST106, and removed from the queue in step ST107. Next, the value of (point+ label of 'i) is set to the index of node i in step ST108, and it is checked whether or not 'output' is defined in node i in step ST109.

Unless node i contains 'output', the processes in and after step ST105 are repeated. If node i contains 'output', then 'output' of node i is copied to the array OUTPUT in step ST110, and the processes in and after step ST105 are repeated. The pointer to 'output' of i is set to be OUTPUT [point+label of 'i] in step ST110.

When the queue tmp becomes vacant in step ST105, the node at the same depth as node Cn is placed in the queue tmp in step ST111, and it is determined in step ST112 whether or not the queue tmp is vacant.

Unless the queue tmp is vacant, a node is fetched from the queue tmp, set in the variable i in step ST113, and then removed from the queue tmp in step ST114. It is determined in step ST115 whether or not a transition can be directed from node i to the next state according to any symbol.

If a transition is not possible, the processes in and after step ST112 are repeated. If the transition is possible, a set of three values, that is, Pn=i, Cn=leading node of next transition from i, and Pp=index of i, is added to the queue Q in step ST116, and the processes in and after step ST112 are repeated. The leading node of the next transition from i refers to the node assigned the smallest character label in the possible transition nodes from node i.

When the queue tmp becomes vacant in step ST112, control is returned to step ST82 shown in FIG. 20, and the processes in and after the step ST82 are repeated.

Next, the procedure of converting the binary tree shown in FIG. 19 into the array format shown in FIG. 8 is described by referring to the flowcharts of FIGS. 20 and 21.

First, all transitions are defined in the initial state. This process corresponds to the loop in steps ST74 through ST78 shown in FIG. 20, and outputs an array format as shown in FIG. 22.

Then, nodes in the binary tree are inserted in the arrays in order from the root node of the binary tree. This process corresponds to the loop from step ST79 shown in FIG. 20 to step ST116 shown in FIG. 21. In this inserting process, the converting unit 133 stores in the queue Q 3-piece-data sets [Pn, Cn, Pp] for the node in the binary tree and inserts the data set one by one into the array.

First, the root node is inserted. In FIG. 20, a set of 3 values is placed in the queue Q in steps ST79, ST80, and ST81, and is fetched in steps ST83 and ST84. In this example, Pn=root node 1, Cn=node 2, and Pp=1. In step ST85, a possible inserted-to position is searched for. This process for the root node 1 is described below.

In this case, 'gotoout' of node Pn is vacant. The nodes at the same depth of node Cn are nodes 2 and 3. The character labels of these nodes are respectively a and b. The process of searching for a position in the array into which this node row is inserted corresponds to the process of searching for the position corresponding to the pattern shown in FIG. 23 on the arrays GOTO, CHECK, and OUTPUT.

Figure 23:
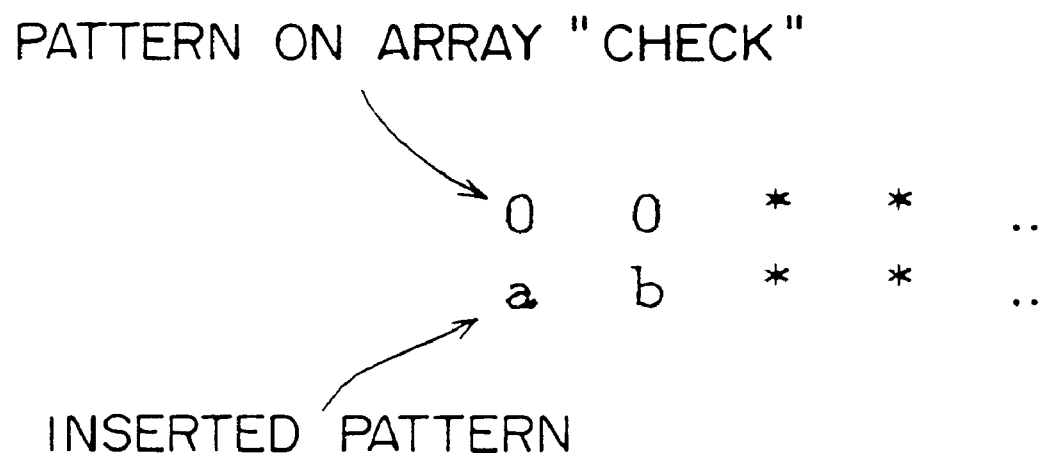

In the pattern shown in FIG. 23, the upper row indicates the pattern on the current array CHECK, and the lower row indicates a pattern to be inserted. The value 0 indicates that the area is vacant. The character * indicates that the area can either be vacant or contain an element.

If the position to which these patterns can be inserted is searched for in the array shown in FIG. 22, then the pattern shown in FIG. 23 can overlap another pattern as shown in FIG. 24. Therefore, the value of 'point' indicating the insertion position of a node is 1. This position corresponds to one position before the insertion position of label a of node 2.

Since GOTO [Pp] equals 'point' in step ST86, GOTO[1] equals 1. Accordingly, the transitions from node 1 to nodes 2 and 3 in the binary tree are transferred to the array. Since GOTO[1]=1 is preliminarily assigned to the position of index=1 corresponding to the root node 1, no changes are made.

The processes from step ST87 shown in FIG. 20 to step ST98 shown in FIG. 21 are performed when node Pp contains gotoout/gotoin. Therefore, they have nothing to do with the root node.

The processes from steps ST99 to ST103 shown in FIG. 21 are performed when a label is inserted into an array. These processes correspond to setting a character label of each node at the 'CHECK' portion in a reserved array. Through the processes, the array format shown in FIG. 25 is obtained. In FIG. 25, an underlined labels 'a' and 'b' are inserted labels.

The processes from steps ST104 to ST110 shown in FIG. 21 are to set the position in an array to a node in the binary tree and to copy the 'output' of the node to the array. Thus, the 'index' of node 2 is set to 2 while the 'index' of node 3 is set to 3.

The loop from steps ST111 to ST116 is to store possible transition nodes from node Pn in the queue Q. Since nodes 2 and 3 are possible transition nodes from the root node, [Pn=node 2, Cn=node 4, Pp=2] and [Pn=node 3, Cn=node 5, Pp=3] are placed in the queue. Then, control is returned to step ST82 shown in FIG. 20.

Similar processes are performed using Pn=node 2, Cn=node 4, and Pp=2. A position indicating 'point'=26 is detected when a position to which a node can be inserted is searched for. If the processes from step ST85 shown in FIG. 20 to step ST111 shown in FIG. 21 are similarly processed, then the array format shown in FIG. 26 can be obtained.

In FIG. 26, the label b of node 4 is inserted in the position of index=28. If the conversion table shown in FIG. 9 is used, the label b is converted into an internal code 2. Then, the value 26 obtained by subtracting 2 from 28 is set as 'point'. Thus, in step ST18 in the collating process shown in FIG. 10, a transition is directed from the position of 'index'=26 to the position of 'index'=28 according to the input symbol b, thereby realizing the transition to the next transition node indicated by the element.

A pointer o1 to the 'output' ab of node 4 is copied to OUTPUT [28].

Since the node subsequent to node 4 is node 7, [Pn=node 4, Cn=node 7, Pp=28] is placed in the queue Q. Then, control is returned to step ST82 shown in FIG. 20.

Next, [Pn=node 3, Cn=node 5, Pp=3] is fetched from the queue Q. For the fetched data, an insertion position should be reserved in a way that the pattern shown in FIG. 27 is satisfied. If the label c of node 5 is aligned at the position of 'index'=29, 'point'=26 is obtained using the internal code 3. This value has already been set for 'point', and therefore is replaced with 'point'=27 to avoid the double use. As a result, the indexes of the insertion positions of nodes 5 and 6 are 30 and 31 respectively.

When the processes from step ST85 shown in FIG. 20 to step ST111 shown in FIG. 21 are similarly performed, an array in the form as shown in FIG. 28 is obtained. In this case, a pointer o2 to the 'output' bc of node 5 is copied to OUTPUT [30], and a pointer o3 to the 'output' bd of node 6 is copied to OUTPUT [31].

Then, nodes 8 and 9 follow nodes 5 and 6 respectively. [Pn=node 5, Cn=node 8, Pp=30] and [Pn=node 6, Cn=node 9, Pp=31] are placed in the queue Q. Then, control is returned to step ST82 shown in FIG. 20.

Similar processes are performed using [Pn=node 4, Cn=node 7, and Pp=28]. When a position to which a node can be inserted is searched for, it is found that transitions are defined for node 4 by the characters c and d as 'gotoout'. Therefore, a possible insertion position should satisfy the pattern as shown in FIG. 29. The value of 'point' corresponding to the position is 29.

Figures 30, 31:
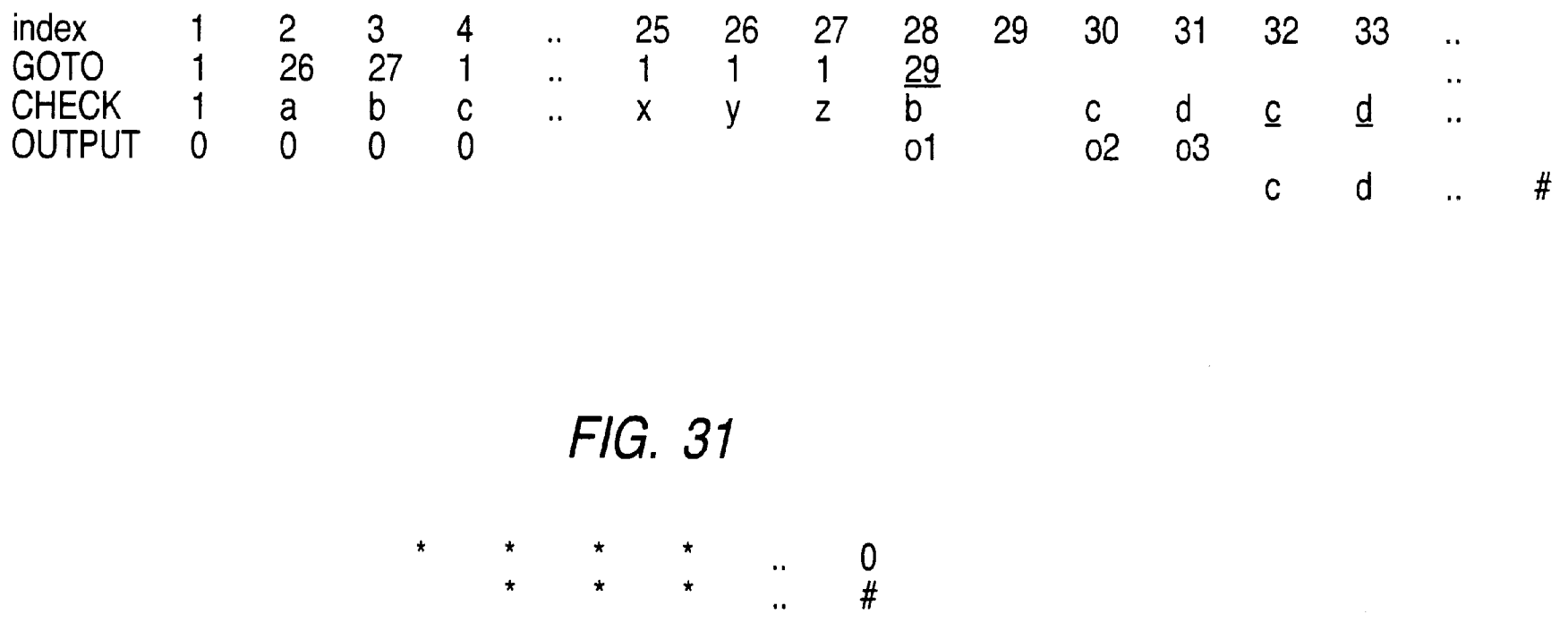

At this time, the processes from step ST85 shown in FIG. 20 to step ST111 shown in FIG. 21 are similarly performed. Since 'gotoout' is defined for node 4 which is node Pn, a loop process is entered from steps ST87 to ST92 shown in FIG. 20. However, GOTO [index of node 5] and GOTO [index of node 6] are not defined yet, and the process in step ST92 is not performed. FIG. 30 shows a resultant array.

Since no possible transition nodes from node 7 can be found, the queue Q does not store any more nodes, and control is returned to step ST82 shown in FIG. 20.

Next, [Pn=node 5, Cn=node 8, Pp=30] is fetched from the queue Q. A possible inserted-to position is a position where the pattern as shown in FIG. 31 is satisfied. The value of 'point' corresponding to the position is 5.

At this time, the processes from step ST85 shown in FIG. 20 to step ST111 shown in FIG. 21 are similarly performed. Since node 4 as 'gotoin' is defined for node 5 which is node Pn, a loop process is entered from steps ST93 to ST98 as shown in FIG. 21.

In the condition determination in step ST97, GOTO [index of node 4] equals 29, and therefore GOTO [29+'c']=

GOTO [32] equals 5. Since bc as 'output' is defined for node 5 which is node Pn, they are also copied to indicate OUTPUT [32]=o2. FIG. 32 shows the resultant array.

If node 9 is last processed as in node 8, a result is obtained as shown in FIG. 8.

In this example, the smallest possible value is used as 'point' to enhance the compression ratio of a state transition array, but a larger index can also be used as the 'point'.

Described below is an embodiment of a character string replacing device obtained by adding a character string replacing function to the collating unit in the first embodiment. In this embodiment, an example is of replacing input keywords {ab, bc, bd} with {aaa, bbb, ccc} respectively.

This character string replacing function stores the position where the keyword has been detected instead of outputting a keyword detected from the input text, and replaces the keyword after processing the text.

FIG. 33 shows a state transition array for replacing an input key with a character string. In FIG. 33, the array GOTO stores a superposed state transition table. The array CHECK stores a confirmation label. The array SUBST stores a pointer to a replacing character string, and the array LENGTH stores the length of the collated character string (character string to be replaced).

FIG. 34 shows the initial state of a text offset storage array for use in a replacing process. This array stores the text offset indicating the position of the character string to be replaced in the text, a pointer of a SUBST pointing to a corresponding replacing character string and the length of the character string to be replaced.

Figure 35:
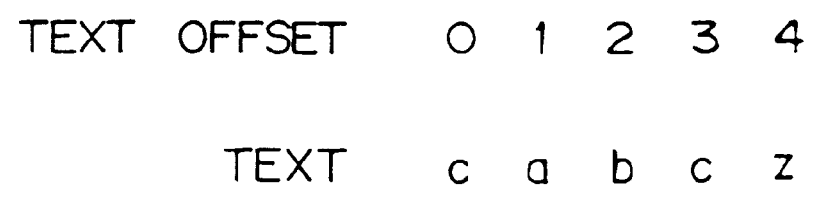

The text offset for each symbol in the input text 'cabcz' is shown in FIG. 35. After collating the pattern of the input text, the storage array of the text offset is as shown in FIG. 36. The collating process is similar to that shown in FIG. 10. After the collation, the positions of the keywords 'ab' and 'bc' in the text are stored as the text offset 1 and 2 respectively.

In the replacing process, the character string replacing device sets a pointer in the text and a text offset storage array. A text character is output as long as there is no pointer to the text in the area of the length of the character string to be replaced and starting at the position of the text offset stored in the text offset array. When the pointer to the text is positioned at the text offset in the text offset array, a corresponding replacing character string is output.

FIG. 37 is a flowchart showing the replacing process. When the process starts, the character string replacing device first sets the text pointer t at the head of the text (step ST121), and sets the replacement pointer p at the head of the text offset storage array (step ST122). Then, it is determined whether or not the pointer t points to the end of the text (step ST123). If the pointer t points to the end of the text, the process terminates.

Unless the pointer t points to the end of the text, the value of the text offset stored at the position pointed to by the pointer p is compared with the pointer t (step ST124). Unless the values match each other, a character in the text pointed to by the pointer t is output (step ST125) and the pointer t is moved forward by one character (step ST126), and the processes in and after step ST123 are repeated.

If the values match in step ST124, then the pointer of SUBST stored at the position pointed to by the pointer p is extracted, and the replacing character string pointed to by the pointer is output (step ST127). Then, the pointer t is moved forward by the length of the character string to be replaced and stored at the position pointed to by the pointer p (step ST128), and the pointer p is moved forward by 1 (step ST129).

It is determined (step ST130) whether or not the value of the pointer t is larger than the text offset of the position pointed to by the pointer p. If the value is equal to or smaller than the text offset, then processes in and after step ST123 are repeated. If the value is larger than the text offset, then it is determined whether or not the position pointed to by the pointer p is the end of the text offset storage array (step ST130). Unless the position is the end of the array, the processes in and after step ST129 are repeated. If it is the end of the array, then the processes in and after step S123 are repeated.

As a result of the replacing process, text 'cabcz' is converted into 'caaacz'.

Next the second embodiment based on the FAST method is described by referring to FIGS. 38 through 60.

Figure 2A:
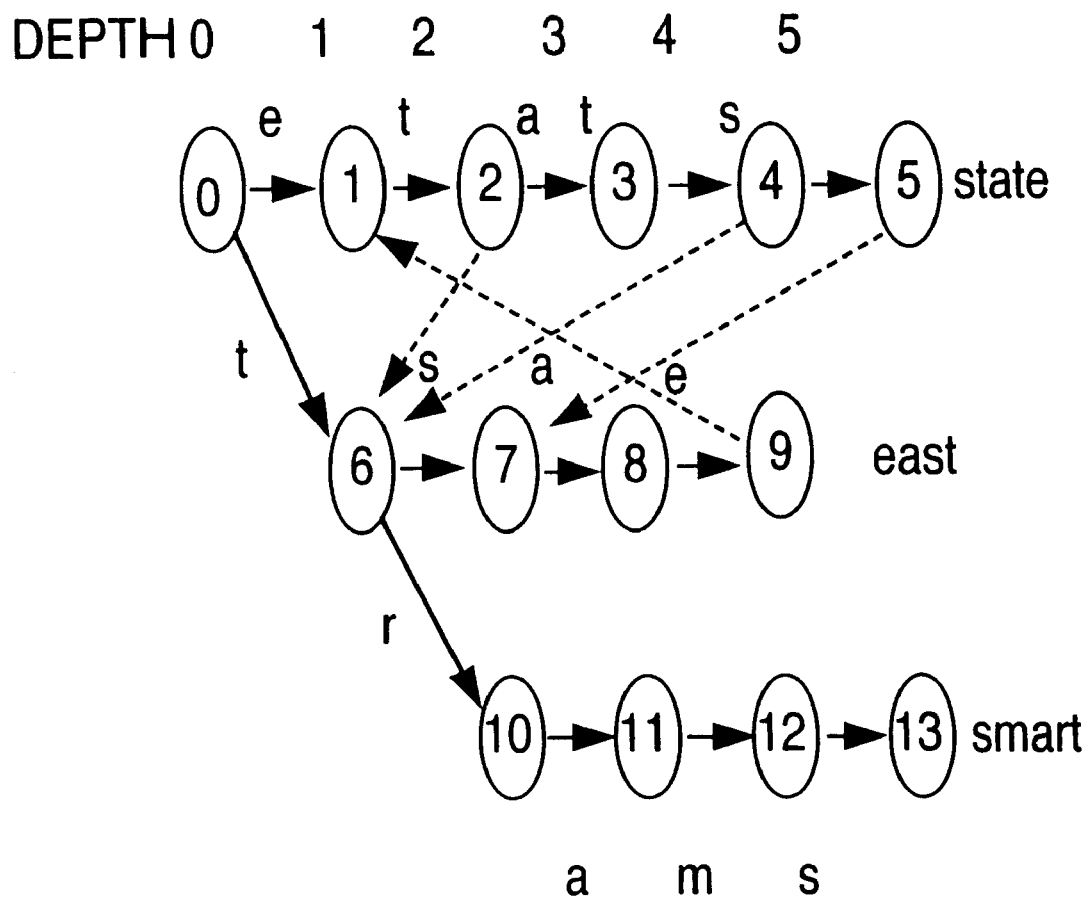
FIG. 2A shows an example of a pattern matching machine in the FAST method.

In the state transition table according to the FAST method, it may be considered that the data describing the operations corresponding to the input symbol of each state can be simply divided into two groups, that is, 'default shift' data and 'transition' data. However, the problem is not so simple. For example, on the state transition table shown in FIG. 2B, the amount of a shift corresponding to the input symbol 'a' in state '6' is −2 (size 2), but the amount of a default shift corresponding to other input symbols in state '6' is −5 (size 5). The smaller amount of the shift −2 is determined while the amount of the shift is computed by the FAST method. Therefore, it is impossible, as it is, to compactly divide the table format into two portions, that is, a default amount of a shift and a transition to the next state.

According to the second embodiment, the operations corresponding to the input symbol in the FAST method are divided into three types. That is, the first operation refers to a default shift of a state corresponding to a general input symbol. The next operation refers to a specific shift corresponding to a specific input symbol. The last operation refers to a transition to the next state corresponding to an input symbol.

In the collating operations, it is first determined whether or not a transition or a shift is defined corresponding to an input symbol. Unless a shift or a transition is defined, a pointer is shifted to the right according to the default shift. When an input symbol is accepted but a specific shift, not a transition, is defined, then the pointer is shifted to the right according to the shift. When a transition is defined, the next transition state is accessed.

These operations are represented in an array form for each state and arrays are arranged to overlap each other in a way that transition/shift defined portions do not overlap each other. To simultaneously confirm whether or not elements are contained in the array, a character is assigned as a label if a transition/shift is defined for the character.

When a compressed table format is generated, an actually used storage capacity can be saved using the intermediate structure of a binary tree.

The configuration of the collating apparatus according to the second embodiment is the same as that shown in FIG. 5. In this case, the state transition determining unit 121 determines to which state a transition should be directed corresponding to the input symbol, or determines to what extent a collation position should be shifted in the text.

FIG. 38 indicates the second state transition table before compression using three symbol strings {smart, east, state} as input keywords. When the table is compared with that shown in FIG. 2B, a typical amount of a shift generally used in each state is described as a single group 'default shift'. Thus, only a specified amount of a shift or a specified next transition state is defined for each of the input symbols.

Figure 39:
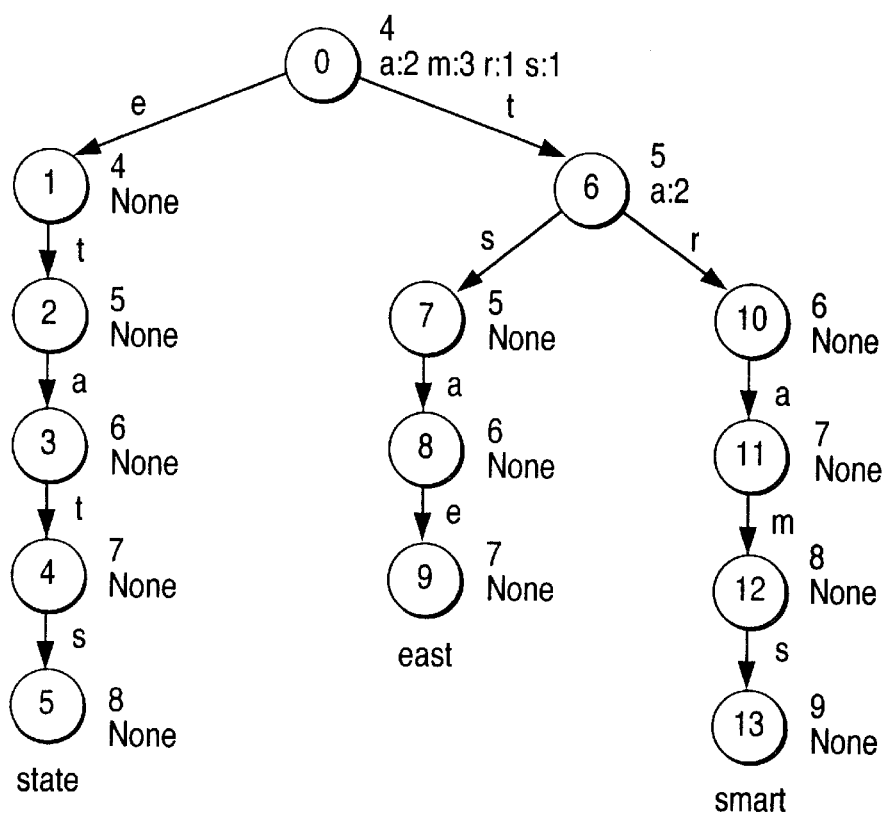
FIG. 39 shows the second state transition.

FIG. 39 shows the transition corresponding to each input symbol defined on the state transition table shown in FIG. 38. The state transition table shown in FIG. 39 comprises 14 nodes having node numbers 0 through 13. The data a1, a2, a3, a4 assigned to each node respectively represent the state number (node number), size of default shift, specified character, specified shift size, and output character string.

Figure 40:
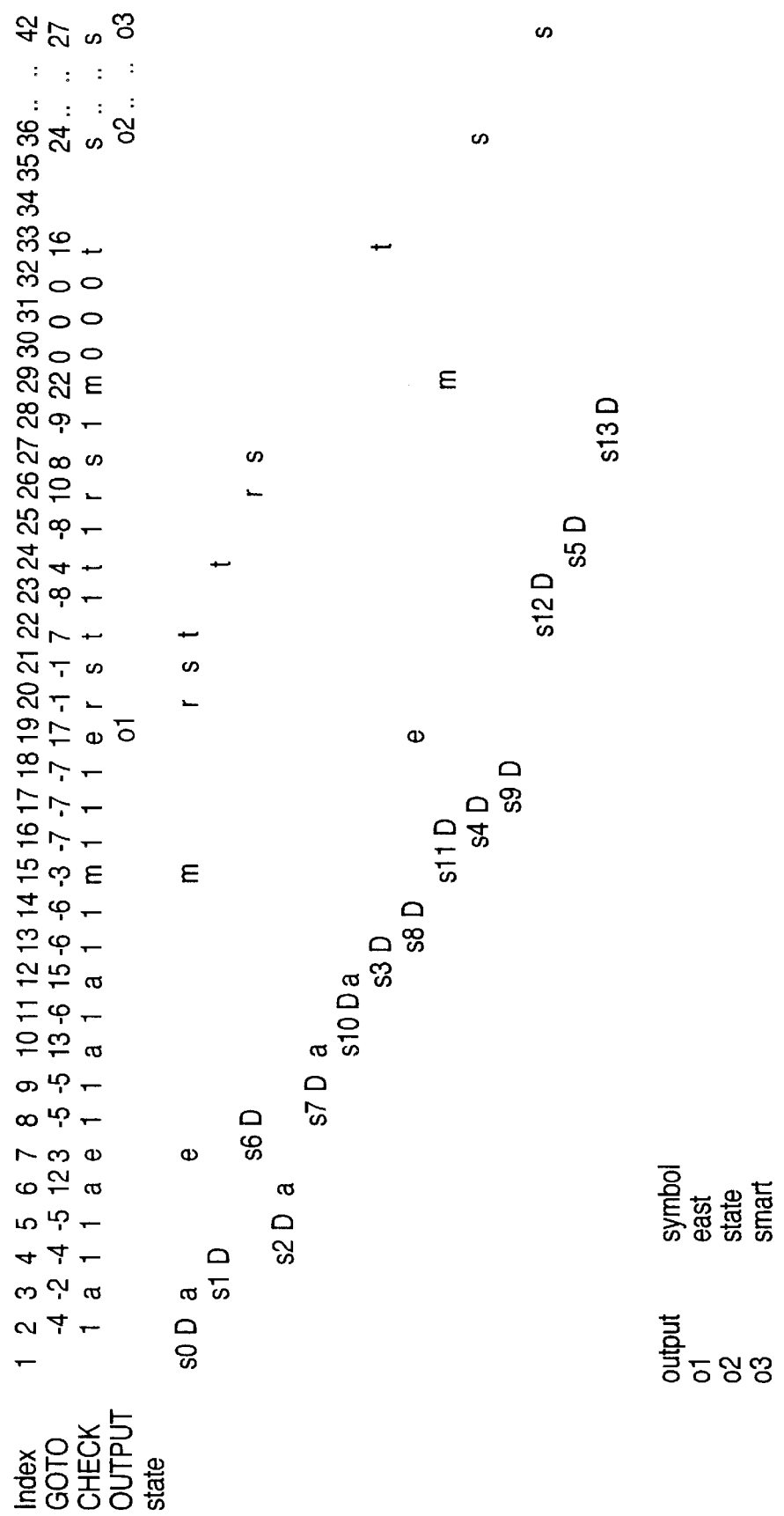
FIG. 40 shows the second state transition table after compression.

FIG. 40 shows a collating array obtained by compressing the state transition table shown in FIG. 38. In FIG. 40, index indicates the subscript of an array, GOTO indicates a superposed state transition table stored in the compressed state transition unit 123, CHECK indicates a confirmation label stored in the confirmation label unit 124, OUTPUT indicates the array of a pointer stored in the output symbol unit 125. These pointers o1, o2, and o3 indicate the output character strings east, state, and smart stored in the state transition unit 122.

When the element of the array GOTO is smaller than 0, it indicates the amount of a shift. Otherwise, it indicates the transition to the next state.

The states s0 through s13 described below the array shown in FIG. 40 indicate how the states 0 through 13 overlap each other in FIG. 38. Symbols a, e, etc. indicate the storage position of accessed data corresponding to each input symbol shown in FIG. 38. Symbol D indicates the storage position of accessed data corresponding to a default shift.

FIG. 41 shows the second character code conversion table used in explaining the second embodiment. According to the character code conversion table, a character code is converted into an internal code. According to the conversion table shown in FIG. 41, since a default shift code is set at the head of each of the overlapping arrays, its internal code is set to 1 in the first column, and the internal code corresponding to each input symbol in the second or further column is equal to or larger than 2.

The result obtained by adding 1 to the character code of an input symbol can also be used as an internal code.

Next, the collating process in the second embodiment is described by referring to FIGS. 42 and 43.

FIG. 42 is a flowchart showing the character string collating process based on the FAST method. When the process starts, the state transition determining unit 121 first sets the text pointer pointing to the input text at the position obtained by adding the shortest key length to the value of the text head. Then, the state transition determining unit 121 sets the transition pointer pointing to the state transition array in the state transition unit 122 at the initial state (step ST131). Then, it is checked whether or not the text pointer points to the end of the text (step ST132). If the text pointer points to the end of the text, the collating process terminates.

Unless the text pointer points to the end of the text, the character pointed to by the pointer is obtained (step ST133), the value of the internal code corresponding to the character is added to the value of the transition pointer, and it is checked whether or not a character label stored at the position indexed by the sum matches the character (step ST134).

Unless these characters match each other, the transition or shift for the input character is not defined. Then, the text pointer is moved forward by the value of the default shift for the state (step ST135), the transition pointer is set at the initial state (step ST136), and the processes in and after step ST132 are repeated.

If the label and the input character match each other in step ST134, then it is confirmed whether or not the shift by the input character is defined (step ST137). If the shift is to be made by input characters, then the text pointer is moved forward by the value indicating the amount of the shift defined for the input character in the current state (step ST138). The transition pointer is set at the initial state (step ST139), and the processes in and after steps ST132 are repeated.

In step ST137, if a transition, not a shift, is defined by an input character, then it is confirmed whether or not an output character string is defined (step ST140).

Unless an output character string is defined, an internal code of an input character is added to the current transition pointer, and the next transition state defined as the position indexed by the sum is set as a new transition pointer (step ST142). Then, the text pointer is moved backward by one character (step ST143), and the processes in and after step ST132 are repeated.

If an output character string is defined, the character string is output as a collating result (step ST141), and the processes in and after step ST142 are performed. In step ST141, the value of the current text pointer can be output as the position of the collated character string.

FIG. 43 shows the collating operations corresponding to the input text 'aaseastaterrr' performed using the state transition array shown in FIG. 40.

The array CHECK is accessed to check whether or not the next transition state or the amount of a shift is defined corresponding to an input symbol. When nothing is defined, a default shift is made. When a shift is defined and is smaller than a default shift correspondingly to a specific input symbol, the shift is made based on the defined amount of the shift.

First, a text pointer is set at the position 'e', the shortest keyword length of 4 characters array from the head of the text. The transition pointer is set to the index value '1' corresponding to the initial state.

The following expressions are obtained for the first input symbol 'e'.

CHECK[1+'e']=e

GOTO[1+'e']=3>0

Therefore, the transition pointer is set to 3 (step ST142), the next transition state is accessed and the text pointer is set at the position of 's' (step ST143).

The following expression is obtained for the next input symbol 's'.

CHECK[3+'s'] s

The default shift in this state can be obtained by, for example, the following equation.

GOTO[3+1]=−4

The text pointer is shifted by 4 to the right and set at the point 't' (step ST135). The transition pointer is set to 1 in the initial state again (step ST136).

The following expressions are obtained for the next input symbol 't'.

CHECK[1+'t']=t

GOTO[1+'t']=7>0

Then, the next state is accessed with the transition pointer set to 7 (step ST142), and the text pointer is set at the position 's' (step ST143).

The following expressions are obtained for the next input symbol 's'.

CHECK[7+'s']=s

GOTO[7+'s']=8>0

Then, the next state is entered with the transition pointer set to 8 (step ST142), and the text pointer is set at the position 'a' (step ST143).

The following expressions are obtained for the next input symbol 'a'.

CHECK[8+'a']=a

GOTO[8+'a']=13>0

Then, the next state is accessed with the transition pointer set to 13 (step ST142), and the text pointer is set at the position 'e' (step ST143).

The following expressions are obtained for the next input symbol 'e'.

CHECK[13+'e']=e

GOTO[13+'e']=17>0

OUTPUT[13+'e']=o1

Then, the character string 'east' pointed to by the pointer o1 is output (step ST141), the next state is accessed with the transition pointer set to 17 (step ST142), and the text pointer is set at the position 's' (step ST143).

The following expression is obtained for the next input symbol 's'.

CHECK[17+'s']≠s

The default shift in this state can be obtained by, for example, the following equation.

GOTO[17+1]=−7

The text pointer is shifted by 7 to the right and set at the point 'e' (step ST135). The transition pointer is set to 1 in the initial state again (step ST136).

The following expressions are obtained for the next input symbol 'e'.

CHECK[1+'e']=e

GOTO[1+'e']=3>0

Then, the next state is accessed with the transition pointer set to 3 (step ST142), and the text pointer is set at the position 't' (step ST143).

The following expressions are obtained for the next input symbol 't'.

CHECK[3+'t']=t

GOTO[3+'t']=4>0

Then, the next state is accessed with the transition pointer set to 4 (step ST142), and the text pointer is set at the position 'a' (step ST143).

The following expressions are obtained for the next input symbol 'a'.

CHECK[4+'a']=a

GOTO[4+'a']=12>0

Then, the next state is accessed with the transition pointer set to 12 (step ST142), and the text pointer is set at the position 't' (step ST143).

The following expressions are obtained for the next input symbol 't'.

CHECK[12+'t']=t

GOTO[12+'t']=16>0

Then, the next state is accessed with the transition pointer set to 16 (step ST142), and the text pointer is set at the position 's' (step ST143).

The following expressions are obtained for the next input symbol 's'.

CHECK[16+'s']=s

GOTO[16+'s']=24>0

OUTPUT[16+'s']=o2

Then, the character string 'state' pointed to by the pointer o2 is output (step ST141), the next state is accessed with the transition pointer set to 24 (step ST142), and the text pointer is set at the position 'a' (step ST143).

The following expression is obtained for the next input symbol 'a'.

CHECK[24+'a']≠a

The default shift in this state can be obtained by, for example, the following equation.

GOTO[24+1]=−8

The text pointer is shifted by 8 to the right and set at the point 'r' (step ST135). The transition pointer is set to 1 in the initial state again (step ST136).

The following expressions are obtained for the next input symbol 'r'.

CHECK[1+'r']=r

GOTO[1+'r']=−1<0

Therefore, a specific amount 1 of the shift smaller than the amount 4 of the default shift is defined. Then, the text pointer is shifted to the right by 1 and moved to the end of the text (step ST138), thereby terminating the process.

Thus, the symbol strings 'east' and 'state' contained in the input text are output as a collation result.

Figure 44:
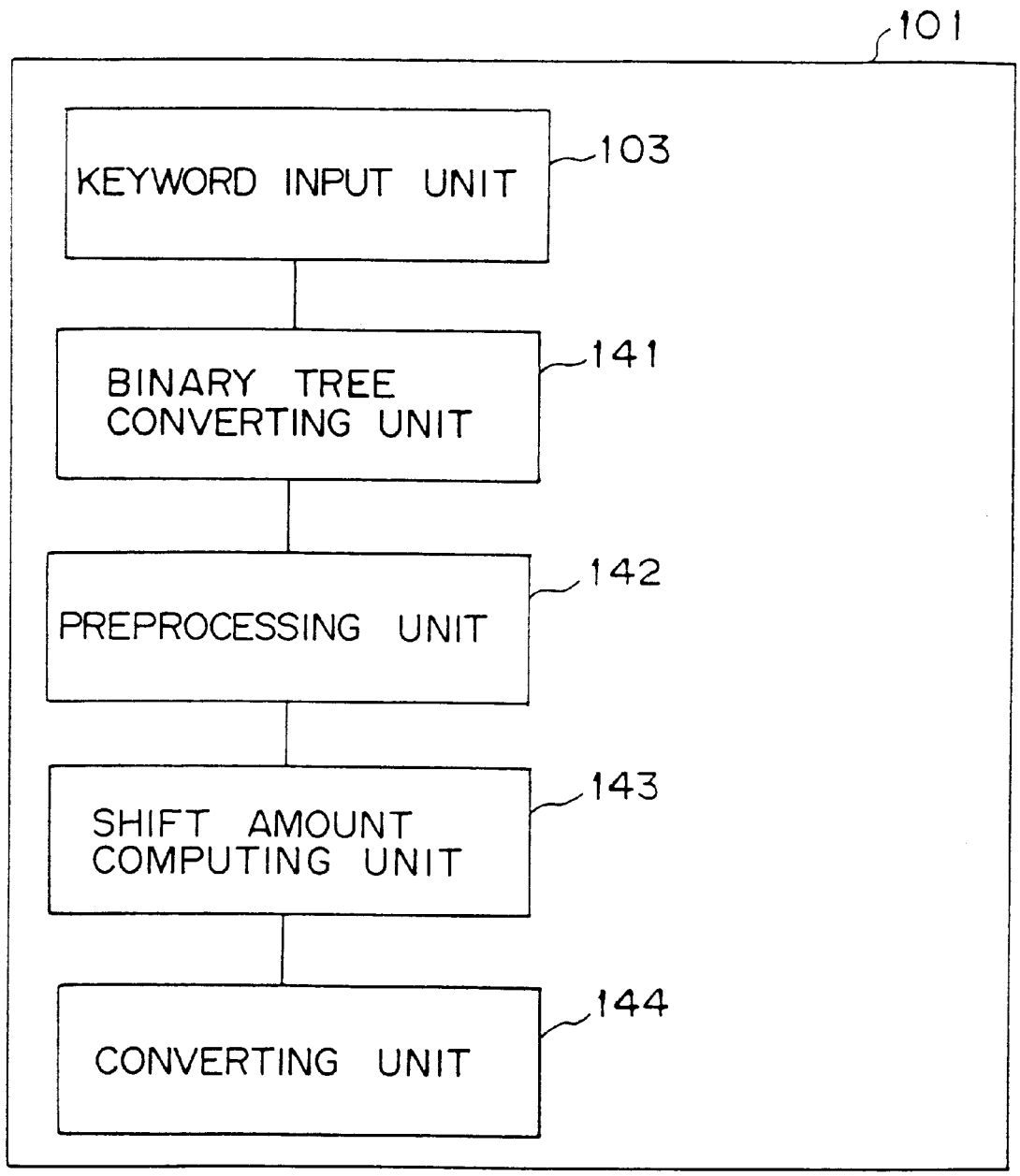
FIG. 44 shows the configuration of the second compressing device.

Next, the method of generating a state transition array for use in a collating process is described. FIG. 44 shows the second configuration of the compressing unit shown in FIG. 4A. In FIG. 44, a binary tree converting unit 141, a preprocessing unit 142, and a shift amount computing unit 143 correspond to the sparse array finite state machine generating unit 104, and a converting unit 144 corresponds to the state transition machine compressing unit 105.

The keyword input unit 103 receives a specified keyword group. The binary tree converting unit 141 converts the received keyword group into the structure of a binary tree from the left to right of each key. The preprocessing unit 142 sets the length of the shortest input keyword, the depth of each node, and the terminal node for each keyword. The shift amount computing unit 143 computes the amount of a shift for each state. The converting unit 144 converts the structure of the binary tree output by the shift amount computing unit 143 into a compressed array format.

The procedure of generating such a collating array is formed by the processes of generating a binary tree from an input keyword group, adding the depth of a node corresponding to an obtained binary tree, setting the last node for the keyword, computing the amount of a shift, generating the binary tree of the intermediate structure, and converting the intermediate structure into an array format.

Figure 45:
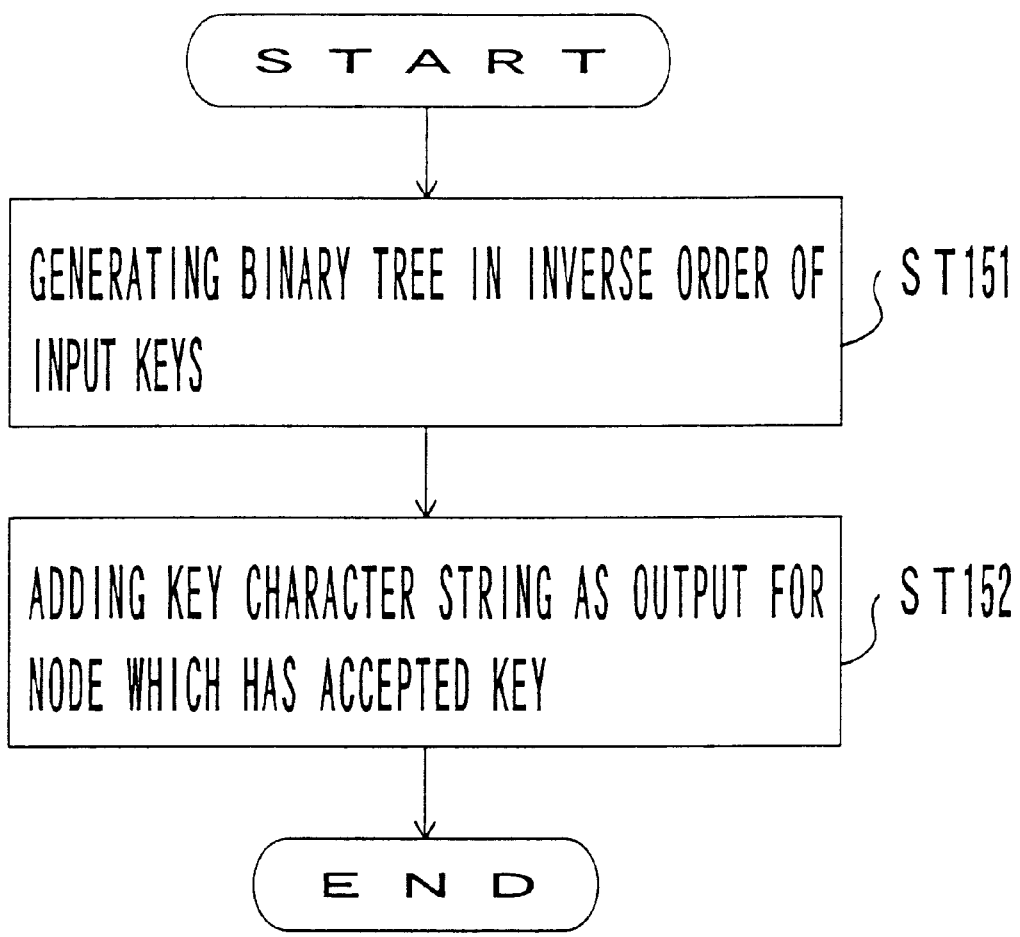
FIG. 45 is a flowchart showing the process of generating the second binary tree.

FIG. 45 is a flowchart showing the binary tree generating process. When the process starts, the binary tree converting unit 141 first generates a binary tree in response to the input keys in the reverse order of the key sequence (step ST151). Then, the binary tree converting unit 141 adds an input key as an output key string (step ST152) to the corresponding node which has accepted the key, thereby terminating the process.

Figure 46:
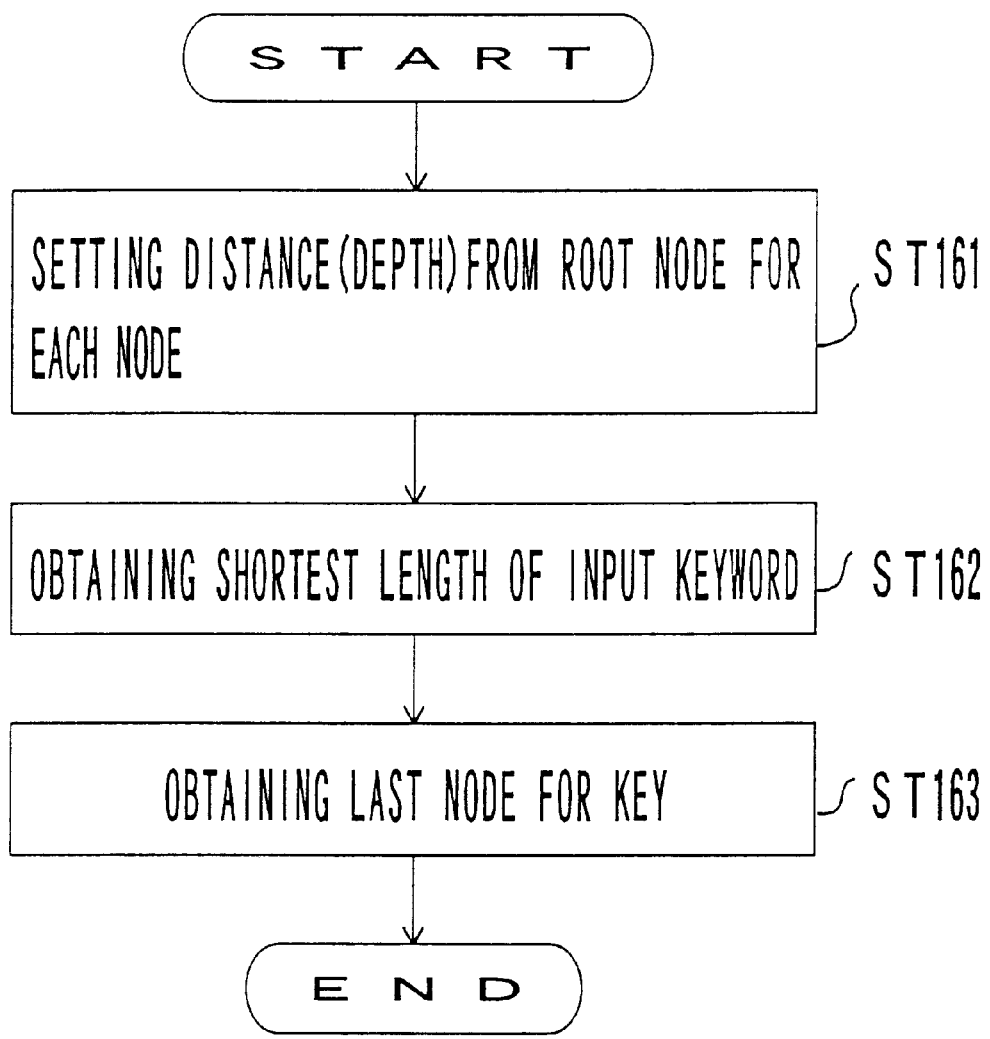
FIG. 46 is a flowchart showing the preprocess of the shift computation.

FIG. 46 is a flowchart showing the preprocess for computing the amount of a shift on the binary tree. When the process is started, the preprocessing unit 142 first sets the distance (depth) of each node from the root node (step ST161). Then, the length of the shortest input keyword is obtained (step ST162), the last node for each keyword is obtained (step ST163), and the process terminates.

Figure 47:
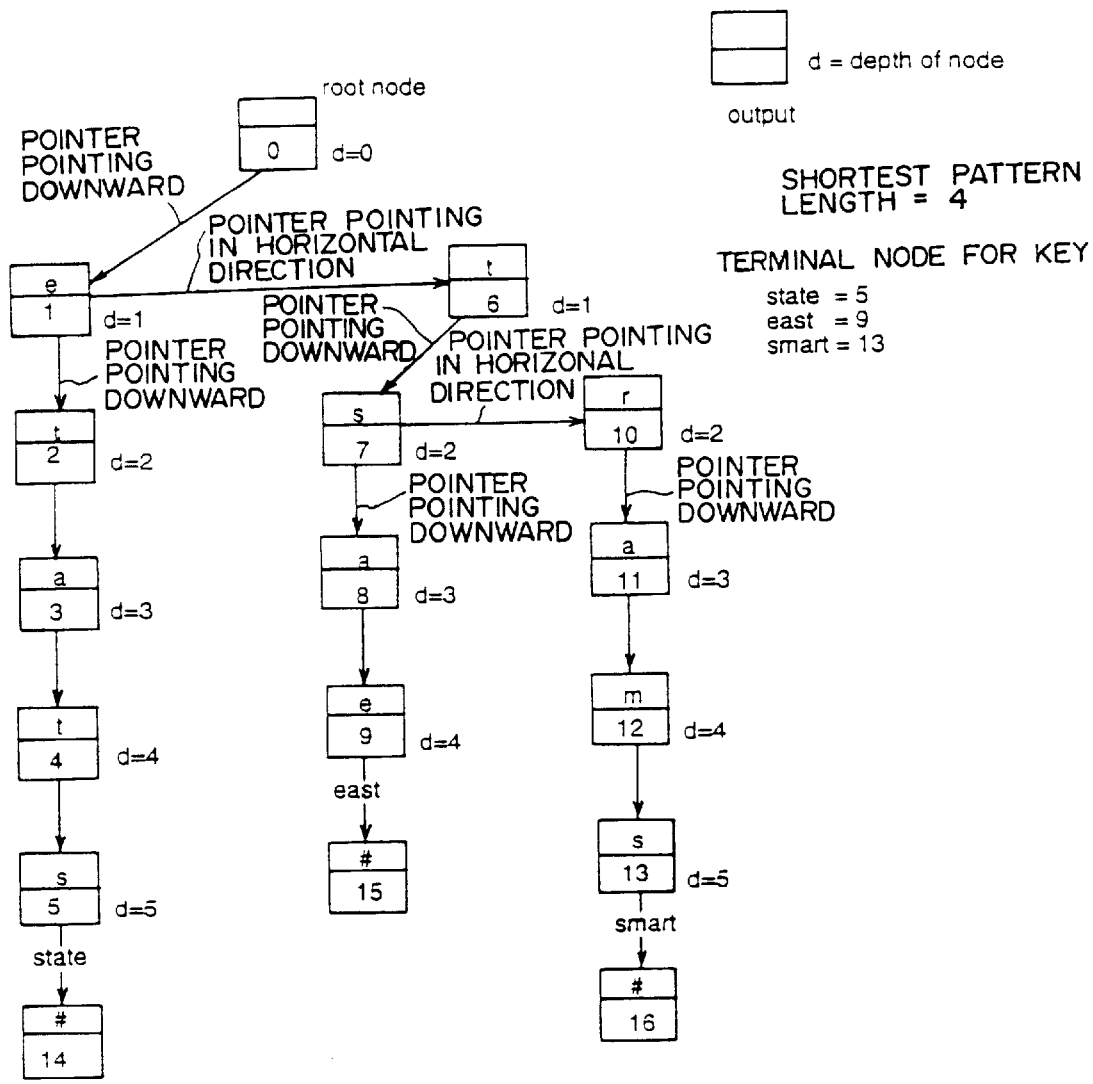
FIG. 47 shows the second binary tree.

For example, a binary tree is generated for the keyword group {smart, east, state} corresponding to the state transition shown in FIG. 39. If a preprocess is performed, the binary tree shown in FIG. 47 is obtained. In FIG. 47, the meanings of a pointer pointing downward and a pointer pointing right are the same as those in FIG. 14.

The data d assigned to each node indicates the depth of the node, and output indicates the output character string. In this example, the output symbol strings 'state', 'east', and 'smart' are added as respective outputs to nodes 5, 9, and 13.

The length of the shortest pattern of these output symbol strings (keywords) is set to 4. The nodes 5, 9, and 13 are set as the terminal nodes to the keywords 'state', 'east', and 'smart' respectively.

Figure 48:
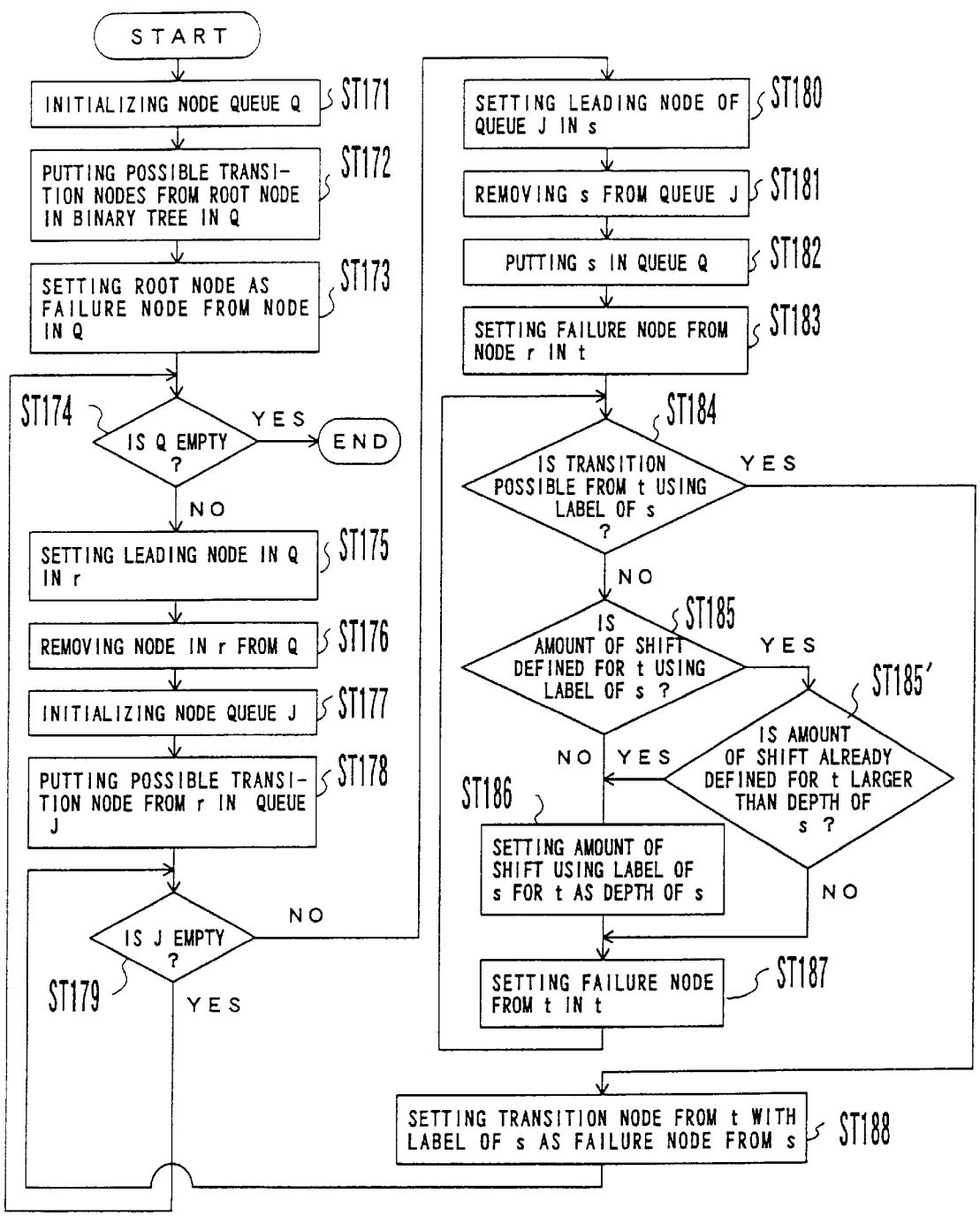
FIG. 48 is a flowchart showing the first shift amount computing process.
Figure 49:
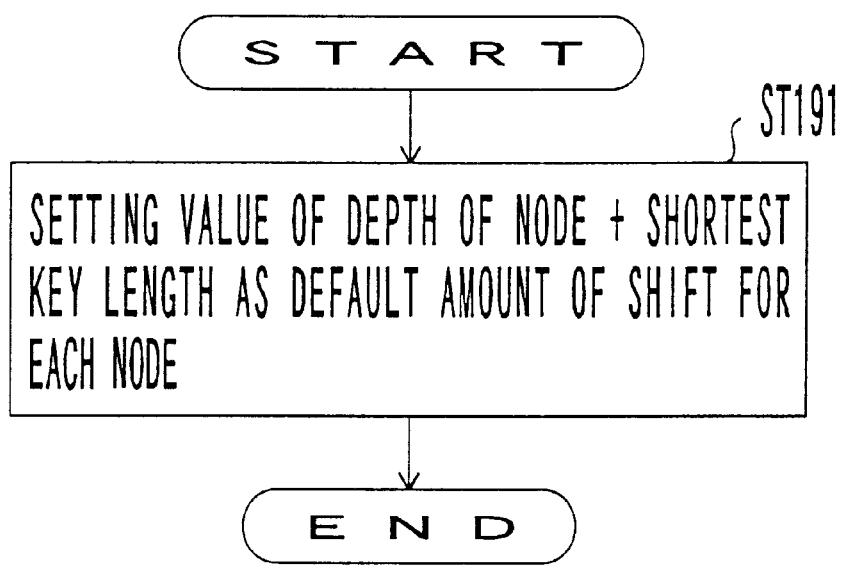
FIG. 49 is a flowchart showing the second shift amount computing process.
Figure 50:
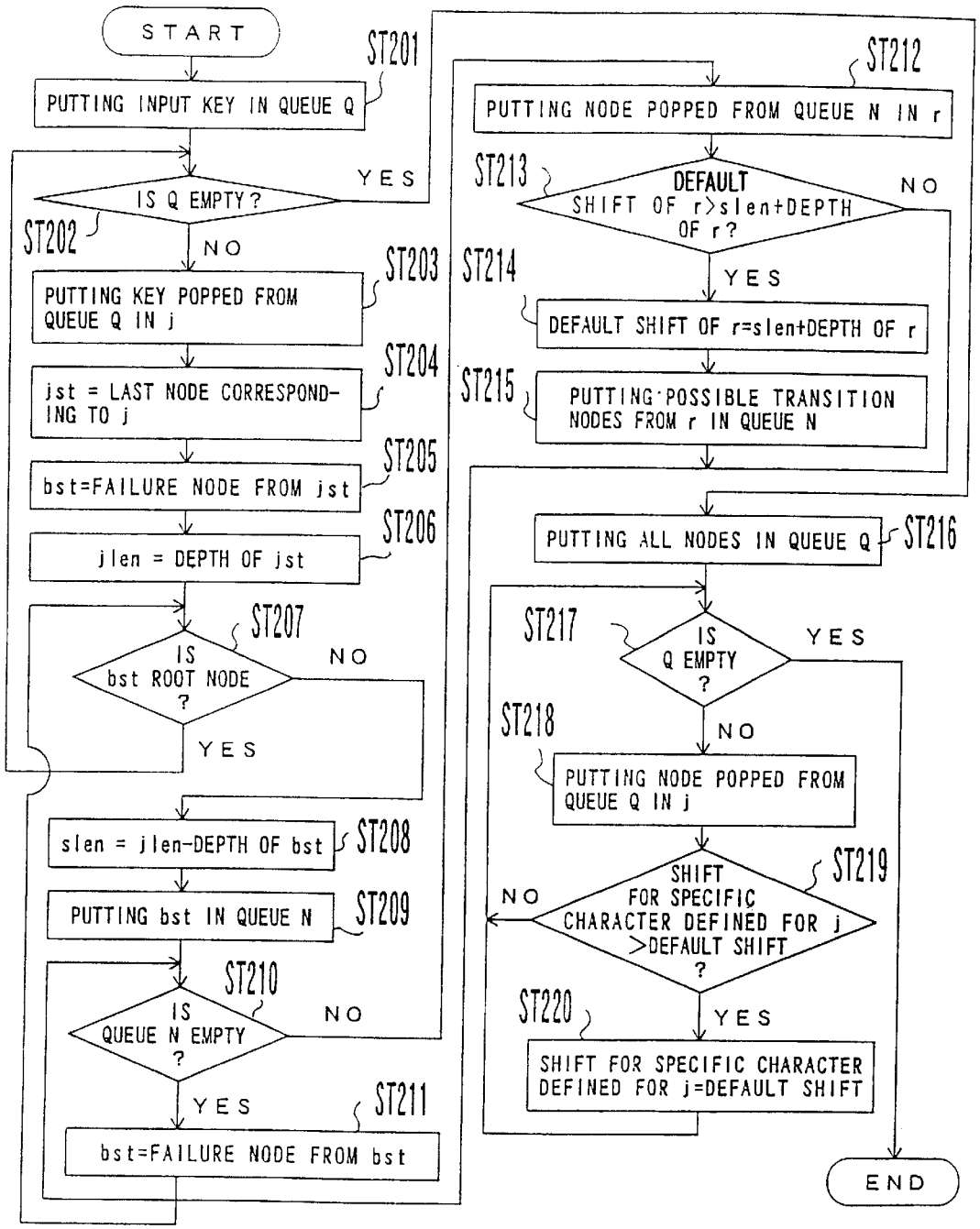
FIG. 50 is a flowchart showing the third shift amount computing process.

FIGS. 48, 49, and 50 are flowcharts showing the computing process of obtaining the amount of a shift for a binary tree.

FIG. 48 shows a process of a shift and a failure transition using a specific character. When the process is started, the shift amount computing unit 143 first initializes the node queue Q storing a node to be processed (step ST171). Next, a possible transition nodes from the root node of a binary tree are placed in the queue Q (step ST172).

Then, the root node is set as a failure node from a node in the queue Q (step ST173), and it is determined whether or not the queue Q is empty (step ST174). If the queue Q is empty, the process terminates. Unless the queue Q is empty, a node is extracted from the queue Q, and sets it to the variable r (step ST175), and the extracted node is removed from the queue Q (step ST176).

Next, the node queue J is initialized (step ST177), and possible transition nodes from the node r are placed in the queue J (step ST178). Then, it is determined whether or not the queue J is empty (step ST179).

If the queue J is empty, the processes in and after step ST174 are repeated. Unless the queue J is empty, one node is extracted from the node queue J and is set in the variable s (step ST180). Then, the extracted node is removed from the node queue J (step ST181). Next, node s is placed in the queue Q (step ST182) and the failure node from node r is set in the variable t (step ST183), and it is determined whether or not the transition from node t is defined with a character label assigned to node s (step ST184).

If the transition is so defined, then the next transition node from node t according to the label of node s is set as a failure node from node s (step ST188), and the processes in and after step ST179 are repeated.

Unless the transition is defined in step ST184, it is determined whether or not the amount of a shift by the label of node s is defined in node t (step ST185). If the amount of a shift is defined, then it is further determined whether or not it is larger than the depth of the current node s (step ST185').

If the amount of a shift is not defined in step ST185 or the value defined is larger than the depth of node s in step ST185', then the amount of a shift for node t according to the label of node s is the depth of node s (step ST186). The amount of a shift according to such a specific label is represented as a specific list added to each node in a binary tree. Then, the failure node from node t is set in node t (step ST187), and the processes in and after step ST184 are repeated.

If the amount of a shift smaller than the depth of the current node s is defined for the label of node s in step ST185', the processes in and after step ST187 are performed.

FIG. 49 is a flowchart showing the process of adding the default amount of a shift, that is, the maximum amount of a shift. When the process starts, the shift amount computing unit 143 sets the value obtained by adding the shortest key length to the depth of each node as the default amount of a shift for the node (step ST191), thereby terminating the process.

For example, in the case of the binary tree shown in FIG. 47, the shift amount computing unit 143 places possible transition nodes 1 and 6 from the root node 0 in the queue Q in the process in step ST172 shown in FIG. 48. Then, the failure transition node of nodes 1 and 6 is set to be the root node in the process in step ST173.

Next, node 1 is extracted from the queue Q, and is set in the variable r. After the processes in steps ST175 through ST178, node 2 is placed in the node queue J. Since the node in the queue J is node 2 only, the process passes only once through the loop of steps ST179 through ST183.

In this embodiment, node 2 is set in the variable s in the process performed in step ST180, and the failure node from node r (node 1), that is, the root node, is set in the variable t in the process in step ST183.

Since a transition can be directed with the label of node s (label t of node 2) from the root node, the process is performed in step ST188, and the failure node from node s is set to be node 6, to which a transition can be directed from the root node with the label t of node 2.

Next extracted from the queue Q is node 6, and the similar processes are performed on the possible transition node 7 from node 6. In this case, r=node 6, s=node 7, and t=node 1 (failure node from node 6). However, no transition is made from node t with the label s of node 7.

In node 1, the depth of node 6, that is, 1, is set as the amount of a specific shift corresponding to the input symbol 's'. The amount of a shift '1' corresponding to the input symbol 's' is represented in the list structure of a specific list.

By similarly repeating the above described processes, a failure transition and a provisional amount of a shift are assigned to all nodes. Then, according to the process shown in FIG. 49, the default amount of a shift, that is, the maximum amount of a shift in each node, is assigned to each node. Thus, the binary tree shown in FIG. 51 can be obtained.

Figure 51:
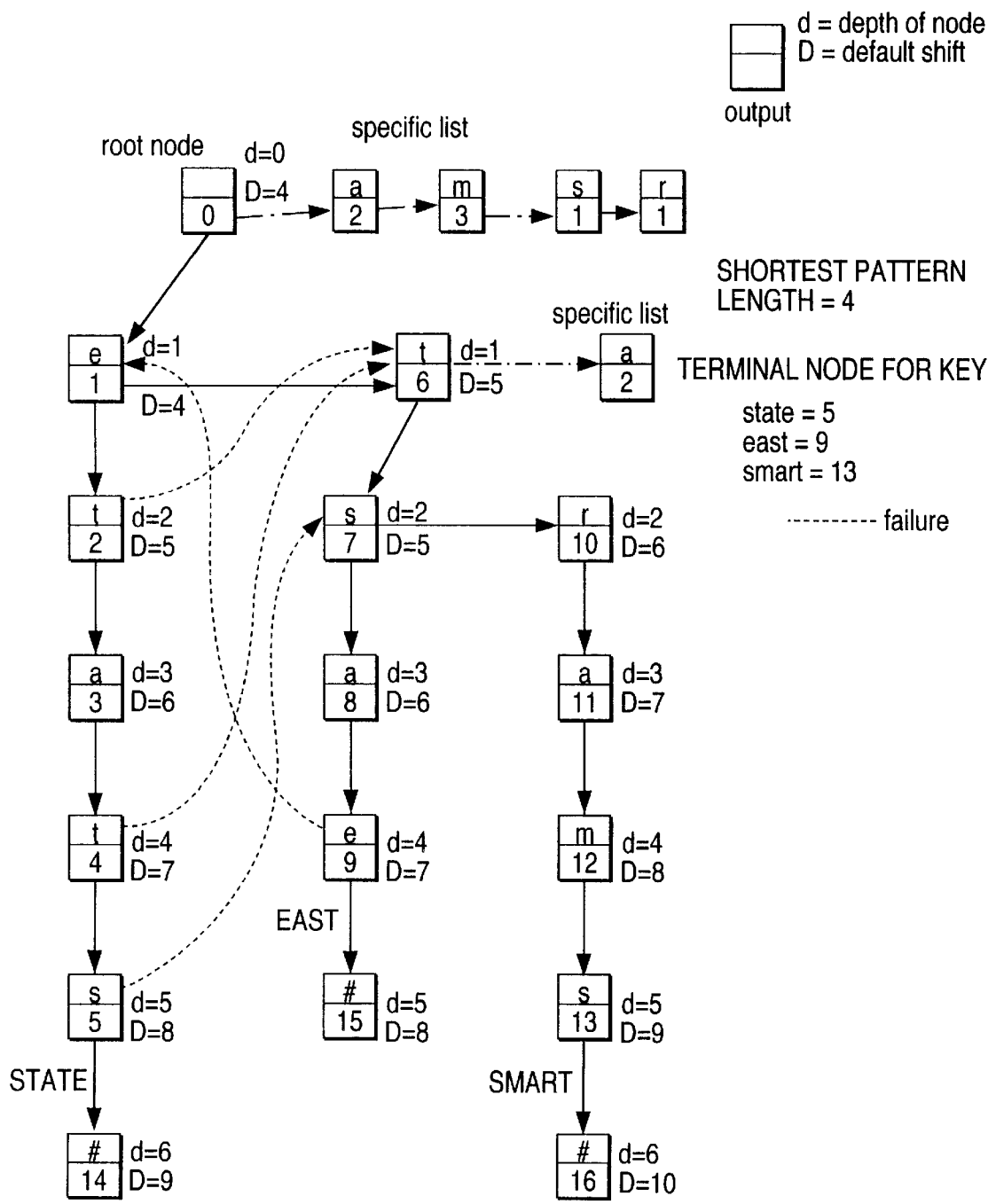
FIG. 51 shows the second binary tree with "failure" and shift.

In FIG. 51, the broken-line arrows indicate a failure transition, and the failure node from the node not indicated as a failure transition is the root node 0. The data D added to each node indicates the default amount of a shift. Furthermore, the specific list linked to nodes 0 and 6 contains a specific character label and the corresponding specific amount of a shift.

FIG. 50 is a flowchart showing the process of assigning a final amount of a shift by reducing the amount of a shift of each node as necessary. When the process starts, the shift amount computing unit 143 first places input keywords in the queue Q (step ST201), and it is determined whether or not the queue Q is empty (step ST202).

Unless the queue Q is empty, the keyword popped from the queue Q is put in variable J (step ST203). Then, the last node corresponding to the keyword j is set in the variable jst (step ST204), the failure node from node jst is set in the variable bst (step ST205) and jlen=the depth of jst (step ST206). Then, it is determined whether or not node bst is the root node (step ST207). If node bst is the root node, the processes in and after step ST202 are repeated.

Unless node bst is the root node, then the depth of node bst is reduced from jlen and the result is set in the variable slen (step ST208). Next, node bst is placed in the queue N (step ST209), and it is determined whether or not the queue N is empty (step ST210). If the queue N is empty, then bst=the failure node from node bst (step ST211), and the processes in and after step ST207 are repeated.

Unless the queue N is empty, then the node popped from the queue N is placed in the variable r (step ST212), and whether or not the default shift of node r is larger than the (slen+depth of node r) is determined in step ST213. If the default shift of node r is equal to or smaller than (slen+depth of node r), then the processes in and after step ST210 are repeated.

If the default shift of r is larger than (slen+depth of r), then the default shift of r=slen+the depth of r (step ST214), the possible transition nodes from r are placed in the queue N (step ST215), and the processes in and after step ST210 are repeated.

If the queue Q is empty in step ST202, then a loop process is performed from step ST216 to step ST220. If, in this process, the size of the shift using a specific character defined for the node is larger than the size of the default shift, it is reduced to the size of the default shift.

In this process, all nodes are placed in the queue Q (step ST216) and it is determined whether or not the queue Q is empty (step ST217). If the queue Q is empty, the process terminates.

Unless the queue Q is empty, the node popped from the queue Q is put in the variable j (step ST218), and it is determined whether or not the size of the shift for the specific character defined in node j is larger than the size of the default shift (step ST219).

If the determination result is 'NO', then the processes in and after step ST217 are repeated. If the determination result is 'YES', then the processes in and after step ST217 are repeated with the size of the default shift as the size of the shift for the specific character (step ST220).

The amount of a shift set for the binary tree shown in FIG. 51 is adjusted in the process shown in FIG. 50 as follows. First, in the processes in steps ST201 through ST203, the collating keyword set {smart, east, state} is placed in the queue Q, and a keyword popped from the queue is set in the variable j.

If it is 'state', then jst=node 5, bst=node 7, and jlen=5 in the processes in steps ST204 through ST206. At this time, node bst is not the root node, and control is passed to step ST208. In step ST208, slen=jlen−depth of bst=5−2=3. In step ST209, node 7 is placed in the queue N. In step ST212, it is popped from the queue N and set in the variable r.

In the determination of the condition in step ST213, the default shift of node r (default shift of node 7) is 6 which is larger than slen. Then, control is passed to step ST214, and the default shift of node r=slen+depth of node r=3+2=5.

Then, in the process in step ST215, node 8 is placed in the queue N and the similar processes are performed. The branches under node 8 are sequentially processed to amend the size of the default shift of each node.

Thus, in the failure node from the terminal node of the keyword and in the node at the position linked to and deeper than the failure node, the size of the default shift is reduced to or smaller than (slen+depth of node r) in the processes in steps ST213 and ST214.

Figure 52:
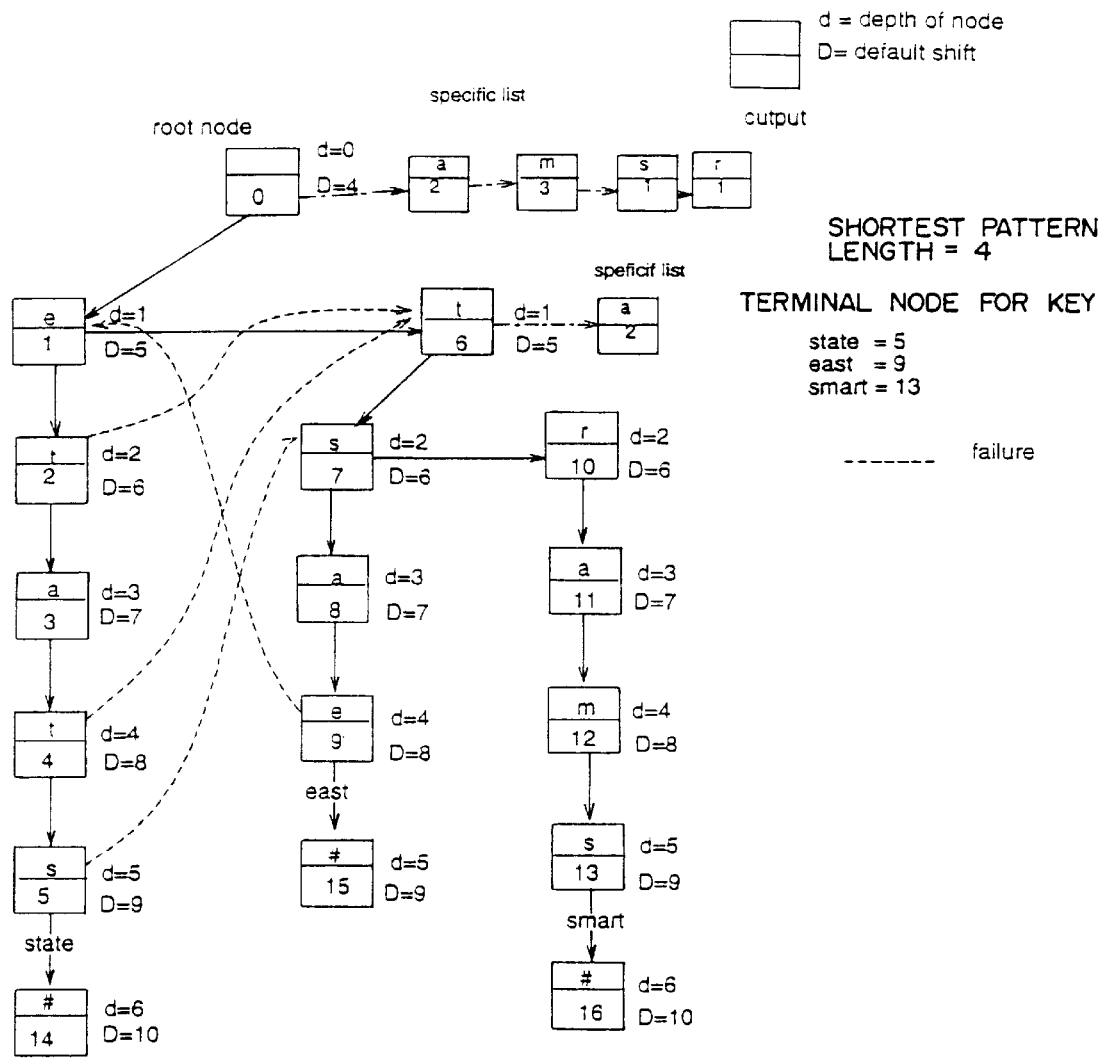
FIG. 52 shows the final second binary tree.

When the process is completed for all nodes, the binary tree shown in FIG. 52 is obtained. In FIG. 52, the default shift of nodes 7 and 1, that is, the failure nodes from the terminal nodes 5 and 9 of the keyword, is smaller by 1 when compared with that shown in FIG. 51. Additionally, the default shift of each node linked below nodes 7 and 1 is smaller by 1.

Figure 53:
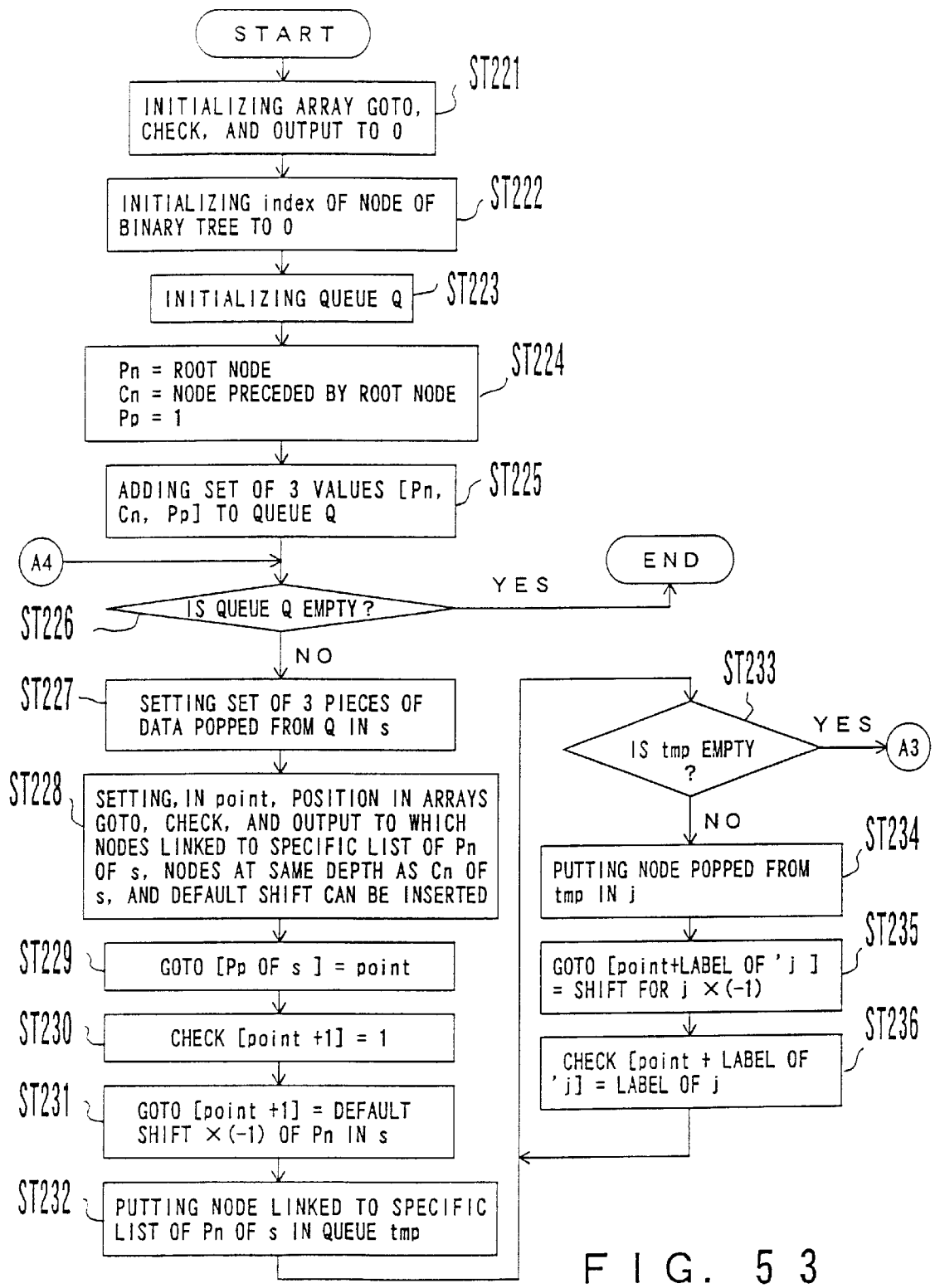
FIG. 53 is a flowchart (1) showing the second converting process.

FIGS. 53 and 54 are flowcharts showing the process of converting the binary tree output by the shift amount computing unit 143 into the compressed array form state transition machine. When the process starts, the converting unit 144 first initializes GOTO, CHECK, OUTPUT to 0 (step ST221), and then initializes a node member 'index' in the binary tree to 0 (step ST222).

Since this index stores the correspondence between each node in the binary tree and the index of the state transition array as shown in FIG. 40, it is provided independently of the index of the state transition array.

Then, the queue Q is initialized (step ST223), and Pn=root node, Cn=node preceded by the root node, and Pp=1 (step ST224).

The node preceded by the root node refers to the node having the smallest character label in possible plural transition nodes (node string) from the root node. In the case of the binary tree shown in FIG. 52, the node put in the Cn matches the node pointed to by the pointer pointing downward from the root node.

Next, a set of [Pn, Cn, Pp] is added to the queue Q (step ST225), and it is determined whether or not the queue Q is empty (step ST226). If the queue Q is empty, the process terminates.

Unless the queue Q is empty, the set of three pieces of data is popped from the head of the queue Q and is set in the variable s (step ST227). Then, the position in the array GOTO, CHECK, and OUTPUT, to which the nodes linked to the specific list of node Pn in s, the nodes linked to node Cn in s and at the same depth of Cn, and the amount of the default shift for s can be inserted, is obtained and set in the variable point (step ST228).

At this time, care should be taken such that the position of the point of the already inserted node may not overlap the position of the point of a newly inserted node. If the position of the newly inserted node has already been used as a point, then it is shifted by 1 to set it as a point.

Then, GOTO [Pp of s]=point (step ST229) and CHECK [point+1]=1 (step ST230). The size of the default shift of node Pn in s is multiplied by −1, resulting in a negative value. The value is put in GOTO [point+1] (step ST231). Thus, the value of the default shift is set at the position of index=point+1 in the array.

Next, the node linked to the specific list of node Pn of s is placed in the queue tmp (step ST232), and it is determined whether or not the queue tmp is empty (step ST233). Unless the queue tmp is empty, the node popped from the queue tmp is set in the variable j (step ST234).

Then, the value obtained by multiplying the size of the corresponding shift by −1 is set in GOTO [point+label of 'j'] (step ST235). The 'label' refers to an internal code in an array corresponding to the character label. If the conversion table shown in FIG. 41 is used, the label≧2.

Next, a character label is set in CHECK [point+label of 'j'] as a confirmation label (step ST236), and the processes in and after step ST233 are repeated.

When the queue tmp is empty in step ST233, Cn in s and the node at the same depth as Cn are placed in the queue tmp (step ST237 shown in FIG. 54), and it is determined whether or not the queue tmp is empty (step ST238).

Unless the queue tmp is empty, the node popped from the queue tmp is set in the variable i (step ST239), the value (point+label of 'i) is set in the index of node i (step ST240), and it is checked whether or not an output is defined in node i (step ST241).

If an output is defined in node i, the output of node i is copied to the array OUTPUT (step ST242). Here, OUTPUT [point+label of 'i]=the pointer to the output of i. Then, the processes in and after step ST238 are repeated as a label of CHECK [point+label of 'i]=i (step ST243) Unless there is no output in node i, the processes in and after step ST243 are performed.

If the tmp becomes empty in step ST238, then the node at the same depth as node Cn is placed in the queue tmp (step ST244) and it is determined whether or not the queue tmp is empty (step ST245).

Unless the queue tmp is empty, the node popped from the queue tmp is set in the variable i (step ST246) and it is determined whether or not the transition to the next state is possible from node i with a symbol (step ST247). If it is not possible, the processes in and after step ST245 are repeated.

If the transition is possible, a set of three pieces of data is added to the queue Q as Pn=i, Cn=the leading node of the next transition nodes of i, and Pp=the index of i (step ST248), and the processes in and after step ST245 are repeated. At this time, the leading node of the next transition nodes refers to the node having the smallest character label in the possible transition node string from node i.

If the queue tmp becomes empty in step ST245, control is returned to step ST226 shown in FIG. 53 and the processes in and after step ST226 are repeated.

Then, the procedure of converting the binary tree shown in FIG. 52 into the array format as shown in FIG. 40 is described by referring to the flowcharts of FIGS. 53 and 54.

In the conversion process, the relationship between a preceding node and possible transition nodes from the preceding node or nodes possibly shifted to from the preceding node is mapped from the binary tree format into the array format.

Summing up the transition according to an input symbol for each node, the specific shift according to an input symbol, and a default shift shown in FIG. 52 results in FIG. 55. In FIG. 55, for example, 'e:1' in the first row of column 2 indicates that the next transition node according to the input symbol e for node 0 is node 1, and 'a:2' in the first row of column 4 indicates that the size of the shift according to the input symbol a for node 0 is 2.

In the processes in step ST227 shown in FIG. 53 through step ST248 shown in FIG. 54, the converting unit 144 searches for an available area in the array to define the symbol of the next transition/shift symbol for the preceding state, inserts the data, and maps the transition relationships. The method of inserting the data is fundamentally similar to the method described above relating to the first embodiment.

Figure 56:
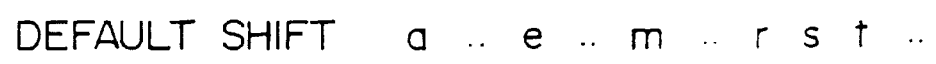

The mapping operation is described by referring to the root node 0 as an example. FIG. 56 shows the data pattern to be inserted about the root node. FIG. 56 shows that there are six input symbols a, e, m, r, s, and t for use in defining a transition, etc. other than a default shift for the root node.

First, since all elements in the state transition array are empty, an available area for the pattern shown in FIG. 56 is searched for in the array, and the smallest possible array index is 1. In the processes in steps ST229 through ST236 in FIG. 53, the variable point is set to 1, a character label is written, and an amount of a default shift or a specific shift is set. Then, the pattern shown in the row of s0 shown in FIG. 40 is mapped. In these steps, the portions corresponding to the labels e and t remain undefined.

Since the portions of the labels e and t correspond to the next nodes to the root node 0, they can be set when they are inserted in the array in the processes in steps ST237 and ST248 in FIG. 54. The next node to be processed after the root node is node 1.

Figure 57:
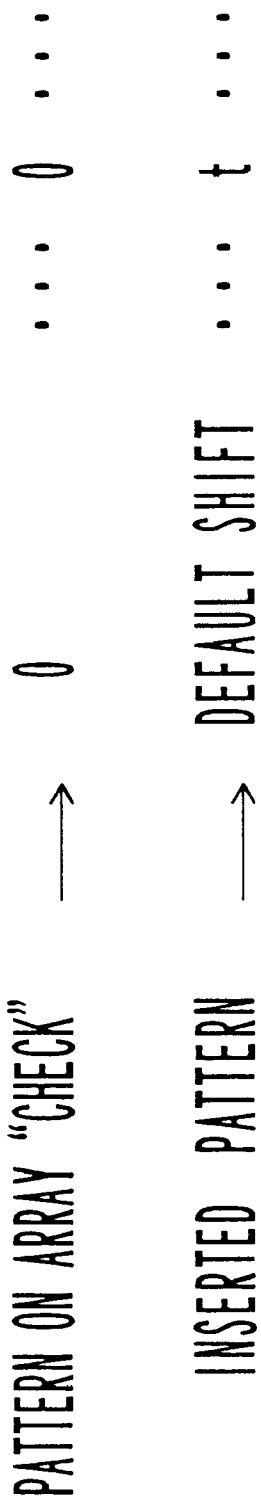
FIG. 57 shows the sixth pattern.

Since the character with which a transition from node 1 is possible is t only, the position where node 1 is inserted is indicated in the pattern as shown in FIG. 57. In FIG. 57, the upper row indicates the pattern in the array CHECK while the lower row indicates the pattern to be inserted.

When such a pattern insertion position is searched for in the array, the smallest possible array index set in the variable point is 3. First, to define that node 1 is the next transition node from node 0, the value 3 of the point is set to GOTO [7]. Thus, it is defined that the data of the next transition node from node 0 with the symbol e start at the position of the index=3.

The node 1 is inserted at the position of the index=3, and in the processes in steps ST229 through ST236, the character label, default amount of a shift, etc. are set. As a result, the pattern indicated in the row of s1 shown in FIG. 40 is mapped.

The above described processes are performed in the order in which the nodes are placed in the queue, that is, in the order of nodes, 0, 1, 6, 2, 7, 10, 3, 8, 11, 4, 9, 12, 5, and 13, thereby finally obtaining the state transition array as shown in FIG. 40.

Nodes 14, 15, and 16 shown in FIG. 52 are placed in the queue and processed similarly. Strictly, the transition with the terminal symbol # is defined. However, since the terminal symbol is not contained in an output character string, the processes of these nodes are omitted and the transition to the nodes are also omitted in FIG. 40. By setting the values of the labels of the terminal symbols to 0 in the array, the transition from the terminal node can be suppressed.

Described below is the embodiment of the character string replacing device obtained by adding the function of replacing a character string to the collating apparatus according to the second embodiment. In this embodiment, input keywords {smart, east, state} is replaced with {SMART, EAST, STATE}.

FIG. 58 shows the state transition array for a character string replacement corresponding to the input symbol. In FIG. 58, the array GOTO stores a superposed state transition table. The array CHECK stores a confirmation label, the array SUBST stores a pointer to a replacing character string, and the array LENGTH stores the length of the character string before the replacement. The initial state of the text offset storage array used in a replacing process is similar to that shown in FIG. 34.

Figure 59:
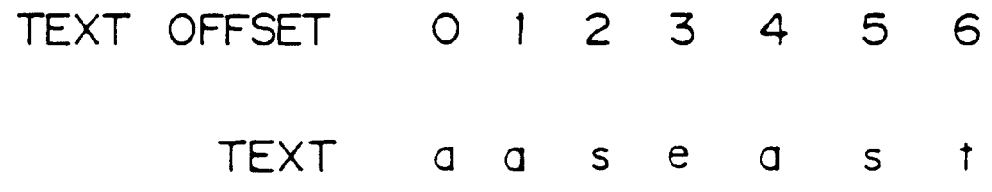

The text offset for each symbol in the input text 'aaseast' is shown in FIG. 59. After performing a collating process on the pattern of the input text, the text offset storage array is set as shown in FIG. 60. The collating process at this time is similar to that shown in FIG. 42. As a result of the collation, the position of the keyword 'east' in the text is stored as the text offset '3'.

The replacing process is performed as shown in FIG. 37. As a result of the replacing process, the text 'aaseast' is converted into 'aasEAST'.

In the above described first and second embodiments, the state transition array basically obtained by compressing the DFA of the table structure is used. Therefore, the collation can be completed by the same number of transition operations as the input symbols, thereby maintaining a high-speed DFA. However, the storage capacity required to store a state transition array can be much smaller than that required for the conventional state transition table.

In the above described example, the text is input in English characters, but the present invention can be applied to the text written in a 2-byte character code language such as Japanese, in the following two methods.

In the first method, a state transition array is generated for each byte of a keyword group. When any keyword pattern is detected in the text, control is returned back to the new line symbol before the pattern. Then, in the sentence starting with the position after the new line symbol, it is checked whether or not the detected pattern is 1 byte off position.

In the second method, a state transition array is generated using an input 2-byte character code as one unit to perform a collating process.

To process the text written with 1-byte characters such as the American Standard Code for Information Interchange (ASCII) and 2-byte characters such as Extended UNIX Code (Japanese EUC) in a mixed manner, the 2-byte character may be collated with one byte of the 2-byte character displaced when the text is shifted according to the second embodiment.

Therefore, in processing the above described text, it is necessary to check whether or not the detected pattern is displaced based on the header position by returning control to the head of the document containing the pattern upon acceptance of the pattern.

Described below is the result of comparing the present invention with the conventional collating apparatus in storage capacity and retrieval speed at the time of character string retrieval.

Figure 61:
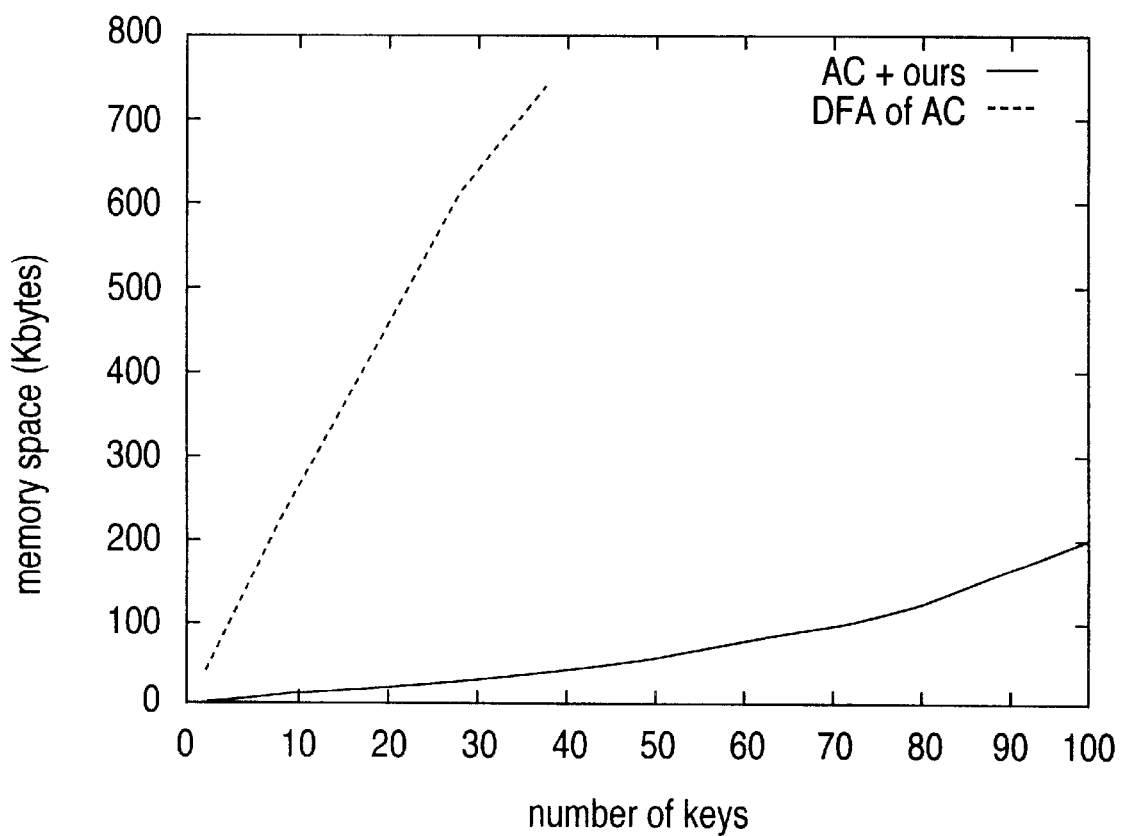
FIG. 61 shows a change in the memory requirement in the AC method.

First, the comparison is made for the keyword retrieval in the AC method. FIG. 61 shows a change in memory requirement in the present invention and the conventional method.

In FIG. 61, the vertical axis of the graph indicates the memory requirement while the horizontal axis indicates the number of keywords. The 'AC+ours' corresponds to the collating apparatus according to the first embodiment of the present invention based on the AC method with DFA. The 'DFA of AC' corresponds to the collating apparatus using the conventional state transition table.

FIG. 61 shows that, with the increasing number of keywords, the memory requirement sharply increases according to the conventional method, whereas the present invention indicates only a small change in memory requirement.

Figure 62:
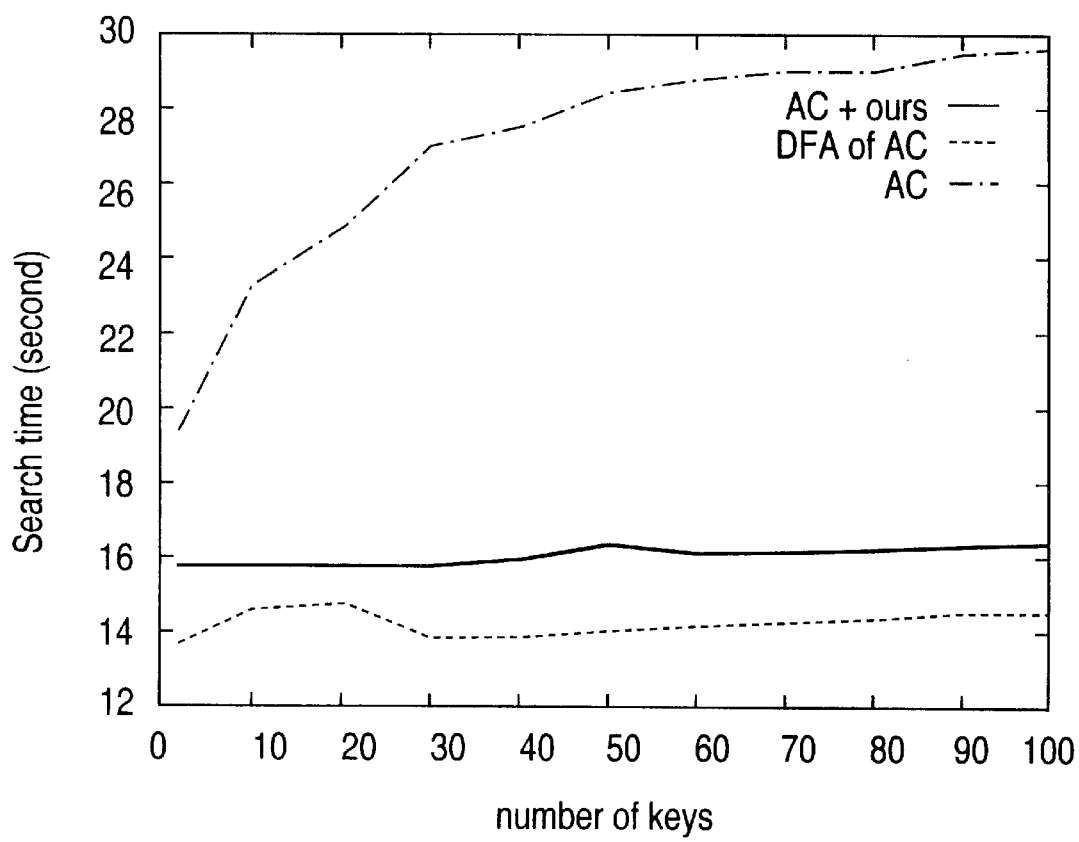
FIG. 62 shows a change in the speed in the AC method.

FIG. 62 shows a change in retrieval speed of each collating apparatus when keywords are retrieved in a 75Mbyte text. In FIG. 62, the vertical axis indicates the time (seconds) required for retrieval and the horizontal axis indicates the number of keywords. In this example, a graph of the retrieval speed of the an conventional AC method is added as AC for comparison. This experiment is done for 75Mbyte Japanese text at Sun 4/20 HS mode/22.

In FIG. 62, with the increasing number of keywords, the retrieval speed is lowered according to the conventional method whereas the conventional DFA-formatted AC method and the first embodiment keep a high retrieval speed. Furthermore, there is little difference in retrieval time between 'AC+ours' and 'DFA of AC'.

Then, the comparison is made for the keyword retrieval based on the FAST method. The storage areas required by the collating apparatus according to the second embodiment are a binary tree area, a list area listing the amount of a shift for a specific character, and an area of a compressed state transition array. The storage area required by the collating apparatus in the conventional FAST method is an area of pointers whose number depends on the number of possible input symbols and states.

FIG. 63 shows the change in memory requirement in the conventional method and the present invention. In FIG. 63, the vertical axis of the graph indicates the memory requirement while the horizontal axis indicates the number of keywords. The 'NORMAL' corresponds to the collating apparatus in the conventional FAST method. The 'COMPRESSED' corresponds to the collating apparatus according to the second embodiment of the present invention.

In FIG. 63, with the increasing number of keywords, the memory requirement sharply increases in the conventional method, but it hardly increases according to the second embodiment of the present invention.

According to the present invention, a collating table efficient in speed and storage capacity can be produced for an input keyword group. Using the table, a plurality of keywords specified for an electronic document can be efficiently collated and retrieved.

In the above described character string collating process, the functions of a word processor such as retrieving a character string, replacing a character string, etc. can be more efficiently performed. Furthermore, the functions of retrieving a character string from a full-text search index in a full-text search device; replacing a character string in a parentheses assigning process in a displaying step in the full-text search device; retrieving a character string in a database; replacing a character string in a displaying step in the database, etc. can be performed efficiently.

What is claimed is:

1. A collating apparatus, using a finite state machine for determining whether a key referring to a given symbol string exists in a file, said apparatus comprising:

state transition storage means for storing in a compressed array format a sparse state transition table containing definitions of collating operations for at least one key, wherein an amount of data indicating a predetermined operation is reduced in the sparse state transition table; and collating means for performing an operation corresponding to each symbol contained in the file while referring to the sparse state transition table, performing the predetermined operation when no operation is defined in the sparse state transition table, and collating a symbol string in the file with at least one key.

2. The collating apparatus according to claim 1, wherein said state transition storage means stores the sparse state transition table excluding data indicating a transition operation from a current state to an initial state; and said collating means performs the transition operation to the initial state when there is no transition, corresponding to an input symbol from the file, defined in the sparse state transition table.

3. The collating apparatus according to claim 2, wherein said state transition storage means stores the sparse state transition table excluding the data indicating the transition operation from the current state to a next state to the initial state; and said collating means performs a transition operation to the next state to the initial state through the initial state when there is no transition, corresponding to the input symbol, defined in the sparse state transition table.

4. The collating apparatus according to claim 1, wherein said state transition storage means stores the sparse state transition table containing a reduced amount of data indicating a shift operation for setting a collation position in the file back in an inverse direction of a collation direction; and said collating means performs the shift operation when there is no operation, corresponding to an input symbol input from the collation position in the file, defined in the sparse state transition table.

5. The collating apparatus according to claim 4, wherein said collating means performs a defined operation when one of a transition operation to a next state corresponding to the input symbol and a specific shift operation corresponding to the input symbol is defined in the sparse state transition table.

6. The collating apparatus according to claim 1, wherein said state transition storage means stores a next transition state array storing a next state from a current state according to an input symbol input from the file, and a confirmation label array storing a label indicating whether or not an operation corresponding to the input symbol is stored at a corresponding position in the next transition state array; and said collating means confirms the label in the confirmation label array, and performs a transition operation to a next transition state when the next transition state corresponding to the input symbol is stored at the corresponding position.

7. The collating apparatus according to claim 6, wherein said collating means shifts a collation position in the file through a specific shift operation when data indicating the specific shift operation corresponding to the input symbol is stored at the corresponding position.

8. The collating device according to claim 6, further comprising storage means for storing an output symbol array storing data which specifies a key corresponding to an input symbol contained in the at least one key; and output means for outputting a key corresponding to the input symbol based on the data in the output symbol array.

9. The collating device according to claim 6, further comprising storage means storing a replacement symbol array containing data which specifies the replacement symbol string output instead of a key corresponding to an input symbol contained in the at least one key; and output means for outputting the replacement symbol string corresponding to the input symbol based on the data in the replacement symbol array.

10. The collating apparatus according to claim 1, wherein at least one of a symbol string retrieving function and a symbol string replacing function is performed using said collating apparatus.

11. The collating apparatus according to claim 1, wherein at least one of a symbol string replacing function is performed using said collating apparatus.

12. The collating apparatus according to claim 1, wherein at least one of a symbol string retrieving function and a symbol string replacing function is performed using said collating apparatus.

13. A collating apparatus generating a finite state machine for determining whether a key referring to a given symbol string exists in a file, said apparatus comprising:

sparse finite state machine generating means for generating binary tree data representing at least one key, and generating a finite state machine having an intermediate structure corresponding to a sparse state transition table based on the binary tree data, whereby an amount of data indicating a predetermined operation is reduced in the sparse state transition table so as to compress the finite state machine; and state transition machine compressing means for converting the finite state machine into a compressed array format.

14. The collating apparatus according to claim 13, wherein said sparse finite state machine generating means includes binary tree data generating means for generating the binary tree data, and transition adding means for adding, to the binary tree data, information about a possible state in case of transition failure excluding an initial state and a state preceded by the initial state; and said state transition machine compressing means generates a compressed state transition array in such a way that a plurality of elements do not overlap each other based on the binary tree data received from said transition adding means.

15. The collating apparatus according to claim 13, wherein said sparse finite state machine generating means includes binary tree data generating means for generating the binary tree data, and shift amount computing means for computing one of a possible state in case of transition failure, a default shift, and a specific shift corresponding to a specific symbol and for adding a computation result to the binary tree data; and said state transition machine compressing means generates a compressed state transition array in such a way that a plurality of elements do not overlap each other based on the binary tree data received from said shift amount computing means.

16. A collating apparatus, using a finite state machine, for determining whether a key referring to a given symbol string exists in a file, said apparatus comprising:

sparse finite state machine generating means for generating binary tree data representing at least one key, and generating the finite state machine having an intermediate structure corresponding to a sparse state transition table based on the binary tree data, whereby the amount of data indicating a predetermined operation is reduced in the state transition table so as to compress the finite state machine;

state transition machine compressing means for converting the finite state machine of the intermediate structure into a compressed array format;

state transition storage means for storing the sparse state transition table converted into the array format; and collating means for referring to the sparse state transition table, performing an operation corresponding to each symbol contained in the file, performing the predetermined operation when there is no operation defined in the sparse state transition table, and collating a symbol string in the file with the at least one key.

17. A collating apparatus, using a finite state machine, for determining whether a key referring to a given symbol string exists in a file, said apparatus comprising:

state transition storage means for storing a state transition table containing defined collating operations on at least one key, at least one of data indicating a transition operation from a current state to an initial state and data indicating a transition operation for the current state to a next state to the initial state being removed from the state transition table; and collating means for collating a symbol string in the file with the at least one key be performing the transition operation to the initial state when the state transition table does not contain a defined transition corresponding to a symbol input from the file.

18. A collating apparatus for determining using a finite state machine whether or not a key referring to a given symbol string exists in a file, said apparatus comprising:

state transition storage means for storing a state transition table containing defined collating operations on at least one key, data indicating a shift operation being reduced in the state transition table and the shift operation setting a collation position in the file back in an inverse direction of a collation direction; and collating means for performing the shift operation when there is no operation, corresponding to an input symbol input from the collation position in the file, defined in the state transition table, and for collating the symbol string in the file with the at least one key.

19. A computer-readable medium used to direct a computer, using a finite state machine, to determine whether a key referring to a given symbol string exists in a file by performing the following action:

performing an operation corresponding to each symbol contained in the file by referring g to a sparse state transition table containing definition by collating operations for at least one key, data indicating a predetermined operation being reduced in the sparse state transition table;

performing the predetermined operation when there is no operation define din the sparse state transition table; and collating the symbol string in the file with the at least one key.

20. A computer-readable medium used to direct a computer to generate a finite state machine for determining whether a key referring to a given symbol string exists in a file by performing the following actions:

generating binary tree data representing at least one key;

generating the finite state machine of an intermediate structure corresponding to a sparse state transition table based on the binary tree data, data indicating a predetermined operation being reduced in the sparse state transition table to compress the finite state machine; and converting the finite state machine of the intermediate structure into a compressed array format.

21. A collating method, using a finite state machine, to determine whether a key referring a given symbol string exists in a file, comprising the steps of:

performing an operation corresponding to each symbol contained in the file by referring to a sparse state transition table containing definitions of collating operations for at least one key, data indicating a predetermined operation being reduced in the sparse state transition table;

performing the predetermined operation when there is no operation defined in the sparse state transition table; and collating the symbol string in the file with the at least one key.

22. A collating method for generating a finite state machine to determine whether a key referring to a given symbol string exists in a file, comprising the steps of:

generating binary tree data representing at least one key;

generating the finite state machine of an intermediate structure corresponding to a sparse state transition table based on the binary tree data, data indicating a predetermined operation being reduced in the sparse state transition table to compress the finite state machine; and converting the finite state machine of the intermediate structure into a compressed array format.

* * * * *